United States Patent [19]

Kobayashi et al.

[11] Patent Number: 5,739,970
[45] Date of Patent: Apr. 14, 1998

[54] MAGNETIC TAPE UNIT

[75] Inventors: Masayoshi Kobayashi; Keisuke Hoshino; Masaru Ohshita; Akira Takano; Makoto Sasaki; Makoto Matsuda; Toshihiko Fujii, all of Kawasaki, Japan

[73] Assignee: Fujitsu Limited, Kawasaki, Japan

[21] Appl. No.: 503,200

[22] Filed: Jul. 17, 1995

[30] Foreign Application Priority Data

| Sep. 20, 1994 | [JP] | Japan | 6-224825 |
| Mar. 3, 1995 | [JP] | Japan | 7-044510 |
| Mar. 8, 1995 | [JP] | Japan | 7-048432 |

[51] Int. Cl.$^6$ ............... G11B 15/18; G11B 15/43
[52] U.S. Cl. ............... 360/75; 360/74.1; 360/74.5
[58] Field of Search ............... 360/75, 83, 95, 360/93, 96.5, 97.02, 133, 137, 71; D14/107, 108, 113, 115, 160, 161, 164, 165; 361/749

[56] References Cited

U.S. PATENT DOCUMENTS

| 3,723,980 | 3/1973 | Gabor | 360/97.02 X |
| 4,608,614 | 8/1986 | Rinkleib et al. | 360/95 |
| 4,625,248 | 11/1986 | Manning et al. | 360/93 X |
| 4,991,037 | 2/1991 | Shimizu et al. | 360/95 X |
| 5,010,437 | 4/1991 | Utsugi et al. | 360/137 |
| 5,115,225 | 5/1992 | Dae et al. | 360/97.02 X |
| 5,121,295 | 6/1992 | Lam | 360/137 |
| 5,155,639 | 10/1992 | Platter et al. | 360/95 |
| 5,224,643 | 7/1993 | Kojima et al. | 360/95 X |
| 5,253,133 | 10/1993 | Guo | 360/97.02 X |
| 5,282,099 | 1/1994 | Kawagoe et al. | 360/97.02 X |

FOREIGN PATENT DOCUMENTS 53-54004  5/1978  Japan.

Primary Examiner—Aristotelis M. Psitos
Assistant Examiner—Kin Wong
Attorney, Agent, or Firm—Greer, Burns & Crain, Ltd.

[57] ABSTRACT

Disclosed herein is a magnetic tape unit having a magnetic head for reading and writing data from and onto a magnetic tape. The magnetic tape is traveled in contact with the magnetic head during a read/write operation of the magnetic head. During a rest period where the read/write operation of the magnetic head is not performed, a reciprocating motion of the magnetic tape by a small distance is performed with a predetermined period. A temperature in the vicinity of the magnetic head is detected by a temperature sensor. The predetermined period is changed according to the temperature detected by the temperature sensor. Accordingly, the adhesion of the magnetic tape to the magnetic head can be well prevented irrespective of the temperature inside the tape unit.

9 Claims, 47 Drawing Sheets

MAGNETIC TAPE UNIT

BACKGROUND OF THE INVENTION

1. Field of the Invention

The present invention relates to a magnetic tape unit for performing read/write of data on a magnetic tape.

2. Description of the Related Art

In recent years, a magnetic tape unit using a magnetic tape as a storage medium has been developed and put into practical use as an external storage device for a computer. In a read/write operation of the magnetic tape unit, the magnetic tape is traveled in contact with the magnetic head. In waiting for a read/write process, the magnetic tape is kept in contact with the magnetic head. Accordingly, if such a waiting condition continues for a long time, there is a possibility that the magnetic tape may adhere to the magnetic head; so, the measures for solving this problem have been desired. In a particular case that an air escaping groove is formed on a magnetic tape contact surface of the magnetic head, so as to make a good contact between the magnetic tape and the magnetic head, there is a possibility that the shape of this air escaping groove may be transferred to the magnetic tape to make the surface of the magnetic tape uneven, causing an error in the read/write operation.

One of the conventional methods for preventing the adhesion of the magnetic tape to the magnetic head or preventing the transfer of the groove shape to the magnetic tape is to provide a gap at a central portion of the magnetic head and blow air against the magnetic tape from this gap with an air pump, thereby avoiding the contact between the magnetic tape and the magnetic head. Another conventional method is to perform a reciprocating motion of the magnetic tape by a small distance during a rest period where the read/write operation of the magnetic head is not performed (Japanese Patent Publication No. 57-8533).

In the former method, the air pump, which is expensive and large, is required to avoid the contact between the magnetic tape and the magnetic head, causing a difficulty of reduction in size and cost of the magnetic tape unit. In the latter method, the short-distance reciprocating motion of the magnetic tape is performed usually with a predetermined period, which is set to a constant value irrespective of temperatures in the magnetic tape unit. Accordingly, the following disadvantage occurs. In general, the higher the temperature, the more the adhesion of the magnetic tape to the magnetic head tends to occur. However, if the period of the reciprocating motion is set to a unduly short period in spite of low temperatures, the magnetic tape may be damaged by the reciprocating motion, whereas if the period is set to a long period in spite of high temperatures, the adhesion of the magnetic tape to the magnetic head cannot be prevented.

SUMMARY OF THE INVENTION

It is therefore an object of the present invention to provide a magnetic tape unit which can be reduced in size and cost and can well prevent the adhesion of the magnetic tape to the magnetic head irrespective of temperatures in the tape unit.

In accordance with a first aspect of the present invention, there is provided a magnetic tape unit comprising a magnetic head for reading and writing data from and onto a magnetic tape; driving means for traveling the magnetic tape kept in contact with the magnetic head during a read/write operation of the magnetic head; means for performing a reciprocating motion of the magnetic tape by a small distance with a predetermined period during a rest period where the read/write operation of the magnetic head is not performed; a temperature sensor for detecting a temperature in the vicinity of the magnetic head; and control means for changing the predetermined period of the reciprocating motion according to the temperature detected by the temperature sensor.

In accordance with a second aspect of the present invention, there is provided a magnetic tape unit comprising a magnetic head for reading and writing data from and onto a magnetic tape; driving means for traveling the magnetic tape kept in contact with the magnetic head during a read/write operation of the magnetic head; and control means for changing a tension of the magnetic tape during a rest period where the read/write operation of the magnetic head is not performed.

Preferably, the magnetic tape unit according to the second aspect of the present invention further comprises a temperature sensor for detecting a temperature in the vicinity of the magnetic head, wherein the control means changes the tension according to the temperature detected by the temperature sensor.

In accordance with a third aspect of the present invention, there is provided a magnetic tape Unit comprising a magnetic head for reading and writing data from and onto a magnetic tape; driving means for traveling the magnetic tape kept in contact with the magnetic head during a read/write operation of the magnetic head; a temperature sensor for detecting a temperature in the vicinity of the magnetic head; and means for canceling the contact between the magnetic tape and the magnetic head when the temperature detected by the temperature sensor is higher than or equal to a reference temperature.

According to any one of the first to third aspects of the present invention, the air pump for avoiding the contact between the magnetic tape and the magnetic head is not required, thereby allowing a reduction in size and cost of the tape unit. Furthermore, since the temperature sensor for detecting a temperature in the vicinity of the magnetic head is provided, and various controls are performed according to the temperature detected by the temperature sensor, the adhesion of the magnetic tape to the magnetic head can be well prevented irrespective of temperatures in the tape unit.

As mentioned previously, in the case where the air escaping groove is formed on the magnetic tape contact surface of the magnetic head to make a good contact between the magnetic tape and the magnetic head, the shape of this groove may be transferred to the magnetic tape to make the surface of the magnetic tape uneven, causing an error in the read/write operation. This problem can be prevented by the present invention.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the accompanying drawings.

Figure 1:
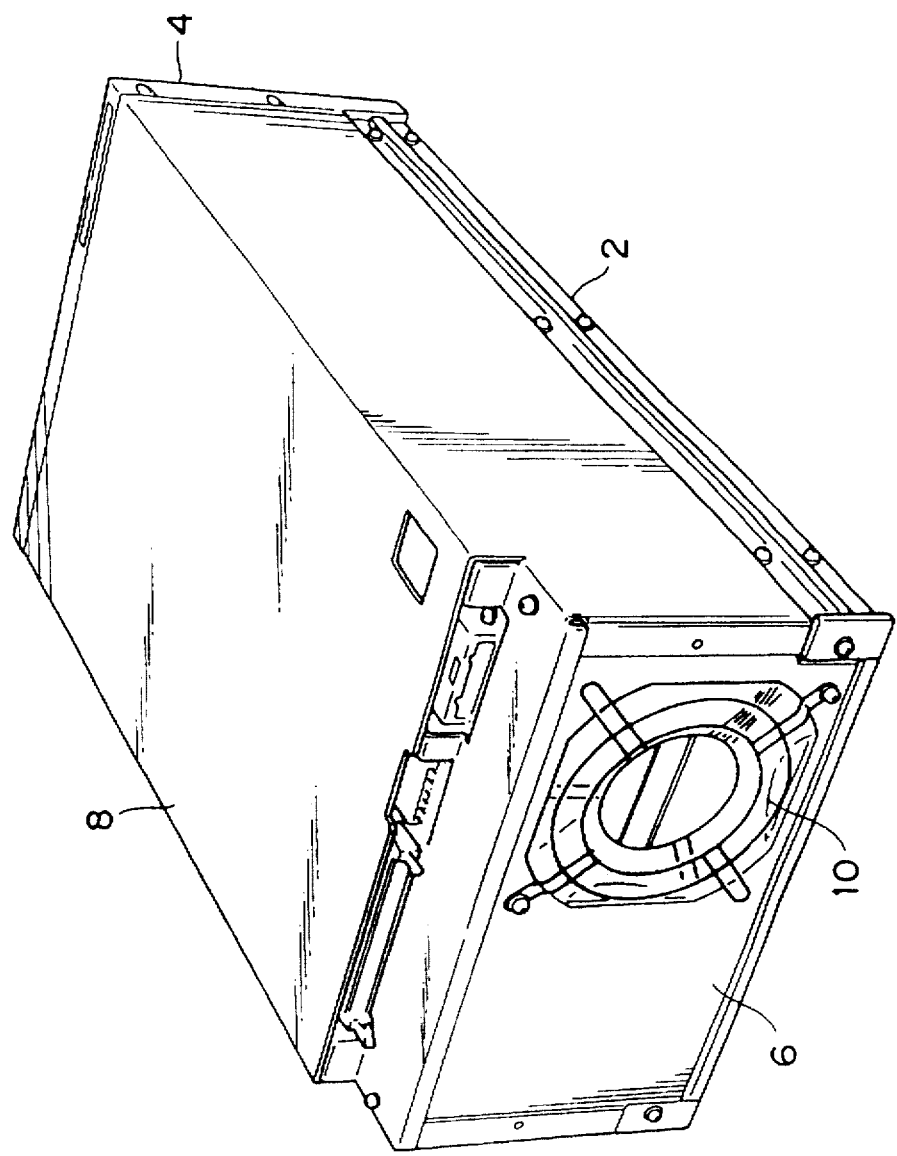
FIG. 1 is a perspective view of a magnetic tape unit as viewed from the rear side thereof according to the first to third aspects of the present invention.

FIG. 1 is a perspective view of a magnetic tape unit to which the first to third aspects of the present invention are applicable, as viewed from the rear side. The magnetic tape unit has a housing comprising a body frame 2, an operator panel 4 fixed to the front end of the body frame 2, a back panel 6 fixed to the rear end of the body frame 2, and a cover 8 removably mounted to these members 2, 4, and 6. The back panel 6 is provided with a fan 10 for ventilating the magnetic tape unit. Drive control of the fan 10 will be described hereinafter in detail.

Figure 2:
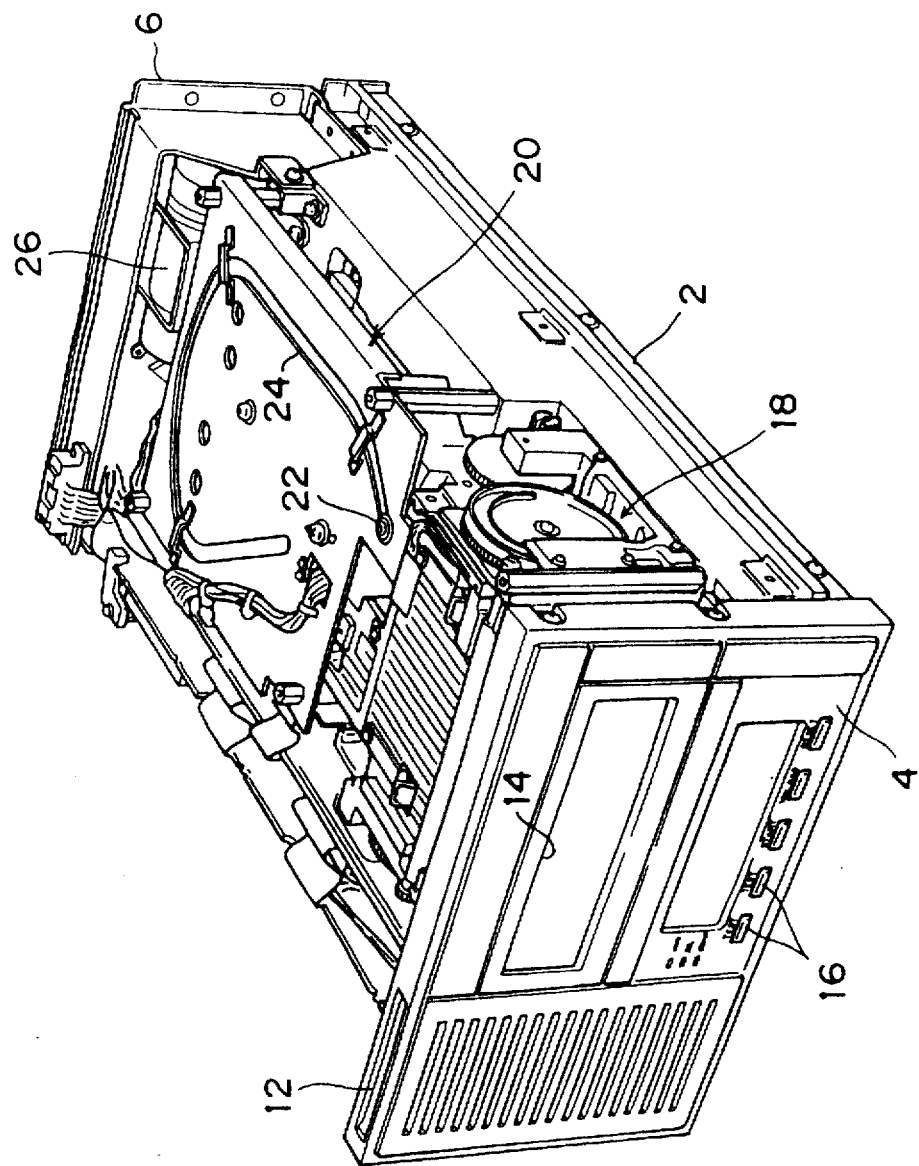
FIG. 2 is a perspective view of the magnetic tape unit as viewed from the front side thereof under the condition where a cover is removed.

FIG. 2 is a perspective view of the magnetic tape unit as viewed from the front side under the condition where the cover 8 (see FIG. 1) is removed. The operator panel 4 is provided with an air filter 12, a magnetic tape cartridge insert opening 14, and various switches 16. Inside the unit, a loader assembly 18 and a threader assembly 20 are provided so as to be arranged in this order from the side of the insert opening 14.

The threader assembly 20 has a pin 22 for engaging a leader block of a magnetic tape cartridge to be hereinafter described. The pin 22 is movable along a slit 24 to guide the leader block. Reference numeral 26 shown between the threader assembly 20 and the back panel 6 denotes an air pump conventionally used to avoid the contact of a magnetic head and a magnetic tape. The air pump 26 is unnecessary in a preferred embodiment of the present invention to be hereinafter described, thereby reducing the size of the tape unit.

Figure 3:
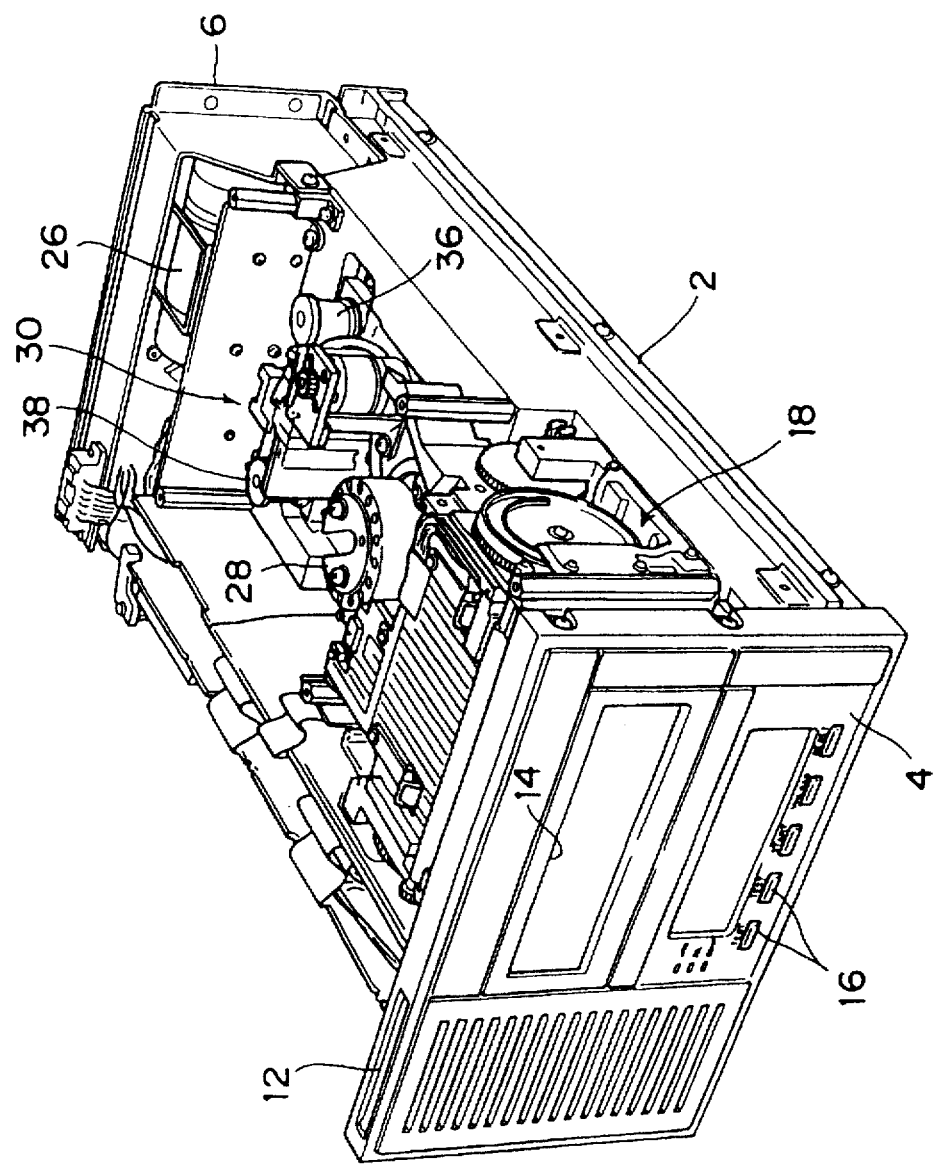
FIG. 3 is a perspective view of the magnetic tape unit as viewed from the front side thereof under the condition where a threader assembly is removed.

FIG. 3 is a perspective view of the magnetic tape unit as similar to FIG. 2 under the condition where the threader assembly 20 is further removed. Under the threader assembly 20, a machine reel 28 and a head assembly 30 are provided so as to be arranged in this order from the side of the loader assembly 18.

Figure 4:
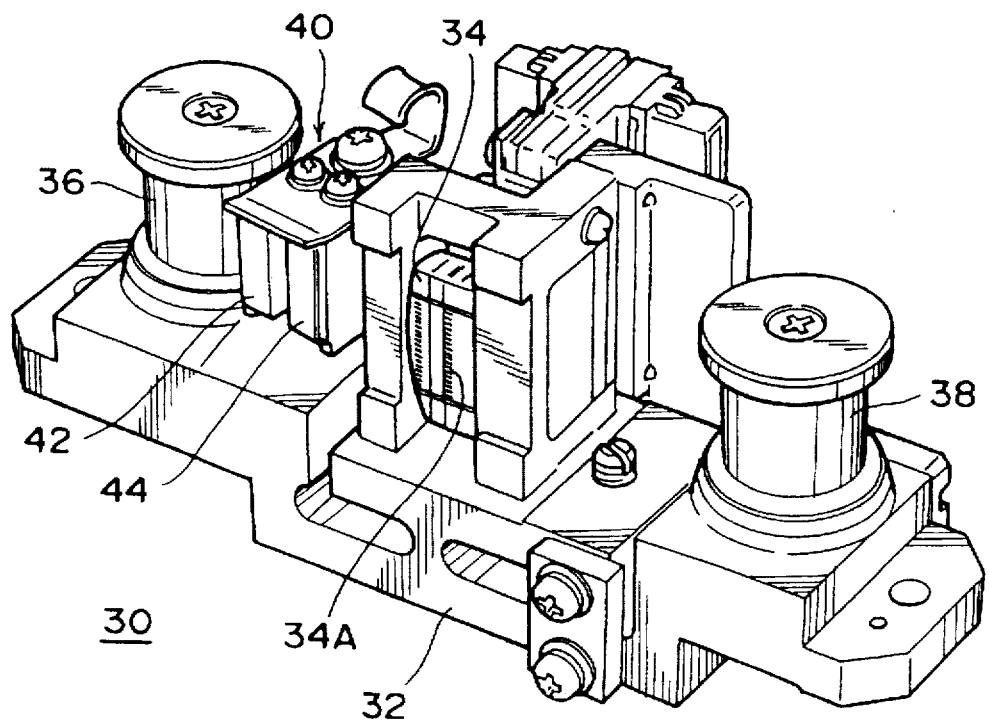
FIG. 4 is a perspective view of a head assembly.

FIG. 4 is a perspective view of the head assembly 30. A magnetic head 34 is fixed to a frame 32 at a substantially central portion thereof. A tape contact surface of the magnetic head 34 is formed with an air escaping groove 34A for maintaining a good contact condition between the magnetic tape and the tape contact surface. A pair of roller guides 36 and 38 are rotatably provided on the frame 32 on the opposite sides of the magnetic head 34 so as to be driven by the travel of the magnetic tape. Further, a tape cleaner 40 is provided between the roller guide 36 and the magnetic head 34. The tape cleaner 40 has two edges 42 and 44 formed of hard metal or the like. During traveling of the magnetic tape, the two edges 42 and 44 come to contact with the magnetic tape at an extremely shallow angle, thereby scraping off dirt sticking to the magnetic tape.

Figure 5:
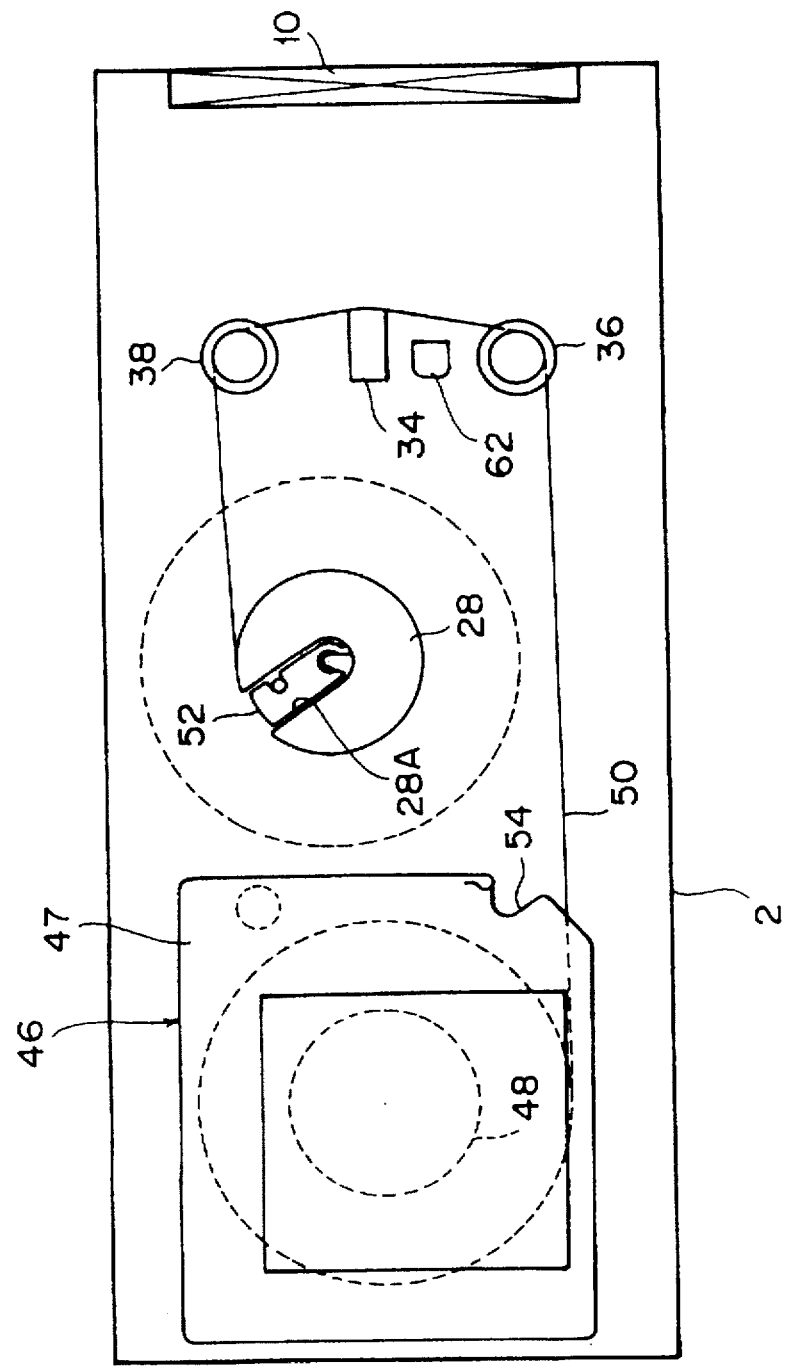
FIG. 5 is a plan view of an essential part of the magnetic tape unit, showing preferred embodiments corresponding to the first and second aspects of the present invention.
Figure 6:
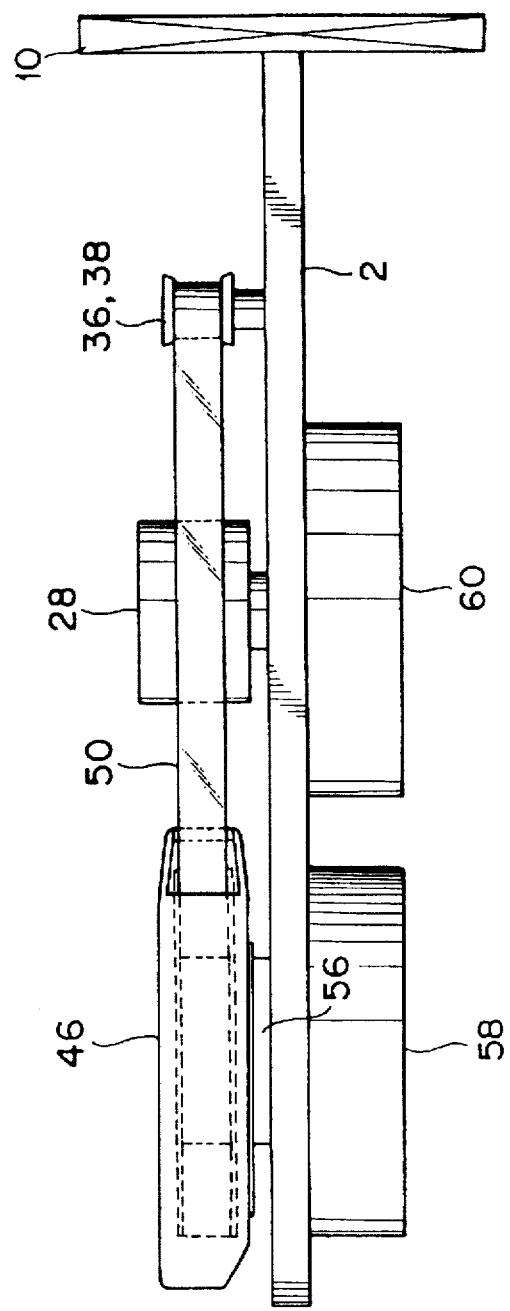
FIG. 6 is a side view of the essential part shown in FIG. 5.

FIG. 5 is a plan view of an essential part of the magnetic tape unit in preferred embodiments corresponding to the first and second aspects of the present invention, and FIG. 6 is a side view of the essential part shown in FIG. 5. Reference numeral 46 denotes a magnetic tape cartridge loaded to be set in a predetermined position inside the tape unit by the loader assembly 18 (see FIG. 3). The cartridge 46 is composed of a cartridge case 47, a hub 48 provided in the cartridge case 47, and a magnetic tape 50 having one end fixed to the hub 48 and the other end provided with a leader block 52. In the condition where the magnetic tape 50 is fully wound around the hub 48, the leader block 52 is seated in a recess 54 formed at one of the four corners of the cartridge case 47.

FIG. 5 shows another condition where the leader block 52 is guided by the pin 22 of the threader assembly 20 (see FIG. 2) and is finally engaged into a recess 28A of the machine reel 28. The hub 48 is engaged with a file reel 56 (see FIG. 6), and the file reel 56 is driven by a file reel motor 58. On the other hand, the machine reel 28 is driven by a machine reel motor 60 which is controlled to be driven independently of the file reel motor 58.

The operation of the threader assembly 20 will now be described with reference to FIGS. 2 and 5. When the magnetic tape cartridge 46 is set to the predetermined position by the loader assembly 18, the pin 22 located at the position shown in FIG. 2 comes into engagement with the leader block 52 seated in the recess 54 of the cartridge case 47.

When the pin 22 is moved along the slit 24 by driving means not shown, the leading end (the leader block 52) of the magnetic tape 50 is accordingly guided along the roller guide 36, the magnetic head 34, and the roller guide 38, and is finally brought into engagement with the recess 28A of the machine reel 28. At this time, the pin 22 comes to the center of rotation of the machine reel 28, so that the pin 22 does not interfere with the rotation of the machine reel 28 during traveling of the magnetic tape 50. In rewinding the magnetic tape 50 around the hub 48 into the cartridge case 47, an unthread operation reverse to the above thread operation is performed. In both the thread operation and the unthread operation, the file reel motor—58 and the machine reel motor 60 are independently controlled to be driven, thereby suitably controlling a traveling speed, tension, etc. of the magnetic tape 50. The drive control of the motors can be performed by an ordinary circuit using a microcomputer or the like, so that the description thereof will be omitted herein.

In FIG. 5, reference numeral 62 denotes a temperature sensor for detecting a temperature inside the tape unit. In this preferred embodiment, the temperature sensor 62 is located in the vicinity of the magnetic head 34. The temperature sensor 62 is located, for example, in the vicinity of the head cleaner 40 or between the magnetic head 34 and the roller guide 38 in the head assembly 30 shown in FIG. 4.

Figure 7:
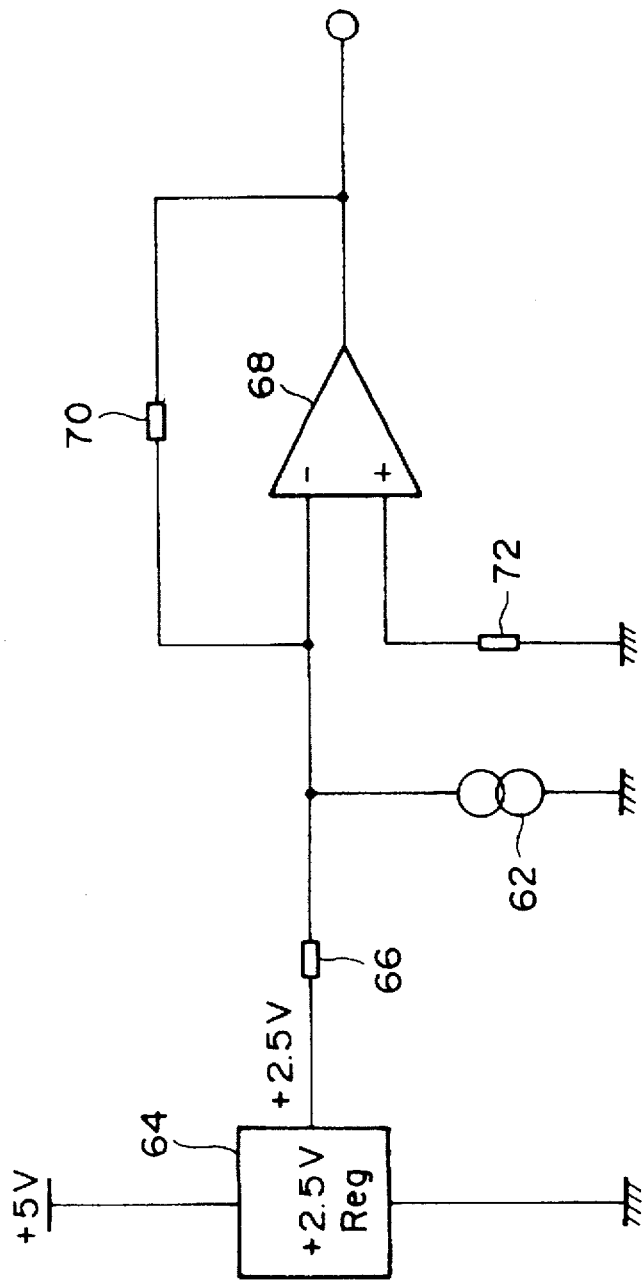
FIG. 7 is a circuit diagram showing the connection of a temperature sensor.

FIG. 7 is a circuit diagram showing the connection of the temperature sensor 62. A regulator 64 has a stable output voltage of 2.5 V in receipt of an input voltage of 5 V, for example. An output port of the regulator 64 is connected to a first terminal of a resistor 66, and a second terminal of the resistor 66 is connected to a first terminal of the temperature sensor 62 and a negative input port of an operational amplifier 68. A second terminal of the temperature sensor 62 is grounded, and a positive input port of the operational amplifier 68 is grounded through a resistor 72. A resistor 70 is connected between the negative input port of the operational amplifier 68 and an output port thereof. In this preferred embodiment, the temperature sensor 62 is designed so that a current flowing therethrough changes with temperature, and the rate of change of the current is 1 fA/K, for example. When a temperature at the temperature sensor 62 changes, the current flowing through the temperature sensor 62 changes accordingly, with the result that a potential at the first terminal of the temperature sensor 62 changes. This change of the potential is output as a voltage signal by the operational amplifier 68. In this manner, information reflecting the temperature detected by the temperature sensor 62 is taken out as a voltage signal, so that a circuit for performing the control according to the detected temperature can be easily constructed by a digital circuit.

Figure 8:
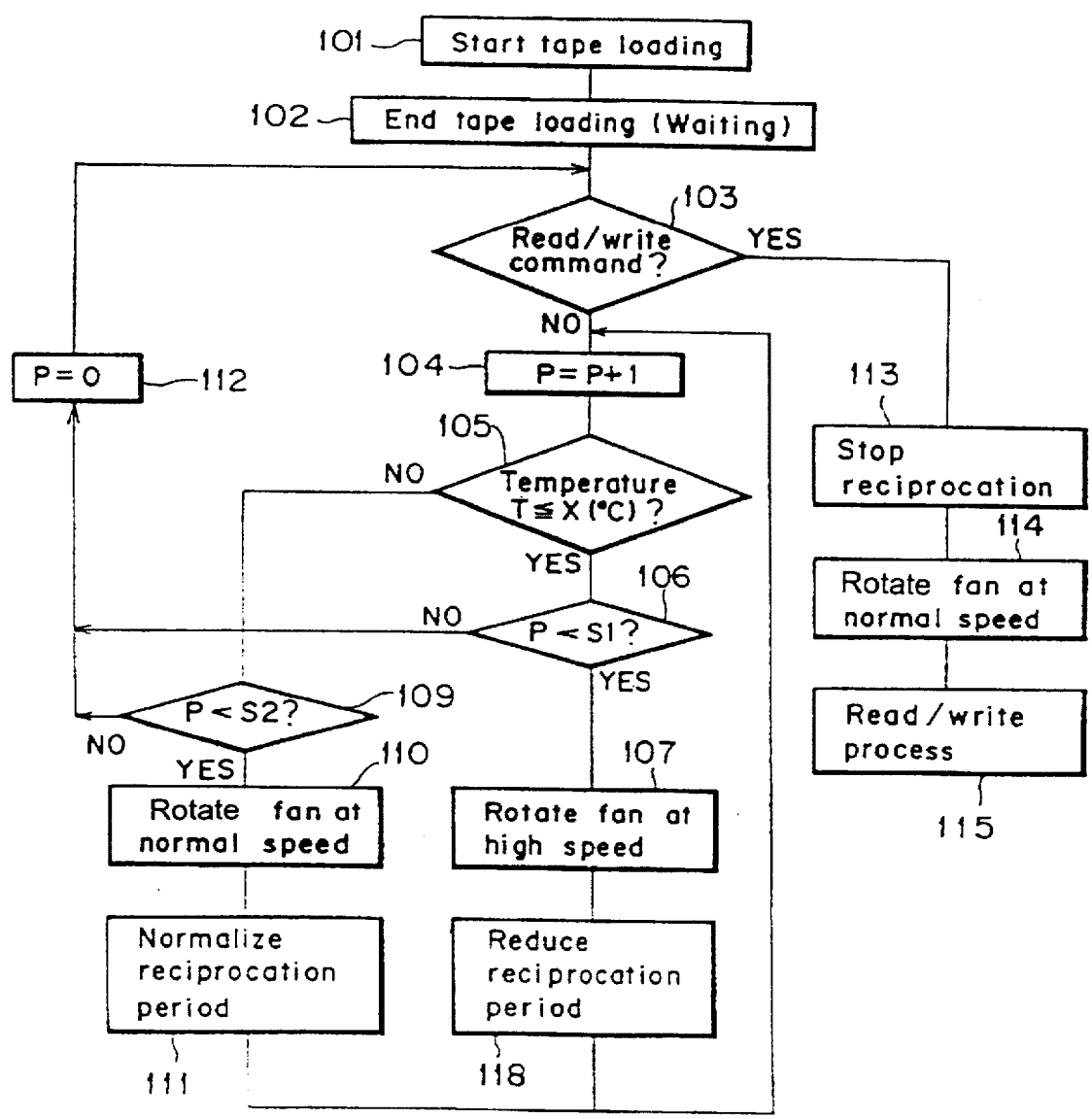
FIG. 8 is a flowchart in the preferred embodiment corresponding to the first aspect of the present invention.

FIG. 8 is a flowchart showing the operation in the preferred embodiment corresponding to the first aspect of the present invention. In this preferred embodiment, the magnetic tape is reciprocatively traveled by a short distance during a rest period where the read/write operation of the magnetic head is not performed. This reciprocating motion of the magnetic tape is performed with a predetermined period, e.g., 5 or 10 minutes. The short distance of the reciprocating motion is set to 30 cm, for example.

In step 101, the loading of the magnetic tape is started. When the completion of the loading of the magnetic tape is confirmed in step 102, the program enters a wait state to proceed to step 103, in which it is determined whether or not a read/write command has been issued. If the read/write command has not been issued, the program enters a routine employing P as a variable. If the read/write command has been issued, the program proceeds to step 113. First, this routine will be described. When it is determined that the read/write command has not been issued and the program proceeds to step 104, 1 is added to the variable P. Then in step 105, a temperature in the vicinity of the magnetic head is detected by the temperature sensor and it is determined whether or not the detected temperature X is higher than or equal to a reference temperature T (e.g., 25×C). If the detected temperature X is higher than or equal to the reference temperature T, the program proceeds to step 106, in which the variable P is compared with S1 (an upper limit of the variable P). If P is smaller than S1, the program proceeds to step 107, in which the rotating speed of the fan is increased to a high speed. Further in step 108, the period of reciprocation of the magnetic tape is reduced. Then, the program returns to step 104.

If P is greater than or equal to S1 in the determination of step 106, the program proceeds to step 112, in which P is reset to 0. Then, the program returns to step 103.

If the detected temperature X is lower than the reference temperature T in the determination of step 105, the program proceeds to step 109, in which the variable P is compared with S2 (an upper limit of the variable P). If P is smaller than S2, the program proceeds to step 110, in which the rotating speed of the fan is restored to a normal speed. Further in step 111, the period of reciprocation of the magnetic tape is normalized. Then, the program returns to step 104. If P is greater than or equal to S2 in the determination of step 109, the program proceeds to step 112, in which P is reset to 0. Then, the program returns to step 103. If the read/write command has been issued in the determined of step 103, the program proceeds to step 113, in which the reciprocation of the magnetic tape is stopped. Then in step 114, the rotating speed of the fan is restored to the normal speed, and in step 115, a read/write process is executed. The variables S1 and S2 are values for deciding a running speed of the routine in the flowchart mentioned above.

Figure 9:
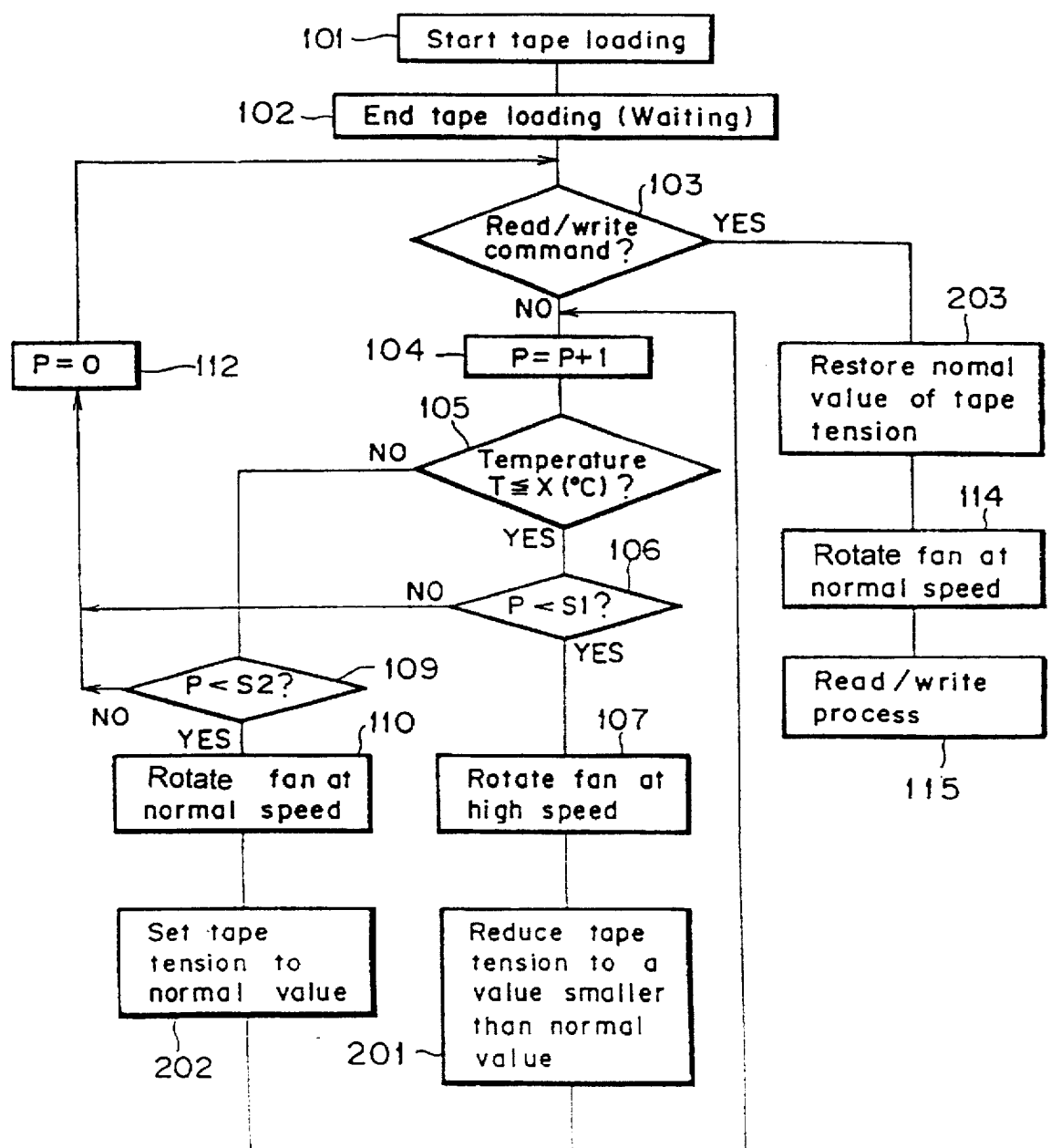
FIG. 9 is a flowchart in the preferred embodiment corresponding to the second aspect of the present invention.

FIG. 9 is a flowchart showing the operation of the preferred embodiment corresponding to the second aspect of the present invention. This preferred embodiment adopts means for changing the tension of the magnetic tape according to a temperature detected by the temperature sensor during a rest period where the read/write operation of the magnetic head is not performed.

The processes of steps 101 to 107, 109, 110, 112, 114, and 115 are similar to those in the preferred embodiment shown in FIG. 8, and the repeated description thereof will then be omitted. In this preferred embodiment, if the detected temperature X by the temperature sensor is higher than or equal to the reference temperature T, a set value of the tension of the magnetic tape is reduced in step 201 instead of step 108 where the reciprocation period is reduced, whereas if the detected temperature X by the temperature sensor is lower than the reference temperature T, the set value of the tension of the magnetic tape is normalized in step 202 instead of step 111 where the reciprocation period is normalized. The normal value of the tension of the magnetic tape is 200 g, for example, in this preferred embodiment. The tension of the magnetic tape can be controlled by controlling driving currents to be supplied to the file reel motor 58 and the machine reel motor 60. Further, if a read/write command has been issued, the set value of the tension of the magnetic tape is restored to the normal value in step 203 instead of step 113 where the reciprocation of the magnetic tape is stopped.

Figure 10:
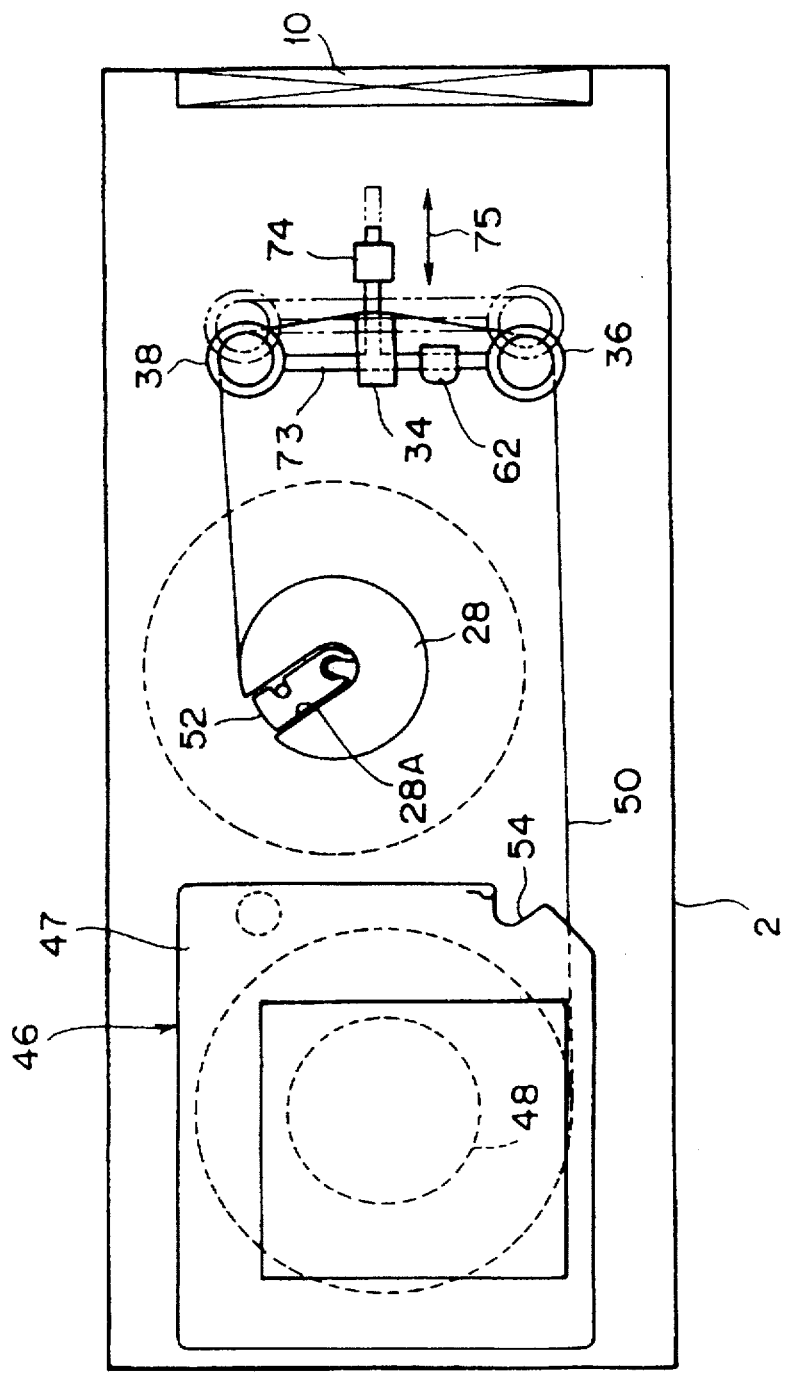
FIG. 10 is a plan view of an essential part of the magnetic tape unit, showing a preferred embodiment corresponding to the third aspect of the present invention.

FIG. 10 is a plan view of an essential part of the magnetic tape unit showing a preferred embodiment corresponding to the third aspect of the present invention. In this preferred embodiment, the roller guides 36 and 38 are supported by a movable frame 73, and the movable frame 73 can be moved by a solenoid 74 in opposite directions shown by a double-headed arrow 75. When the roller guides 36 and 38 and the movable frame 72 are located at a relatively left position shown by a solid line in FIG. 10, the magnetic tape 50 is allowed to travel in contact with the magnetic head 34. On the other hand, when the roller guides 36 and 38 and the movable frame 72 is located at a relatively right position shown by a phantom line in FIG. 10, the magnetic tape 50 is allowed to travel in noncontact with the magnetic head 34. The position shown by the solid line will be hereinafter referred to as a normal position.

Figure 11:
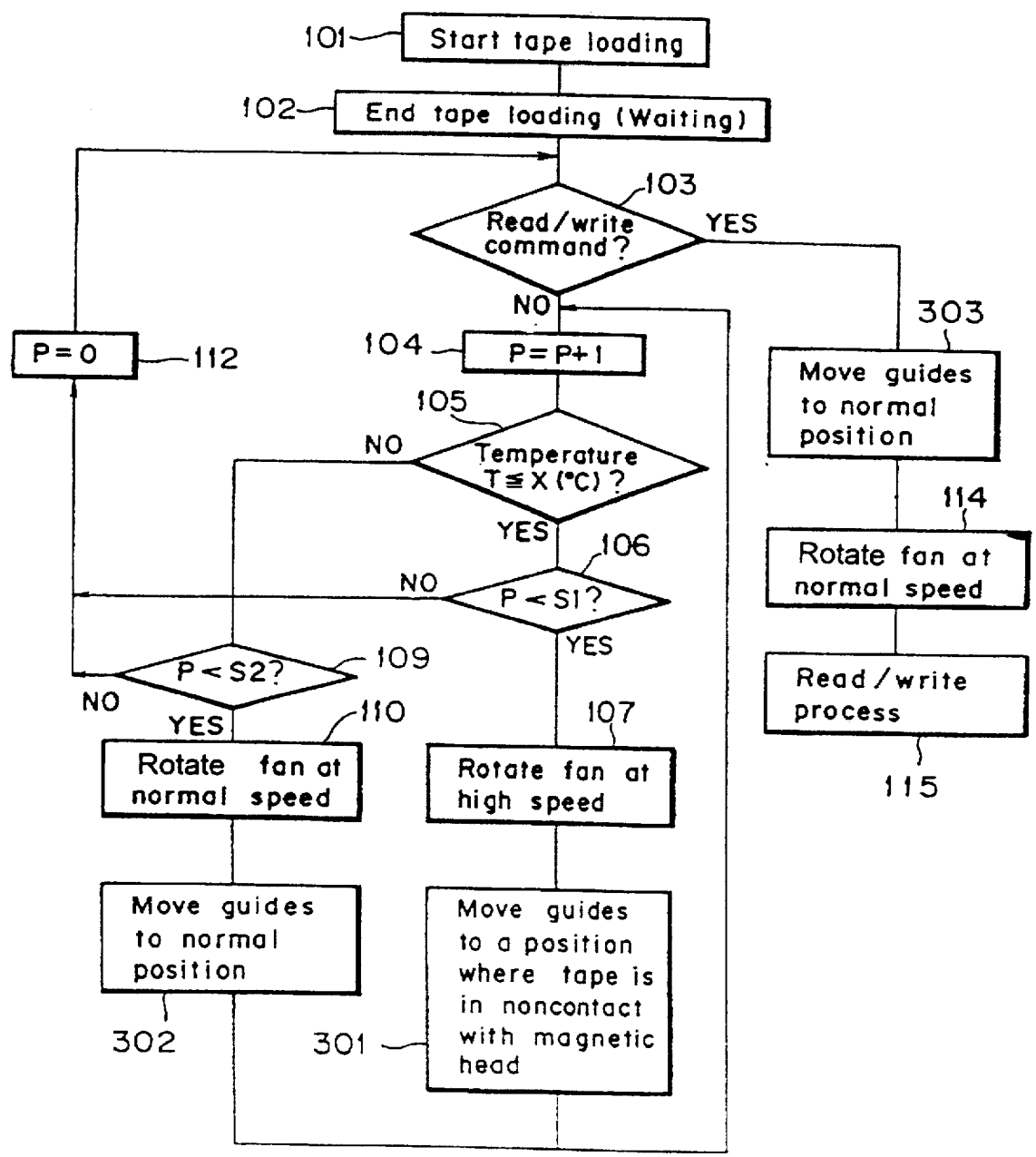
FIG. 11 is a flowchart in the preferred embodiment corresponding to the third aspect of the present invention.

FIG. 11 is a flowchart showing the operation of the preferred embodiment shown in FIG. 10 corresponding to the third aspect of the present invention. In this preferred embodiment, the routine in the case where the read/write command has not been issued (step 103) is as follows:

If the detected temperature X by the temperature sensor is higher than or equal to the reference temperature T (step 105), the rotating speed of the fan is increased to a high speed (step 107), and then the solenoid 74 (see FIG. 10) is operated to move the roller guides 36 and 38 to the position where the magnetic tape 50 is in noncontact with the magnetic head 34 (step 301). On the other hand, if the detected temperature X by the temperature sensor is lower than the reference temperature T, the rotating speed of the fan is restored to the normal speed (step 110), and then the roller guides 36 and 38 are moved to the normal position (step 302).

If the read/write command has been issued (step 103), the roller guides 36 and 38 are moved to the normal position (step 303), and then the rotating speed of the fan is restored to the normal speed (step 114). Then, a read/write process is executed (step 115).

Figure 12:
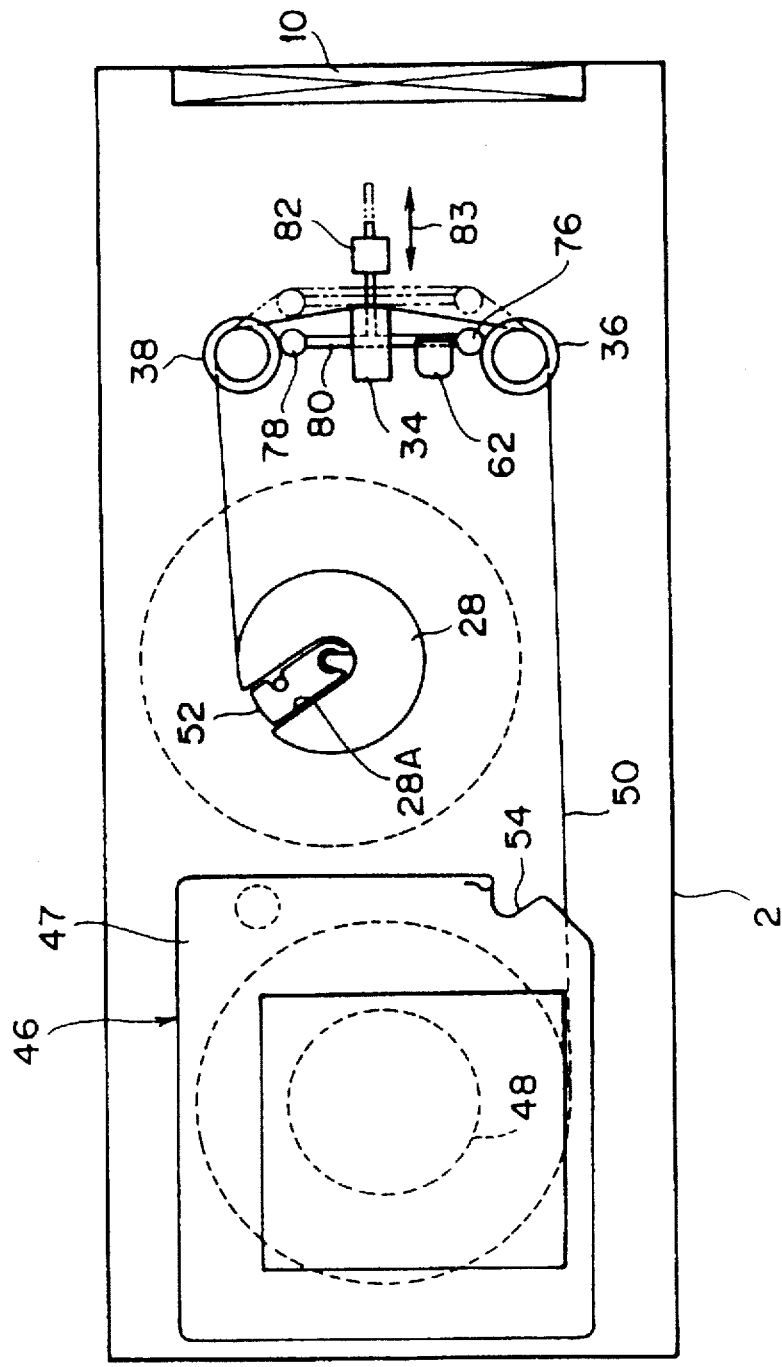
FIG. 12 is a plan view of an essential part of the magnetic tape unit, showing another preferred embodiment corresponding to the third aspect of the present invention.

FIG. 12 is a plan view of an essential part of the magnetic tape unit in another preferred embodiment corresponding to the third aspect of the present invention. In this preferred embodiment, a pair of pins 76 and 78 are provided along a travel path of the magnetic tape 50 between the roller guides 36 and 38. The pins 76 and 78 are fixed to a movable frame 80, and the movable frame 80 can be moved by a solenoid 82 in opposite directions shown by a double-headed arrow 83. When the pins 76 and 78 are located at a relatively left position (normal position) shown by a solid line in FIG. 12, the pins 76 and 78 are kept in noncontact with the magnetic tape 50, and the magnetic tape 50 is kept in contact with the magnetic head 34. On the other hand, when the pins 76 and 78 are moved to a relatively right position shown by a phantom line in FIG. 12, the magnetic tape 50 between the roller guides 36 and 38 is urged by the pins 76 and 78 to move rightward as viewed in FIG. 12, thereby canceling the contact of the magnetic tape 50 with the magnetic head 34.

Figure 13:
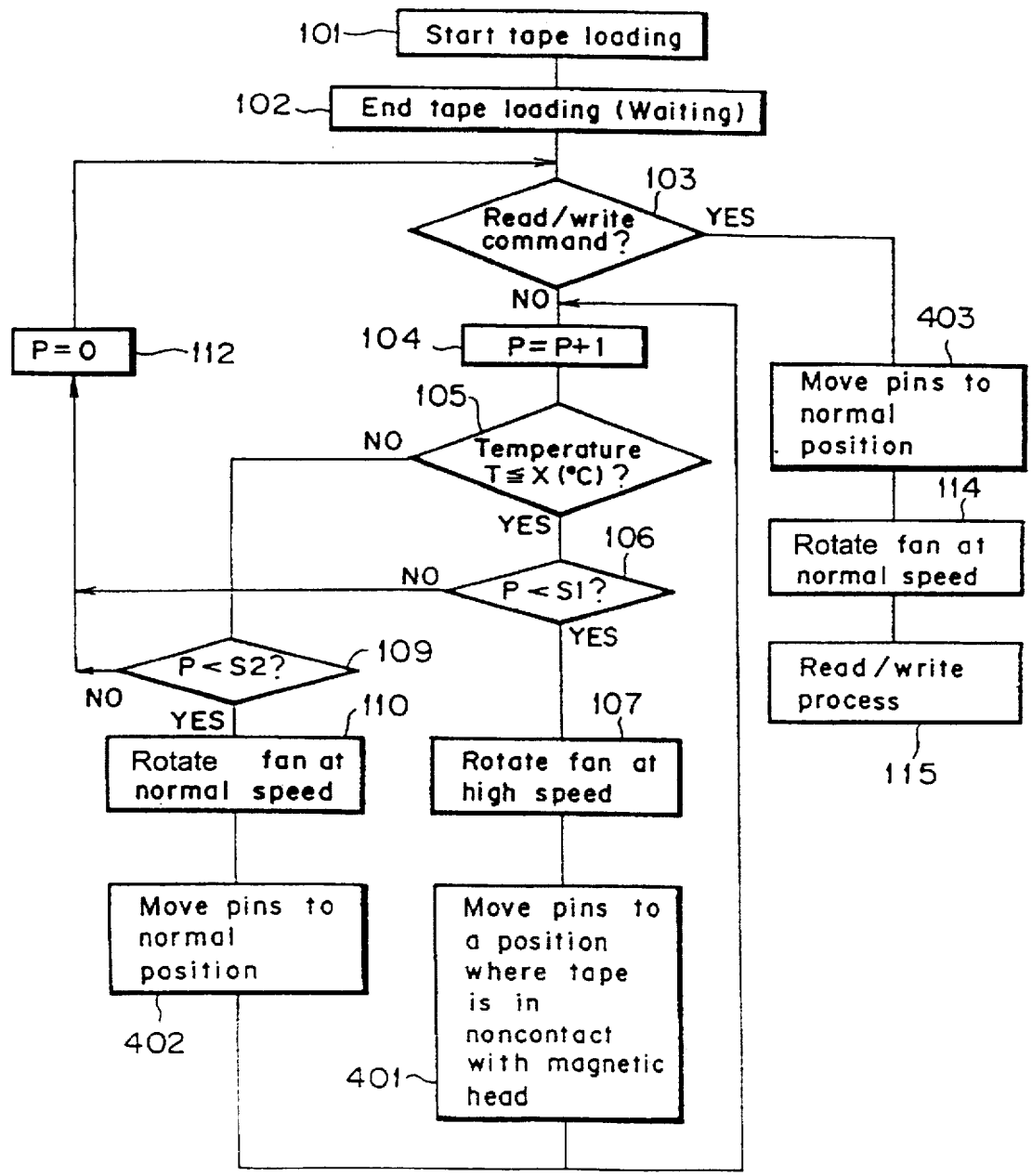
FIG. 13 is a flowchart in the other preferred embodiment corresponding to the third aspect of the present invention.

FIG. 13 is a flowchart showing the operation of the preferred embodiment shown in FIG. 12 corresponding to the third aspect of the present invention. The routine in the case where the read/write command has not been issued (step 103) is as follows:

If the detected temperature X by the temperature sensor is higher than or equal to the reference temperature T (step 105), the rotating speed of the fan is increased to a high speed (step 107), and then the solenoid 82 is operated to move the pins 76 and 78 to the position where the magnetic tape 50 is noncontact with the magnetic head 34 (step 401). If the detected temperature X by the temperature sensor is lower than the reference temperature T (step 105), the rotating speed of the fan is restored to a normal speed (step 110), and then the pins 76 and 78 are moved to the normal position (step 402).

If the read/write command has been issued (step 103), the pins 76 and 78 are moved to the normal position (step 403), and then the rotating speed of the fan is restored to the normal speed (step 114). Then, a read/write process is executed (step 115).

Figure 14:
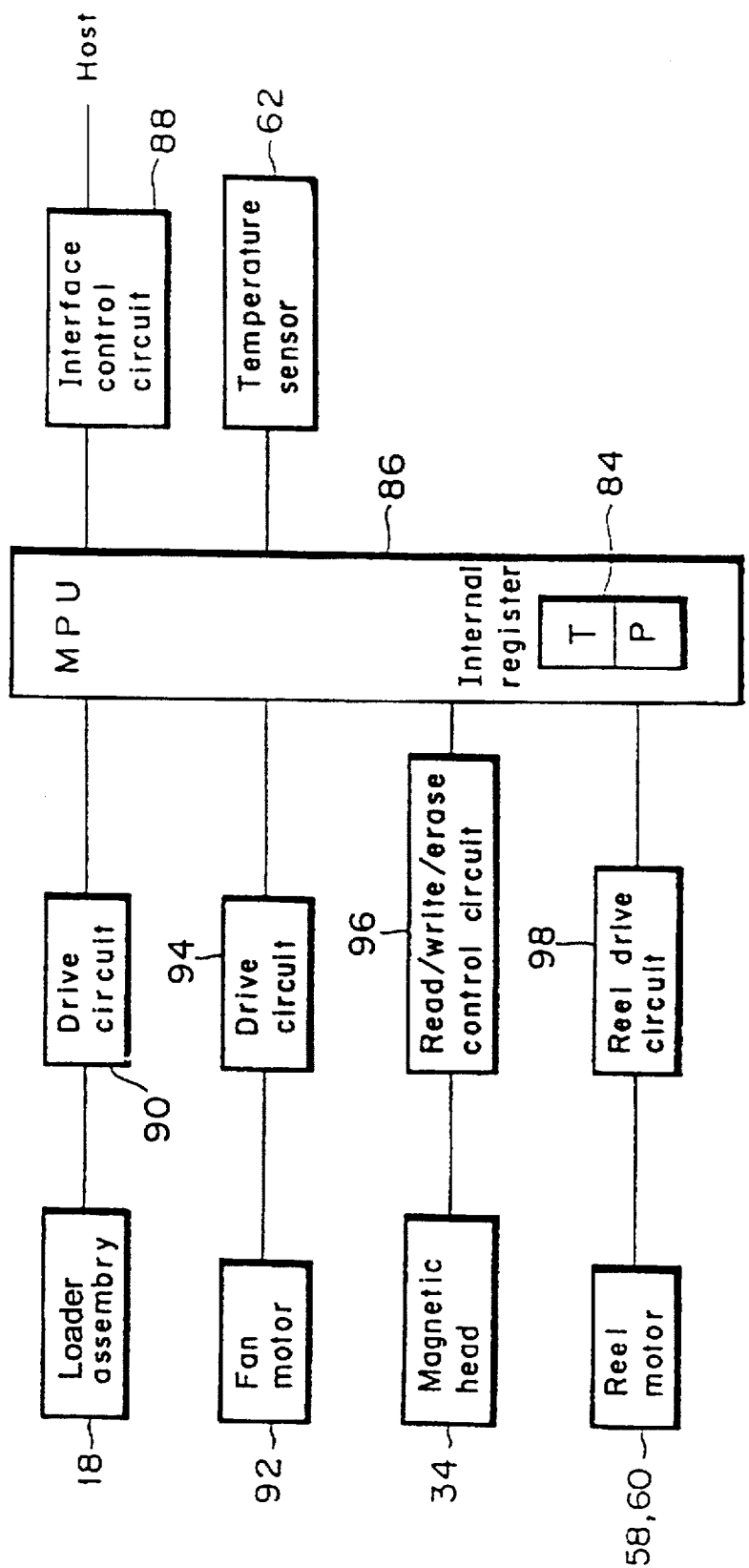
FIG. 14 is a block diagram showing hardware in the preferred embodiments corresponding to the first to third aspects of the present invention.

FIG. 14 shows a configuration of hardware for performing the operations shown by the flowcharts mentioned above. An MPU (microprocessor unit) 86 having an internal register 84 for storing the detected temperature data and the program contents is connected through an interface control circuit 88 to a host computer not shown. The detected temperature data from the temperature sensor 62 is supplied to the MPU 86.

The results of computation according to the various programs are supplied from the MPU 86 to a drive circuit 90 for the loader assembly, a drive circuit 94 for a fan motor 92 for driving the fan 10, a read/write/erase control circuit 96 for controlling the magnetic head 34, and a drive circuit 98 for the reel motors 58 and 60.

According to the first, second, or third aspect of the present invention, the size and cost of the magnetic tape unit can be reduced, and the adhesion of the magnetic tape to the magnetic head can be well prevented irrespective of temperatures in the tape unit. Further, even in the case that an air escaping groove is formed on the tape contact surface of the magnetic head to make a good contact of the magnetic tape with the magnetic head, the transfer of the shape of the air escaping groove to the magnetic tape can be prevented to thereby eliminate the possibility of error in the read/write operation.

Figure 15A:
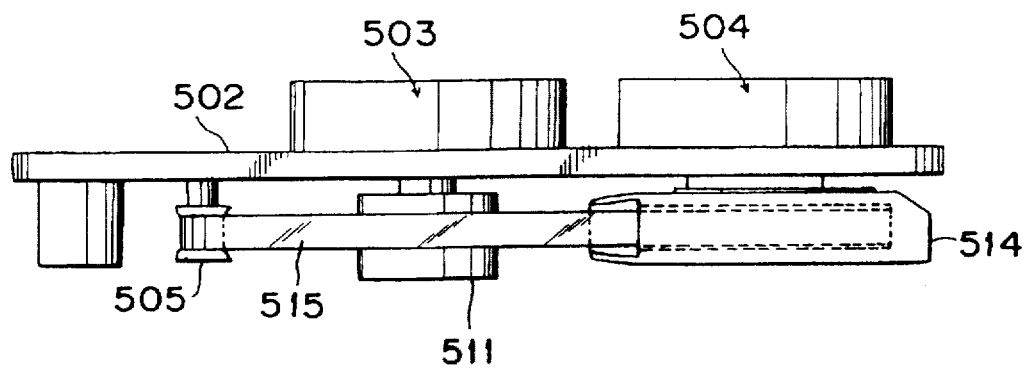
FIGS. 15A and 15B are a side view and a plan view, respectively, of an internal structure of a first prior art magnetic tape unit.

A first prior art magnetic tape unit in relation to the fourth to sixth aspects of the present invention will now be described with reference to FIGS. 15A and 15B, and a second prior art magnetic tape unit in relation to the seventh aspect of the present invention will next be described with reference to FIGS. 16 to 19. In FIGS. 15A to 19, there are shown a base 502, a machine reel motor 503, a file reel motor 504, a pair of guide rollers 505, a magnetic head 506, an air pump 507, a lifter solenoid 508, a machine reel 511, a file reel 512, a magnetic tape cartridge 514, a magnetic tape 515, a tape threading arm 518, a driving arm 519, a threader motor 520, a leader block 521, a first position sensor 522, a home position sensor 523, and a second position sensor 524.

(Description of the first prior art magnetic tape unit)

Figure 15B:
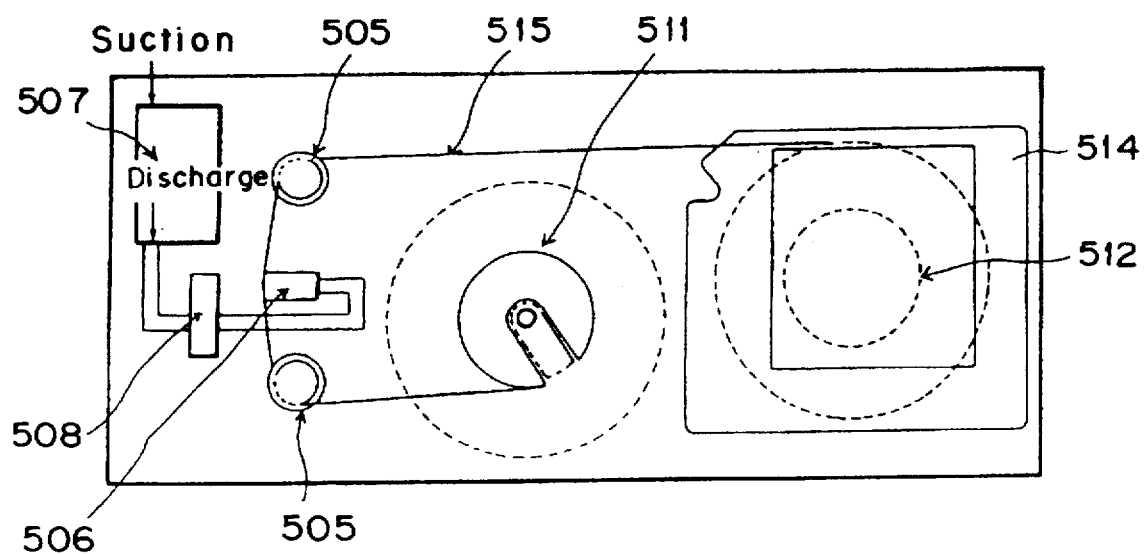

FIG. 15A is a side view of the internal structure of the first prior art magnetic tape unit, and FIG. 15B is a plan view of FIG. 15A. As shown in FIGS. 15A and 15B, the base 502 inside the magnetic tape unit is provided with the machine reel motor 503, the file reel motor 504, the guide rollers 505, the magnetic head 506, the air pump 507, and the lifter solenoid (electromagnetic valve) 508. The machine reel 511 is fixed to the machine reel motor 503, and the file reel 512 of the magnetic tape cartridge 514 is adapted to engage with the file reel motor 504. The tape contact surface of the magnetic head 506 is formed with an air escaping groove for making a good contact of the magnetic tape 515 with the magnetic head 506. Furthermore, the central portion of the magnetic head 506 is formed with a gap for blowing against the magnetic tape 515 the air supplied from the air pump 507.

In loading the magnetic tape 515 after inserting the magnetic tape cartridge 514 into the magnetic tape unit, the magnetic tape 515 is drawn from the magnetic tape cartridge 514, then passed over the guide rollers 505 and the magnetic head 506, and finally wound around the machine reel 511. In this condition, the machine reel motor 503 or the file reel motor 504 is driven to travel the magnetic tape 515, thereby performing read/write of signals.

In waiting for the read/write operation after the magnetic tape loading, the magnetic tape 515 is in contact with the magnetic head 506. In the case where the waiting time is long, the use environment of the tape unit is high temperature/high humidity, or the surface of the magnetic tape 515 is worn by the travel, the magnetic tape 515 is prone to adhere to the magnetic head 506. Further, in the case where the air escaping groove is formed on the tape contact surface of the magnetic head 506 to make a good contact of the magnetic tape 515 and the magnetic head 506, the shape of the air escaping groove of the magnetic head 506 is transferred to the magnetic tape 515 after a long waiting time to make the surface of the magnetic tape 515 uneven, causing an error in the read/write operation of signals.

To cope with this problem, the first prior art magnetic tape unit employs the air pump 507 for supplying air through an air passage adapted to be selected by the lifter solenoid 508 as an electromagnetic valve to the gap formed at the central portion of the magnetic head 506. Accordingly, the air supplied from the air pump 507 is blown from the gap onto the magnetic tape 515, thereby avoiding the contact of the magnetic tape 515 and the magnetic head 506. As a result, the adhesion of the magnetic tape 515 to the magnetic head 506 is prevented, and the transfer of the shape of the air escaping groove of the magnetic head 506 to the magnetic tape 515 is prevented.

(Description of the second prior art magnetic tape unit)

Figure 16:
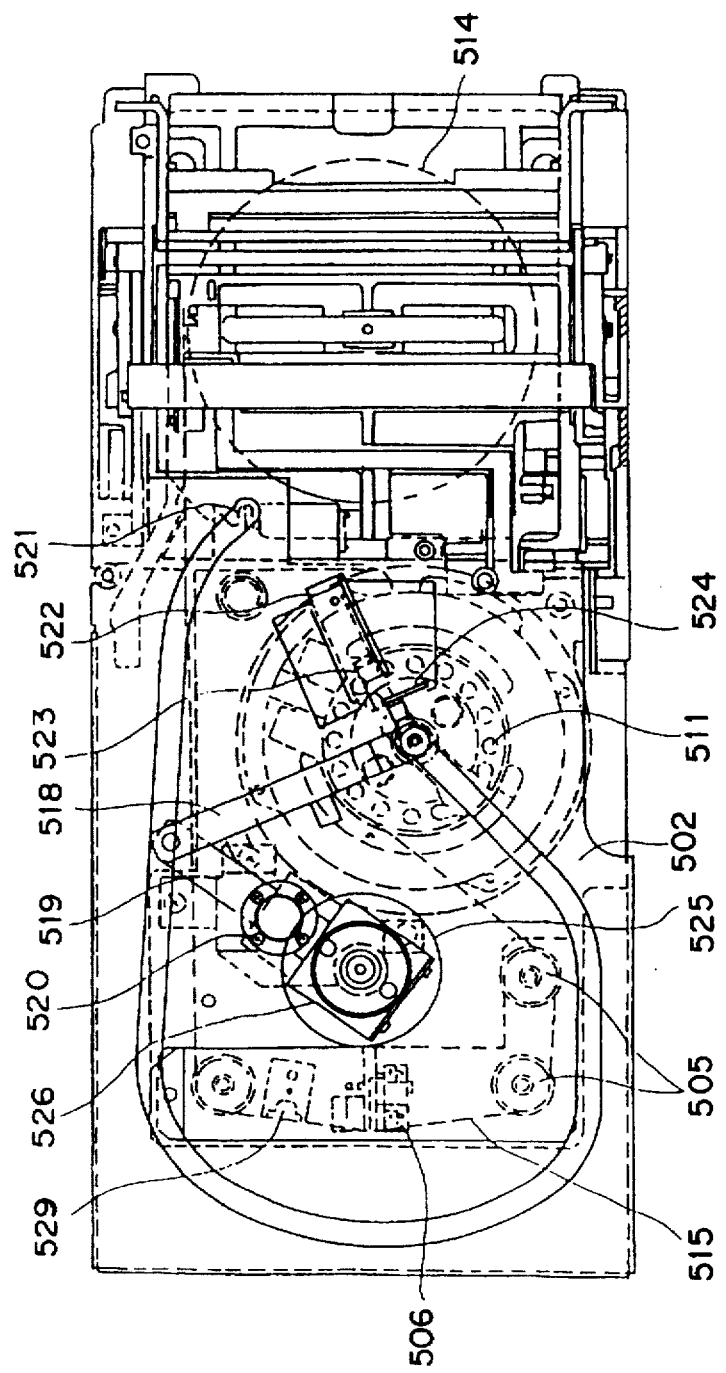
FIG. 16 is a plan view of an internal structure of a second prior art magnetic tape unit.
Figure 17:
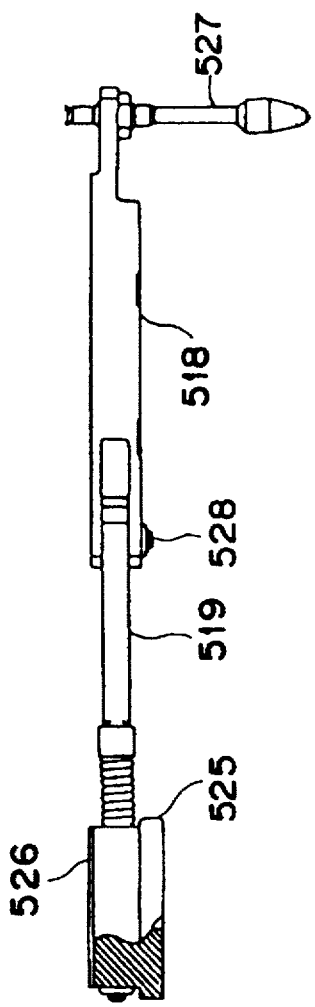
FIG. 17 is a side view of a tape threader component in the second prior art magnetic tape unit.

[I] Description of a tape thread mechanism (threader assembly) (FIGS. 16 and 17)

FIG. 16 shows the internal structure of the second prior art magnetic tape unit, and FIG. 17 shows a tape thread mechanism component in the second prior art magnetic tape unit. The tape thread mechanism for threading the magnetic tape 515 inside the magnetic tape unit is provided with the tape threading arm 518, the driving arm 519, the threader motor 520, the first position sensor 522, the home position sensor 523, the second position sensor 524, and a support block 526.

One end of the tape threading arm 518 and one end of the driving arm 519 are pivotably connected together by a shaft 528. The other end of the driving arm 519 is fixed to the support block 526. The other end (free end) of the tape threading arm 518 is provided with a threader pin 527 for catching the leader block 521 of the magnetic tape 515. The support block 526 is integrally formed with a gear 525, and they are rotatable together. A driving force from the threader motor 520 is transmitted to the gear 525 to rotate the gear 525 and accordingly rotate the support block 526 together. The rotation of the support block 526 causes movement of the driving arm 519 and the tape threading arm 518.

[II] Description of the operation of the tape thread mechanism (FIGS. 16 and 17)

In performing the tape loading by drawing the magnetic tape 515 from the magnetic tape cartridge 514 inserted in the magnetic tape unit, the threader pin 527 is brought into engagement with the leader block 521 of the magnetic tape 515, and the driving arm 519 is moved by the driving force from the threader motor 520. Accordingly, the magnetic tape 515 is carried by the tape threading arm 518 through the magnetic head 516 to the machine reel 511. Then, the leader block 521 is inserted into the machine reel 511 and fixed thereto, thereby fixing a leading end of the magnetic tape 515 to the machine reel 511. Then, the machine reel motor 503 is driven to rotate the machine reel 511, thereby sequentially winding the magnetic tape 515 around the machine reel 511.

In ejecting the magnetic tape cartridge 514 from the magnetic tape unit, it is necessary to perform tape unloading in advance such that the magnetic tape 515 wound around the machine reel 511 is unwound to be rewound around the file reel 512 of the magnetic tape cartridge 514. More specifically, the file reel motor 514 is driven to rewind the magnetic tape 515 around the file reel 512. When the magnetic tape 515 on the machine reel 511 is unwound to a tape end, the threader motor 520 is rotated to move the driving arm 519 and accordingly move the threader pin 527 provided on the tape threading arm 518. That is, the leader block 521 is disengaged from the machine reel 511 and is then carried by the threader pin 527 to the magnetic tape cartridge 514. After the leader block 521 of the magnetic tape 515 is stored into the magnetic tape cartridge 514, the threader pin 527 is removed from the leader block 521. In this condition, the magnetic tape cartridge 514 can be ejected.

In the above operation, the timing of moving the driving arm 519 and the tape threading arm 518, that is, the tape end of the magnetic tape 515 rewound from the machine reel 511 is recognized by the following method. After completing the rewinding of the magnetic tape 515 around the file reel 512 in the magnetic tape cartridge 514 with a constant tension maintained, the file reel 512 is locked with the leader block of the magnetic tape 515 fixed to the machine reel 511. Thereafter, the machine reel motor 503 is driven to rotate the machine reel 511 in the same direction as the rewinding direction of the file reel 512 (overrun of the machine reel 511), with the result that the magnetic tape 515 is wound around the machine reel 511 in the reverse direction, and the file reel 512 in the magnetic tape cartridge 514 is rotated in the reverse direction. The change from the normal direction to the reverse direction of the file reel 512 is detected by a tachosensor, thereby recognizing the tape end of the magnetic tape 515.

The tape thread mechanism has the three sensors 522, 523, and 524. The second position sensor 524 is provided on the side of the machine reel 511, and the first position sensor 522 and the home position sensor 523 are provided on the side of the magnetic tape cartridge 514 (detecting positions on the side of the file reel 512). The second position sensor 524 is used to detect that the leader block 521 carried by the tape threading arm 518 has been inserted into the machine reel 511. The home position sensor 523 is used to detect that the threader pin 527 is located at a home position where the leader block 521 is normally stored in the magnetic tape cartridge 514. The first position sensor 522 is used to detect that the threader pin 527 is located at a position where the leader block 521 is forced to overrun from the home position by about 2 mm for the purpose of surely storing into the magnetic tape cartridge 514.

Figure 18:
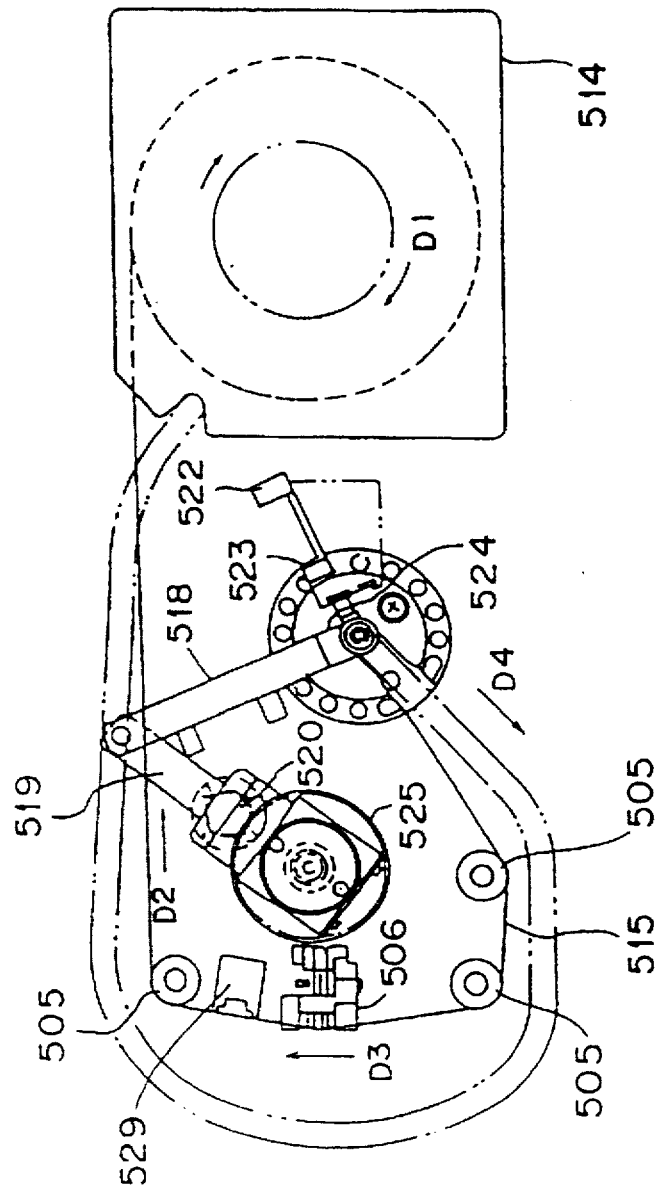
FIGS. 18 and 19 are plan views illustrating the operation in the second prior art magnetic tape unit.
Figure 19:
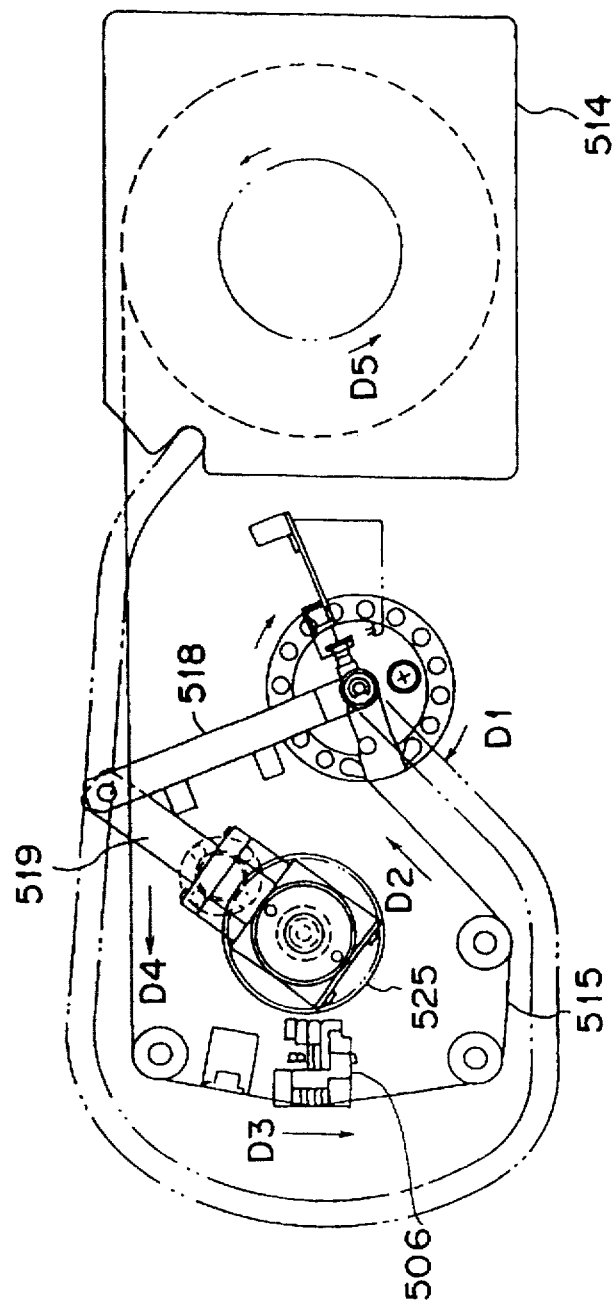

[III] Description of the operation in ejecting the magnetic tape cartridge (FIGS. 18 and 19)

FIGS. 18 and 19 show the first and second stages of the tape unloading operation, respectively, in the second prior art magnetic tape unit. In FIGS. 18 and 19, D1 to D5 denote the order of transmission of the tension applied to the magnetic tape. In ejecting the magnetic tape cartridge 514 from the magnetic tape unit, it is necessary to perform the tape unloading operation in advance in such a manner that the magnetic tape 515 is rewound around the file reel in the magnetic tape cartridge 514. The first stage of this operation is that the magnetic tape 515 is rewound around the file reel in the magnetic tape cartridge 514 under a constant tension (see FIG. 18). When the rewinding of the magnetic tape 515 around the file reel is completed, the file reel is locked with the leader block of the magnetic tape 515 fixed to the machine reel 511. The next or second stage of the tape unloading operation is that the machine reel 511 is further rotated in the same direction as the rewinding direction of the file reel (overrun of the machine reel 511) to thereby wind the magnetic tape in the reverse direction, thus reversely rotating the file reel (see FIG. 19). In the operation shown in FIGS. 18 and 19, the tension applied to the magnetic tape is transmitted in the order of D1 to D5. Even when the magnetic tape 515 is rewound around the file reel to the tape end, the tape threading arm 518 and the driving arm 519 are kept locked by the threader motor 520 to maintain the leader block in the machine reel 511. Accordingly, the second position sensor 524 remains in its on-state (arm detecting condition).

In this prior art, the completion of the tape rewinding around the file reel is detected by making the machine reel 511 overrun to reversely rotate the file reel, and detecting the change from the normal rotation to the reverse rotation of the file reel by means of the tachosensor provided on the file reel side. However, there is a possibility that an end portion of the magnetic tape 515 may stick to the machine reel 511 and remain on it. Accordingly, the completion of the take rewinding may be erroneously detected. If the unthreading operation of the magnetic tape 515 is performed in such an erroneous condition, the magnetic tape 515 may be greatly damaged, e.g., cut.

In summary, the first and second prior art magnetic tape units have the following problems.

(1) In waiting for the read/write operation after the magnetic tape loading, the magnetic tape remains in contact with the magnetic head. In the case where the waiting time is long, the use environment of the tape unit is high temperature/high humidity, or the surface of the magnetic tape is worn by the travel, the magnetic tape is prone to adhere to the magnetic head, causing the possibility of damage to the magnetic tape. Further, in the case where the air escaping groove is formed on the tape contact surface of the magnetic head to make a good contact of the magnetic tape with the magnetic head, the shape of the air escaping groove of the magnetic head is transferred to the magnetic tape after a long waiting time to make the surface of the magnetic tape uneven, thus damaging the magnetic tape. Such a damage to the magnetic tape causes an error in the read/write operation of signals.

(2) In the first prior art magnetic tape unit shown in FIGS. 15A and 15B, the air pump and the lifter solenoid are mounted to prevent the adhesion of the magnetic tape to the magnetic head and the transfer of the shape of the air escaping groove of the magnetic head to the magnetic tape. However, an air pump is generally large and expensive. Accordingly, such a large and expensive air pump is hard to mount in response to recent trends of reducing the size and cost of a magnetic tape unit. As a result, it is difficult to eliminate the damage to the magnetic tape.

(3) In the second prior art magnetic tape unit shown in FIGS. 16 to 19, the machine reel is intentionally rotated to overrun in order to detect a tape end in rewinding the magnetic tape. Accordingly, excess time is required prior to ejection of the magnetic tape cartridge. Further, excess tension is applied to the magnetic tape at the time the two reels change in direction of rotation, so that the magnetic tape is strongly pressed on the magnetic head, causing a damage to the magnetic tape.

(4) In the second prior art magnetic tape unit, the arm position sensor is divided into two systems on the machine reel side and the file reel side. Accordingly, two printed circuit boards for respectively mounting the two systems are required, causing an increase in cost.

It is therefore an object of the fourth to sixth aspects of the present invention to prevent the damage to the magnetic tape and thereby improve the reliability of the tape unit.

It is an object of the seventh aspect of the present invention to achieve a reduction in size and cost of the magnetic tape unit by reducing the number of parts without the use of any large and expensive parts in the tape thread mechanism.

(Description of a preferred embodiment corresponding to the fourth to sixth aspects of the present invention)

Figure 20:
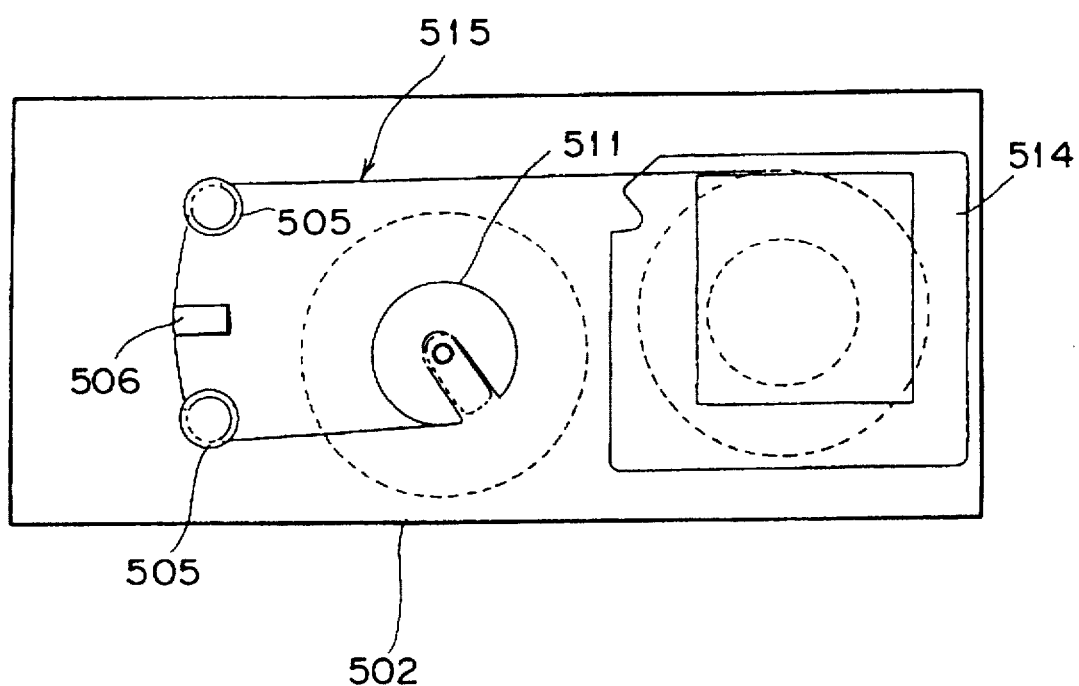
FIG. 20 is a plan view of an internal structure of a magnetic tape unit according to the fourth to sixth aspects of the present invention.

[I] Configuration of the magnetic tape unit (FIG. 20)

FIG. 20 is a plan view of the internal structure of the magnetic tape unit according to the fourth to sixth aspects of the present invention. This tape unit is characterized in that it excludes the air pump 507 and the lifter solenoid 508 shown in FIG. 15B. Means for making contact of the magnetic tape 515 with the magnetic head 506 may be realized by a tension spring or by control means for computing torques of the file reel motor and the machine reel motor from their rotating speeds and applying a tension to the magnetic tape 515.

Figure 21:
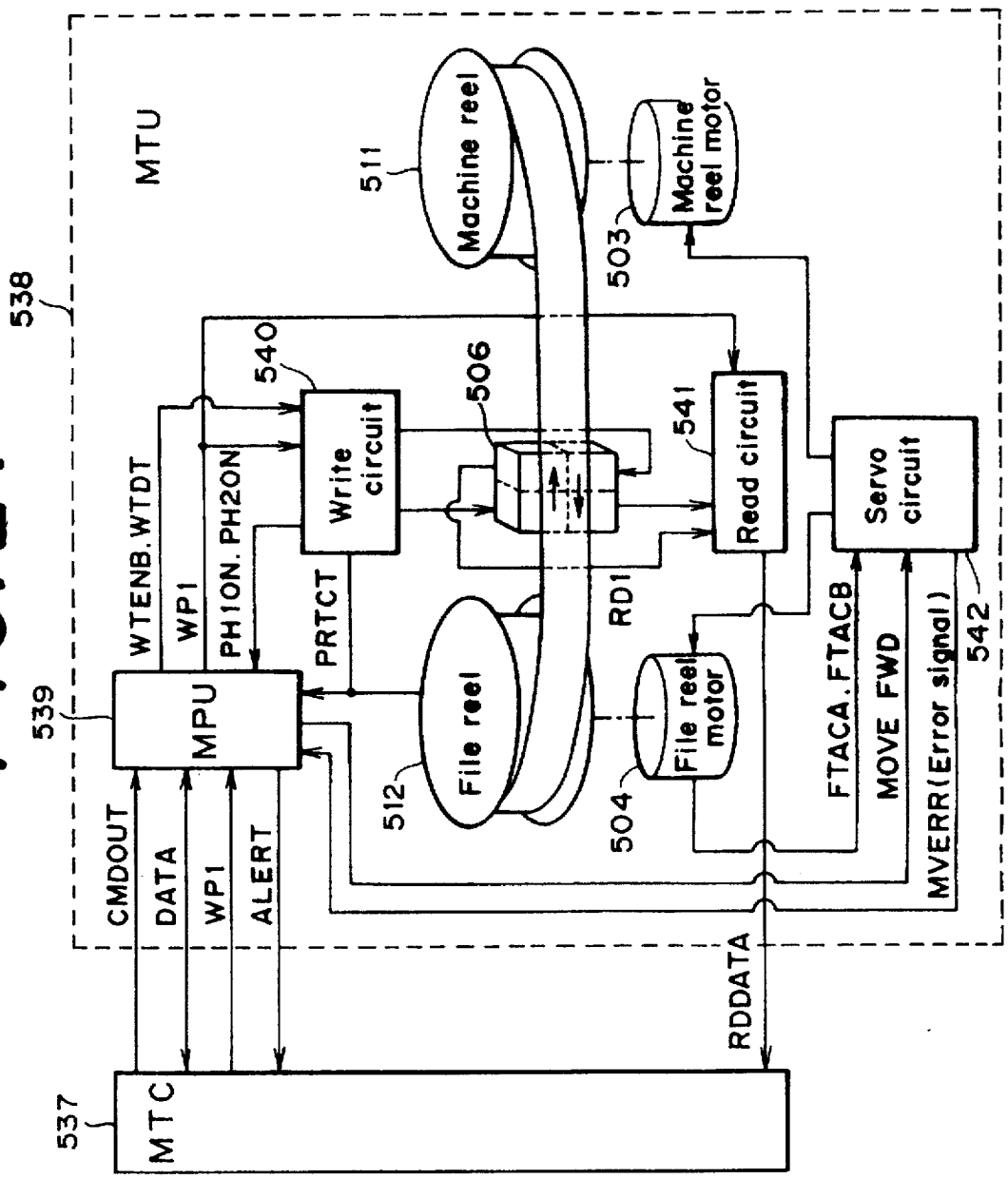
FIG. 21 is a block diagram of hardware in the magnetic tape unit according to the fourth to sixth aspects of the present invention.

[II] Control system in the magnetic tape unit (MTU) (FIG. 21)

FIG. 21 is a block diagram of hardware showing a control system in the magnetic tape unit. The magnetic tape unit (MTU) designated by reference numeral 538 is connected to a magnetic tape controller (MTC) 537. The control system in the MTU 538 includes an MPU 539, a write circuit 540, a read circuit 541, and a servo circuit 542. The MPU 539 is a processor for performing various controls in the MTU 538. The write circuit 540 is a circuit for performing a write process of data. The read circuit 541 is a circuit for performing a read process of data. The servo circuit 542 is a circuit for performing controls of a machine reel motor 503, a file reel motor 504, a tape thread mechanism, etc. in receipt of instructions from the MPU 539. The write circuit 540 and the read circuit 541 perform select control of a magnetic head 506 to write or read data.

Various signals and data shown in FIG. 21 are as follows:

"WTENB": write enable signal generated from the MPU 539 to the write circuit 540

"WP1": head select signal generated from the MPU 539

"PRTCT": protect signal detected from a file reel 512

"WTDT": write data

"ALERT": signal for informing abnormal detection from the MPU 539 to the MTC 537 (abnormal information signal due to interruption)

"RDDATA": read data

"FTACA" and "FTACB": output signals from a tachosensor

"PH1ON" and "PH2ON": power check signals

"MOVE": operation command signal

"FWD": forward command signal

"MVERR": error signal

"CMDOUT": command out signal

"DATA": data

Figure 22:
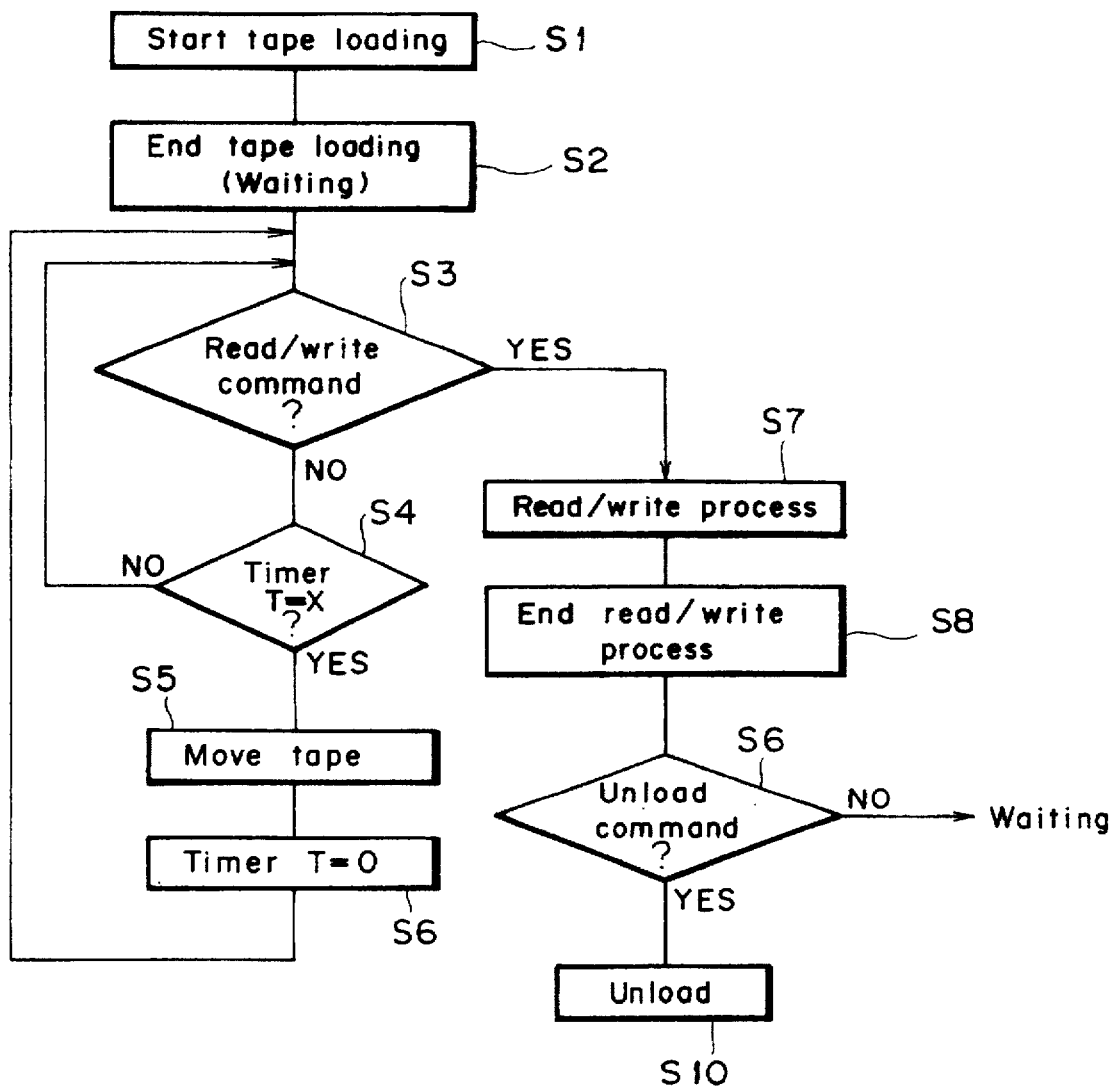
FIG. 22 is a flowchart in a preferred embodiment corresponding to the fourth aspect of the present invention.

[III] Process corresponding to the fourth aspect of the present invention (FIG. 22)

In FIG. 22, S1 to S10 denote steps of the process. When a magnetic tape cartridge 514 is inserted into the MTU 538, the servo circuit 542 controls to drive the tape thread mechanism in receipt of an instruction from the MPU 539 to start tape loading (S1). When the tape loading is ended (S2), the magnetic tape 515 is guided along a tape path to come into contact with the magnetic head 506. In this condition, the MPU 539 enters a wait state until receiving a signal read/write command from the MTC 537.

In the next step, the MPU 539 determines whether or not it has received the signal read/write command from the MTC 537 (S3). If the read/write command has not been received, the MPU 539 starts an internal timer to measure an elapsed time, and thereby determines whether or not the elapsed time (T) has reached a predetermined time (X) (S4). If the elapsed time has reached the predetermined time (T=X), the MPU 539 applies an instruction of tape movement to the servo circuit 542. In receipt of this instruction, the servo circuit 542 drives the reel motor (the machine reel motor 503 or the file reel motor 504) to move the magnetic tape 515 by a predetermined distance. This movement of the magnetic tape 515 changes a relative position between the magnetic tape 515 and the magnetic head 506. The MPU 539 computes the torques of the machine reel motor 503 and the file reel motor 504 from the rotating speeds of both reel motors and controls to make the magnetic tape in constant contact with the magnetic head. Alternatively, means for making the magnetic tape in constant contact with the magnetic head may be realized by a tape tension mechanism using a spring or the like. This operation for positioning the magnetic tape in contact with the magnetic head is carried out even during the rest period where the read/write operation is not performed. Thereafter, the MPU 539 clears the internal timer (T=0) (S6). This routine from S3 to S6 is repeated until the read/write command is received from the MTC 537. In this manner, while waiting for the read/write command, the MPU 539 controls to move the magnetic tape by the predetermined distance with the predetermined period. For example, the predetermined distance is 1 cm, and the predetermined period is 10 minutes (i.e., the magnetic tape is intermittently moved by every 1 cm at regular intervals of 10 minutes).

If the MPU 539 receives the read/write command from the MTC 537 (S3), the MPU 539 applies a read instruction to the read circuit 541 or a write instruction to the write circuit 540, thus performing a read/write process (S7). When the read/write process is ended (S8), the MPU 539 determines whether or not it has received an unload command (S9), and waits for the unload command. If the unload command has been received (S9), the MPU 539 applies an instruction to the servo circuit 542 and controls it to perform unloading so that the tape thread mechanism, the file reel motor 504, etc. are driven by the servo circuit 542 (S10).

Figure 23:
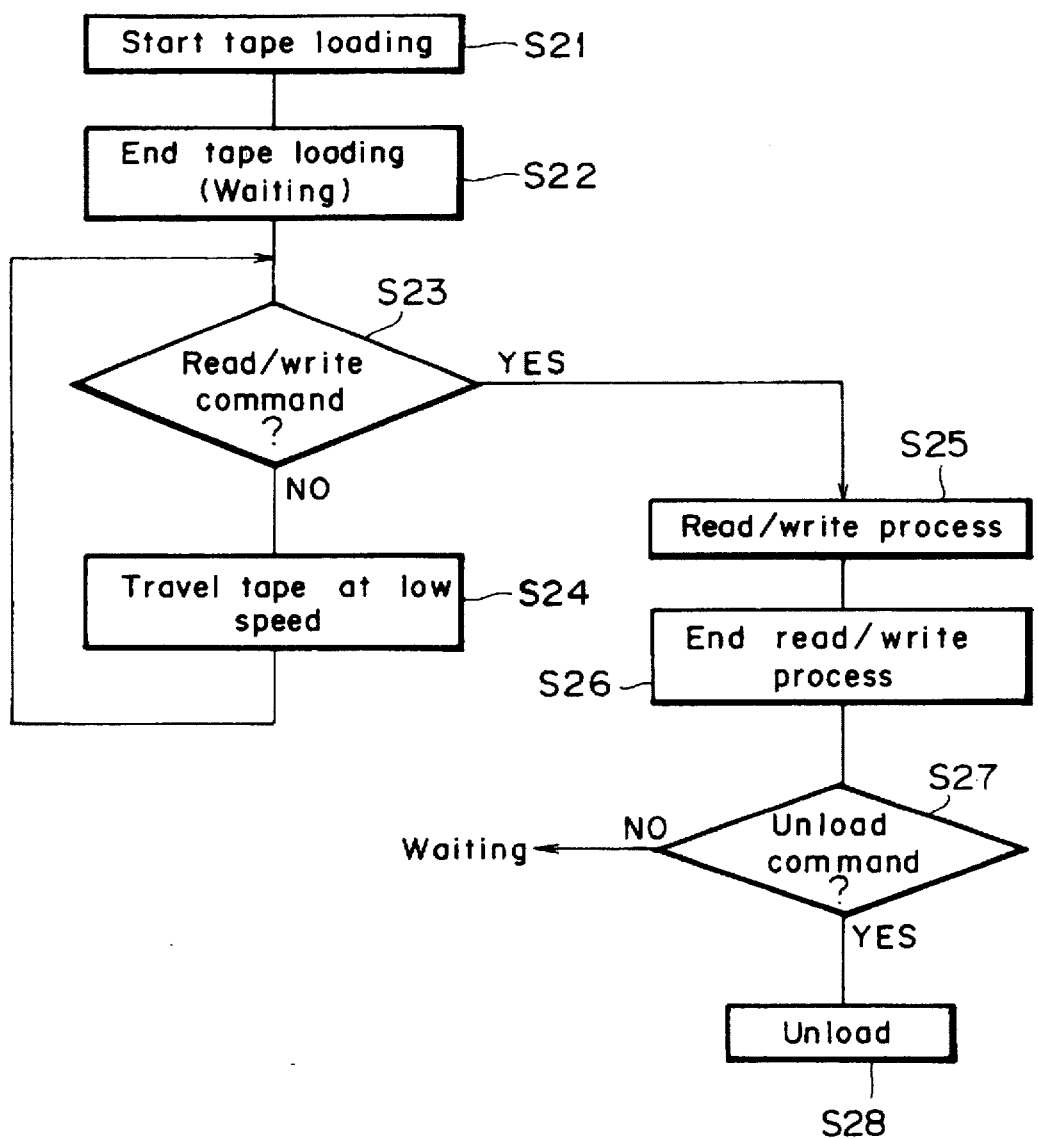
FIG. 23 is a flowchart in a preferred embodiment corresponding to the fifth aspect of the present invention.

[IV] Process corresponding to the fifth aspect of the present invention (FIG. 23)

In FIG. 23, S21 to S28 denote steps of the process. When the magnetic tape cartridge 514 is inserted into the MTU 538, the servo circuit 542 controls to drive the tape thread mechanism in receipt of an instruction from the MPU 539 to start tape loading (S21). When the tape loading is ended (S22), the magnetic tape 515 is guided along the tape path to come into contact with the magnetic head 506. In this condition, the MPU 539 enters a wait state until receiving a signal read/write command from the MTC 537.

In the next step, the MPU 539 determines whether or not it has received the signal read/write command from the MTC 537 (S23). If the read/write command has not been received, the MPU 539 applies to the servo circuit 542 an instruction to travel the magnetic tape at a low speed. The MPU 539 computes the torques of the machine reel motor 503 and the file reel motor 504 from the rotating speeds of both reel motors and controls to make the magnetic tape in constant contact with the magnetic head. Alternatively, means for making the magnetic tape in constant contact with the magnetic head may be realized by a tape tension mechanism using a spring or the like.

In receipt of the above instruction from the MPU 539, the servo circuit 542 drives the reel motor (the machine reel motor 503 or the file reel motor 504) at a low speed, thereby traveling the magnetic tape 515 at a speed lower than a normal traveling speed (S24). This movement of the magnetic tape 515 changes a relative position between the magnetic tape 515 and the magnetic head 506. In this manner, the MPU 539 continues to travel the magnetic tape 515 at a low speed until receiving the read/write command from the MTC 537.

If the MPU 539 receives the read/write command from the MTC 537 (S23), the MPU 539 applies a read instruction to the read circuit 541 or a write instruction to the write circuit 540, thus performing a read/write process (S25). When the read/write process is ended (S26), the MPU 539 determines whether or not it has received an unload command (S27), and waits for the unload command. If the unload command has been received (S27), the MPU 539 applies an instruction to the servo circuit 542 and controls it to perform unloading so that the tape thread mechanism, the file reel motor 504, etc. are driven by the servo circuit 542 (S28).

[V] Process corresponding to the sixth aspect of the present invention

When the magnetic tape cartridge 514 is inserted into the MTU 538, the servo circuit 542 controls to drive the tape thread mechanism in receipt of an instruction from the MPU 539 to start tape loading. When the tape loading is ended, the magnetic tape 515 is guided along the tape path to come into contact with the magnetic head 506. In this condition, the MPU 539 enters a wait state until receiving a signal read/write command from the MTC 537. In the next step, the MPU 539 determines whether or not it has received the signal read/write command from the MTC 537. If the read/write command has not been received, the MPU 539 starts an internal timer to measure an elapsed time, and thereby determines whether or not the elapsed time from the start of the wait state has reached a predetermined time. If the elapsed time has reached the predetermined time, the MPU 539 applies an instruction to the servo circuit 542 to perform unloading. In receipt of this instruction, the servo circuit 542 performs the unloading by controlling to drive the tape thread mechanism, the file reel motor 504, etc.

If the MPU 539 receives the read/write command from the MTC 537 during the wait state, the MPU 539 applies a read instruction to the read circuit 541 or a write instruction to the write circuit 540, thus performing a read/write process. When the read/write process is ended, the MPU 539 determines whether or not it has received an unload command, and waits for the unload command. If the unload command has been received, the MPU 539 applies an instruction to the servo circuit 542 and controls it to perform unloading so that the tape thread mechanism, the file reel motor 504, etc. are driven by the servo circuit 542.

(Description of a preferred embodiment corresponding to the seventh aspect of the present invention)

Figure 24:
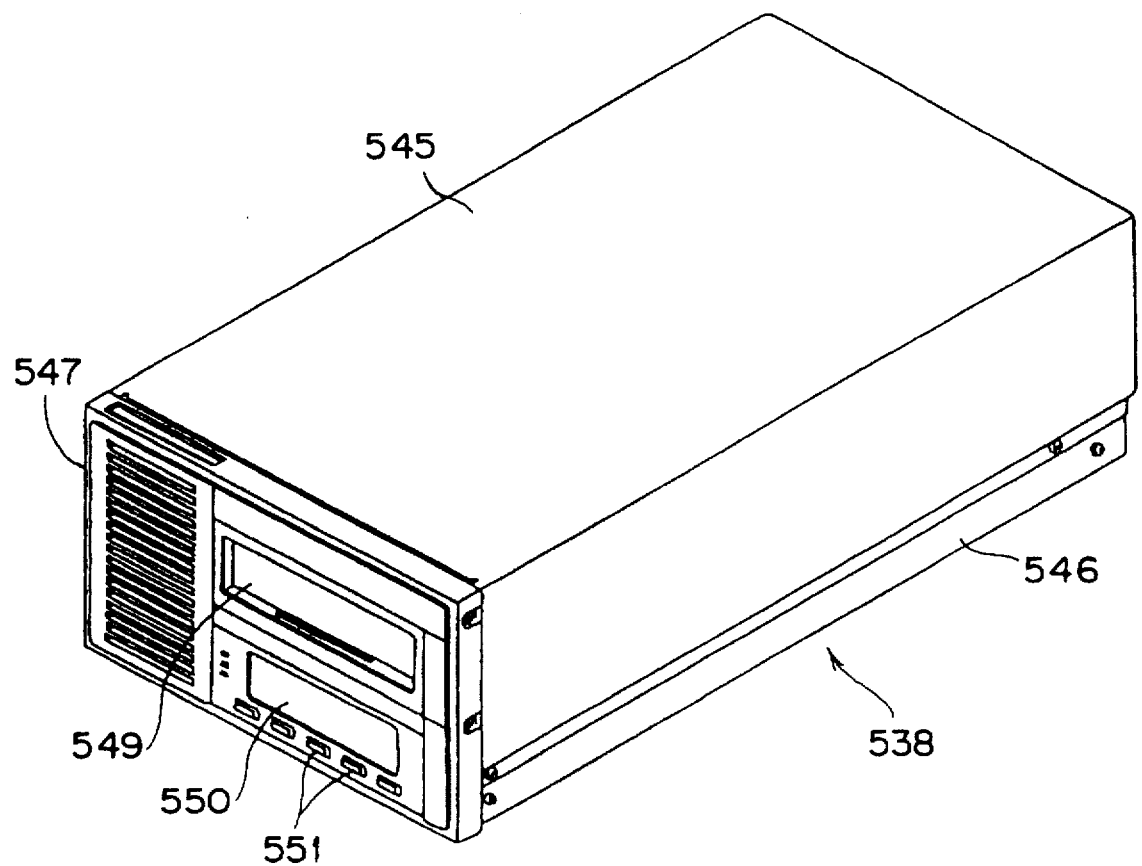
FIG. 24 is a perspective view of a magnetic tape unit according to the seventh aspect of the present invention.
Figure 25:
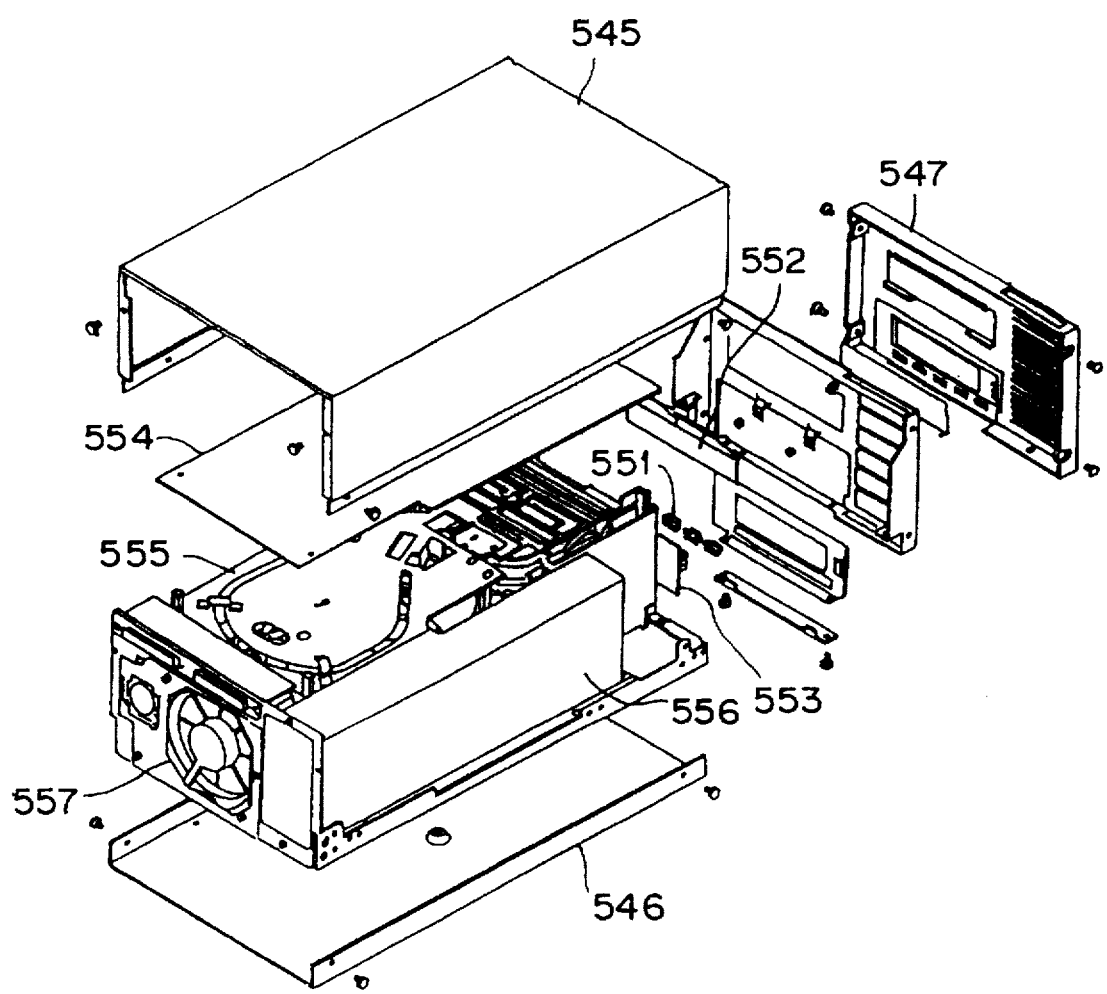
FIG. 25 is an exploded perspective view of the magnetic tape unit shown in FIG. 24.
Figure 26:
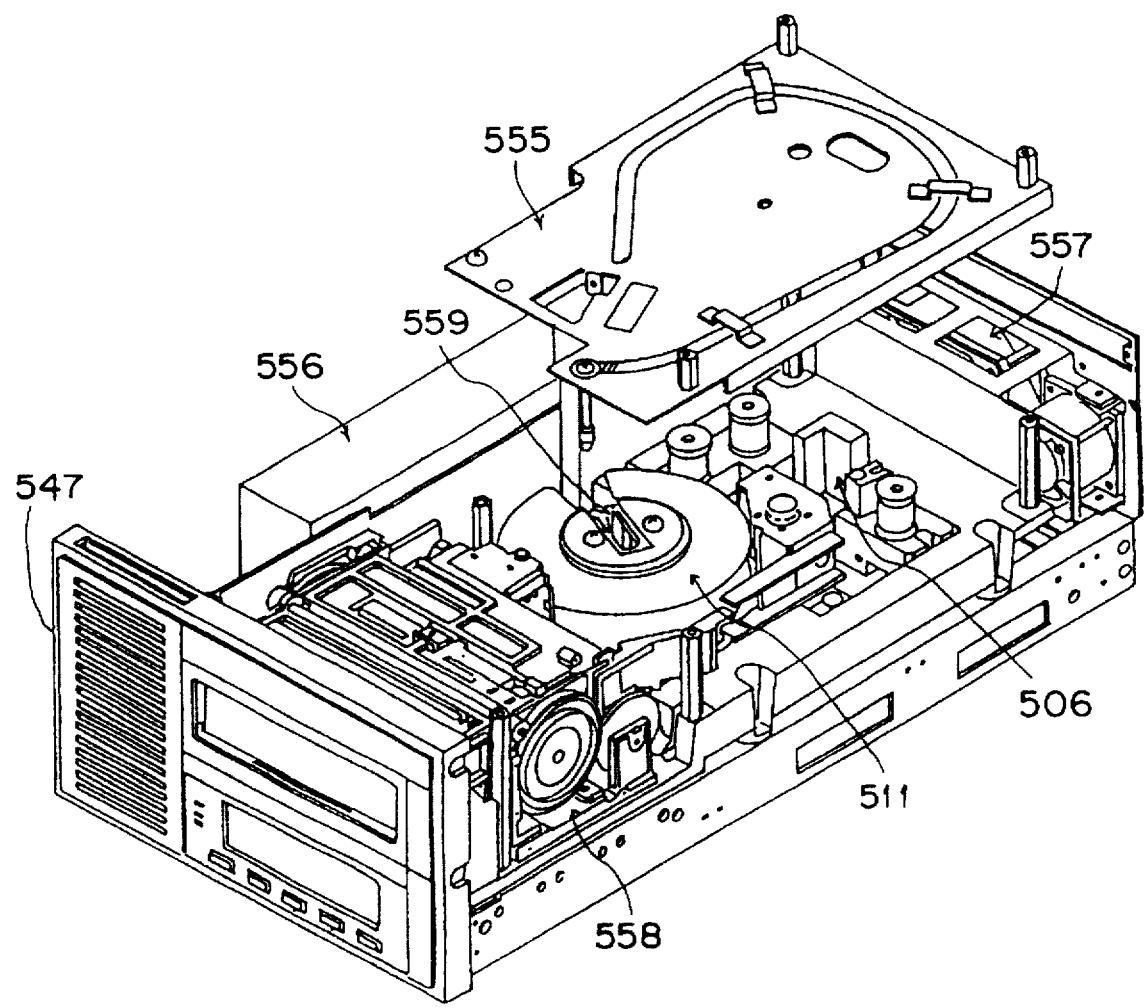
FIG. 26 is a perspective view of an internal structure of the magnetic tape unit shown in FIG. 24.

[I] Description of the General configuration of the magnetic tape unit (FIGS. 24 to 26)

FIG. 24 is a perspective view of the magnetic tape unit, showing the appearance thereof; FIG. 25 is an exploded perspective view of the magnetic tape unit; and FIG. 26 is a perspective view of the internal structure of the magnetic tape unit. As shown in FIG. 24, the magnetic tape unit (MTU) generally designated by reference numeral 538 includes an upper cover 545, a lower cover 546, and a front panel 547. The front panel 547 is provided with a cartridge insert opening 549, a display panel 550, and various switch buttons 551.

As shown in FIGS. 25 and 26, the internal structure of the MTU 538 includes a controller printed circuit board 554, a tape thread mechanism 555, a power unit 556, a loader 558, a cooling fan 557, a magnetic head 506, a machine reel 511, and an operator panel printed circuit board 553. The machine reel 511 is connected to a machine reel motor and is rotationally driven thereby. The machine reel 511 is formed with a recess 559 for receiving a leader block fixed to a leading end of a magnetic tape.

Figure 27:
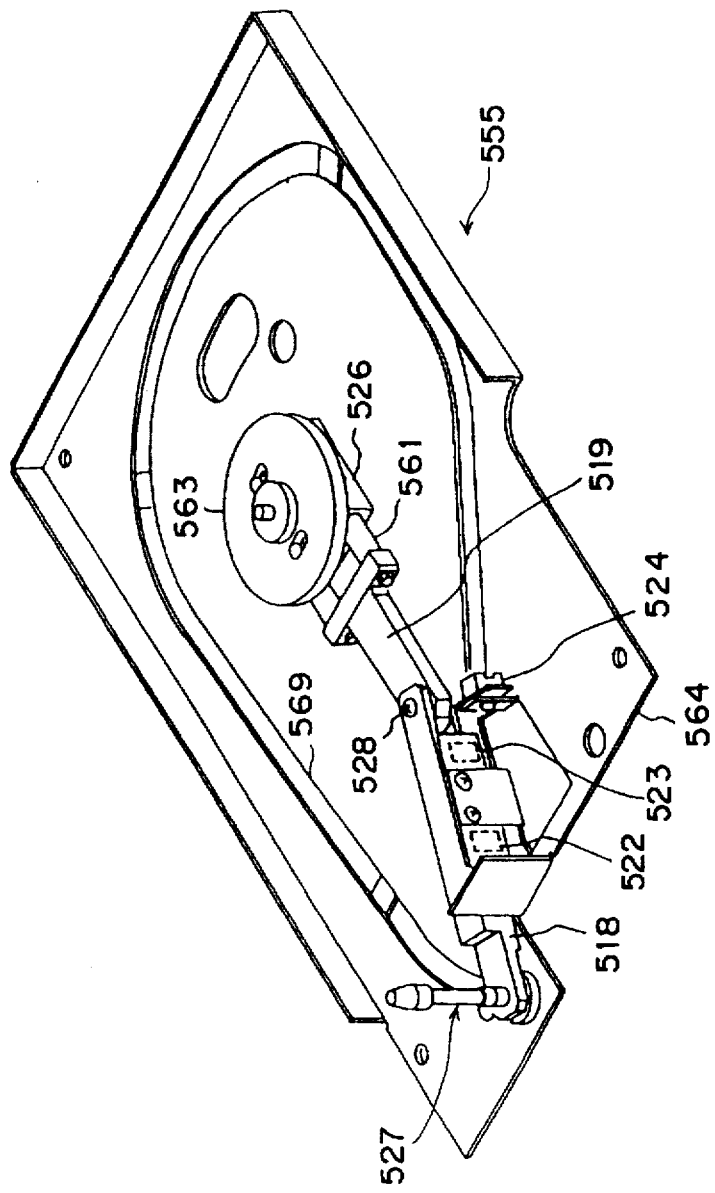
FIG. 27 is a perspective view of a tape threader shown in FIG. 26.
Figure 28:
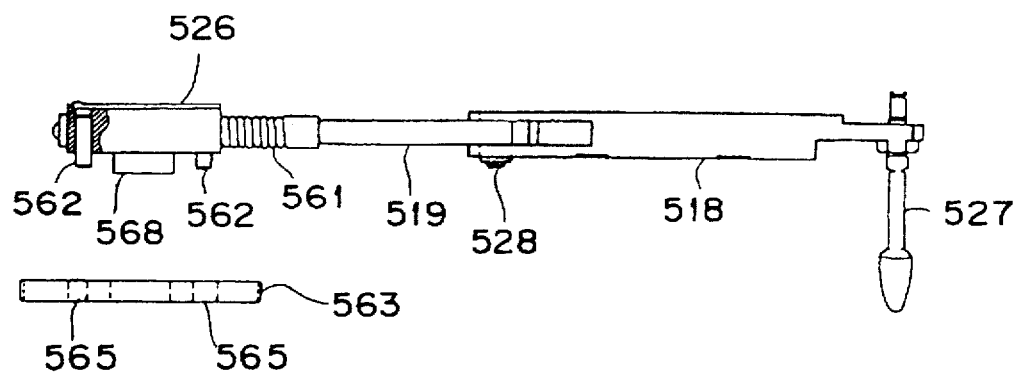
FIGS. 28 and 29 are a side view and a plan view, respectively, of a tape threader component shown in FIG. 27.
Figure 29:
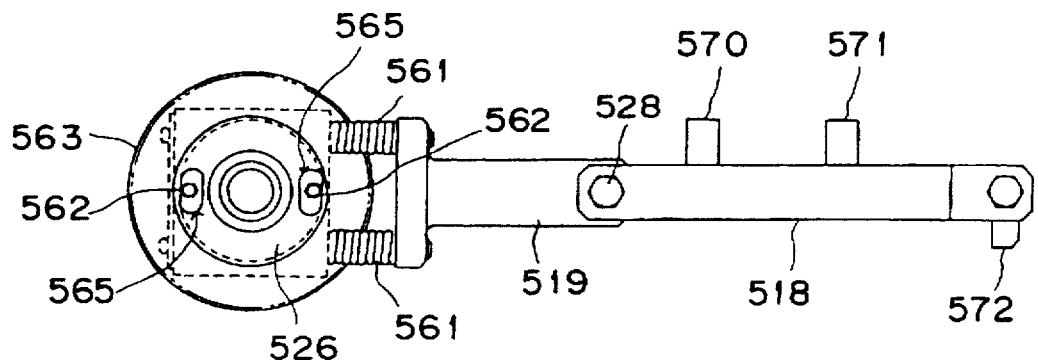

[II] Tape thread mechanism (FIGS. 27 to 29)

FIG. 27 is a perspective view of the tape thread mechanism, and FIGS. 28 and 29 are a side view and a plan view of the tape threader, respectively. The tape thread mechanism generally designated by reference numeral 555 is provided with a base 564, on which various parts are mounted. One end of a tape threading arm 518 and one end of a driving arm 519 are pivotably connected together by a shaft 528. The other end of the driving arm 519 is fixed through two coil springs 561 to a support block 526. The support block 526 is mounted on the base 564. The other end (free end) of the tape threading arm 518 is provided with a threader pin 527 for catching the leader block of the magnetic tape. The tape threading arm 518 is further provided with three flags 570, 571, and 572. The base 564 is provided with a first position sensor 522 for detecting the flag 571, a home position sensor 523 for detecting the flag 570, and a second position sensor 524 for detecting the flag 572.

Each sensor is composed of a light emitting portion and a light receiving portion, for example. The light emitting portion and the light receiving portion are arranged so that light from the light emitting portion is reflected on the corresponding flag (reflecting member) and then received by the light receiving portion. That is, when the corresponding flag is inserted between the light emitting portion and the light receiving portion, the light from the light emitting portion is reflected on the flag, and the reflected light from the flag enters the light receiving portion, which detects the reflected light to turn on the sensor. On the other hand, when the flag is not inserted between the light emitting portion and the light receiving portion, the light from the light emitting portion is not reflected on the flag and therefore not detected by the light receiving portion to turn off the sensor. With this configuration of each sensor, the tape threading arm 518 and the threader pin 527 can be detected in position.

The base 564 is formed with a slit 569 for guiding the threader pin 527 provided at the free end of the tape threading arm 518 in such a manner that when the driving arm 519 is driven by a threader motor (not shown), the threader pin 527 is moved along the slit 569. A transmission gear 563 is rotatably mounted on a shaft 568 of the support block 526 in coaxial relationship with each other. Two support pins 562 projects from the support block 526, and two elongated holes 565 are formed through the transmission gear 563. The two support pins 562 of the support block 526 are loosely engaged with the two elongated holes 565 of the transmission gear 563, respectively. Accordingly, the support pins 562 can be freely moved within the elongated holes 565, thereby allowing a play in rotation of the support block 526 in the range of each elongated hole 565 of the transmission gear 563. The transmission gear 563 is rotationally driven by a driving force of the threader motor in the tape thread mechanism. That is, the torque of the threader motor is transmitted to the transmission gear 563 to rotate it, and the rotation of the transmission gear 563 is then transmitted through the support block 526 to the driving arm 519 and the tape threading arm 518, thereby moving the threader pin 527.

Figure 30:
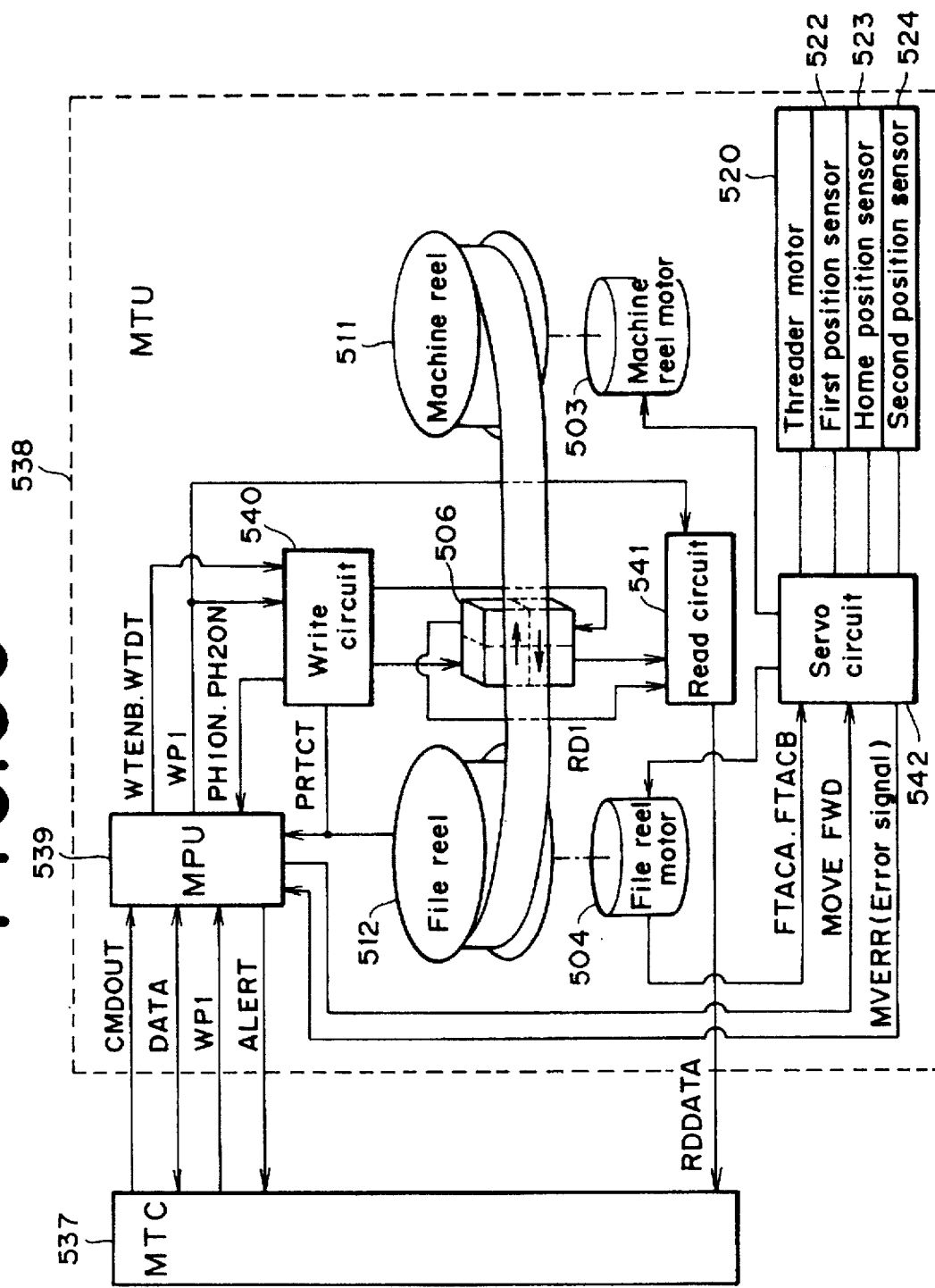
FIG. 30 is a block diagram of hardware in the magnetic tape unit according to the seventh aspect of the present invention.

[III] Control system in the magnetic tape unit (FIG. 30)

FIG. 30 is a block diagram of a control system in the magnetic tape unit according to the seventh aspect of the present invention. The magnetic tape unit (MTU) 538 is connected to a magnetic tape controller (MTC) 537. The control system in the MTU 538 includes an MPU 539, a write circuit 540, a read circuit 541, and a servo circuit 542. The MPU 539 is a processor for performing various controls in the MTU 538. The write circuit 540 is a circuit for performing a data write process. The read circuit 541 is a circuit for performing a data read process. The servo circuit 542 is a circuit for controlling to drive a machine reel motor 503 and a file reel motor 504 and for controlling to drive a threader motor 520 in receipt of a sensor signal from the first position sensor 522, the home position sensor 523, or the second position sensor 524. The MPU 539 computes the torques of the machine reel motor 503 and the file reel motor 504 from the rotating speeds of both reel motors to make the magnetic tape in constant contact with the magnetic head. Alternatively, means for making the magnetic tape in constant contact with the magnetic head may be realized by a tape tension mechanism using a spring or the like. The write circuit 540 and the read circuit 541 perform select control of the magnetic head to write or read data.

Figure 31:
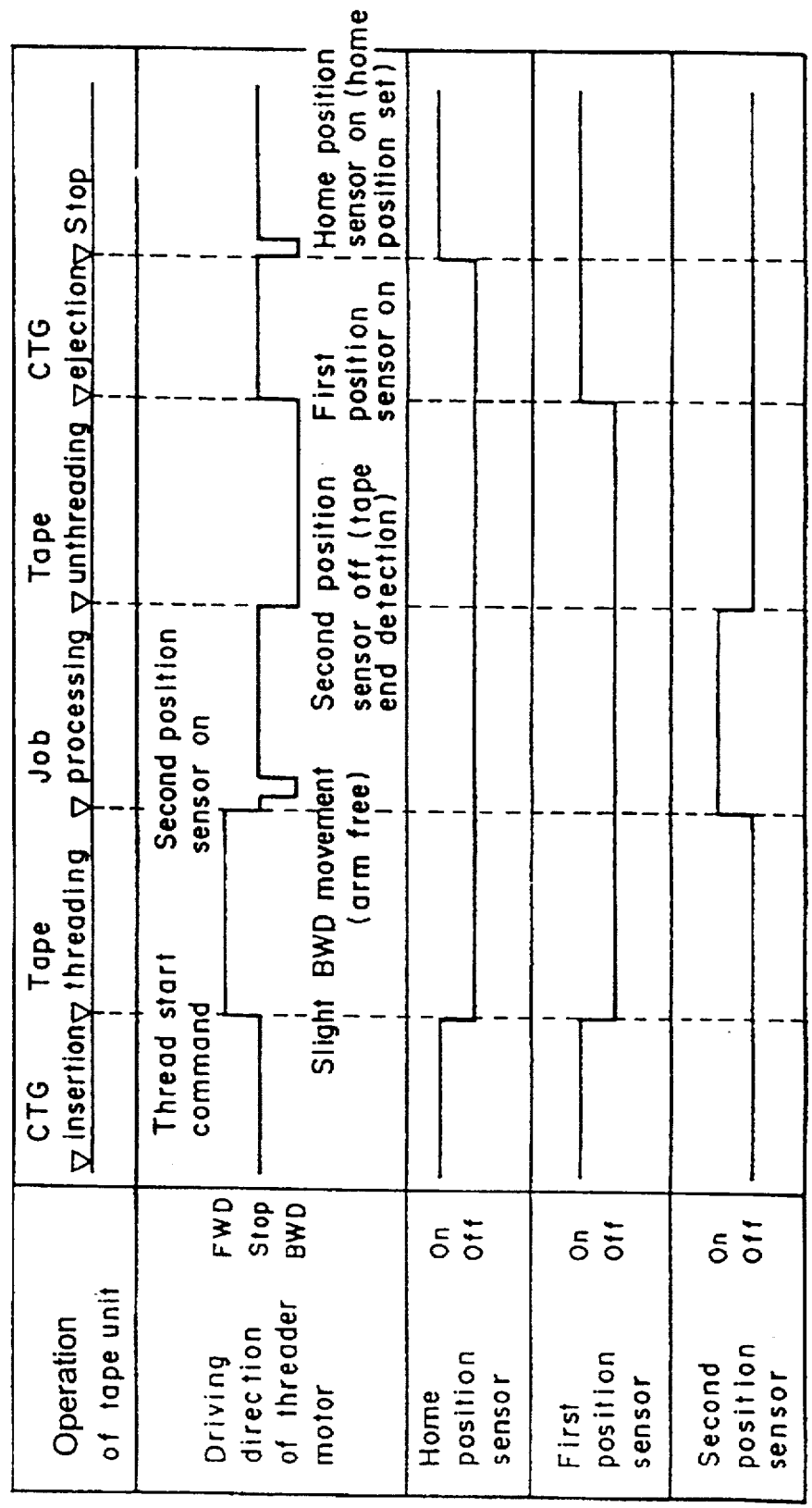
FIG. 31 is a time chart for illustrating the operation of the tape threader.
Figure 32:
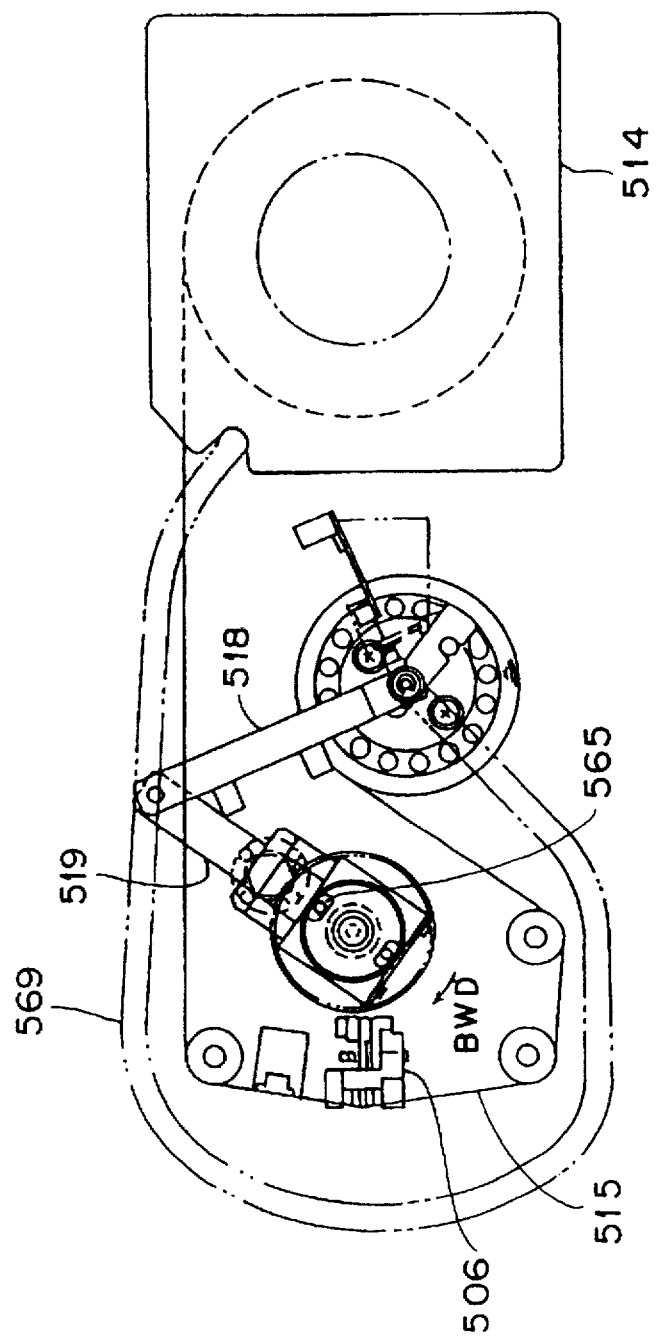
FIGS. 32 and 33 are plan views illustrating the operating conditions of the tape threader.
Figure 33:
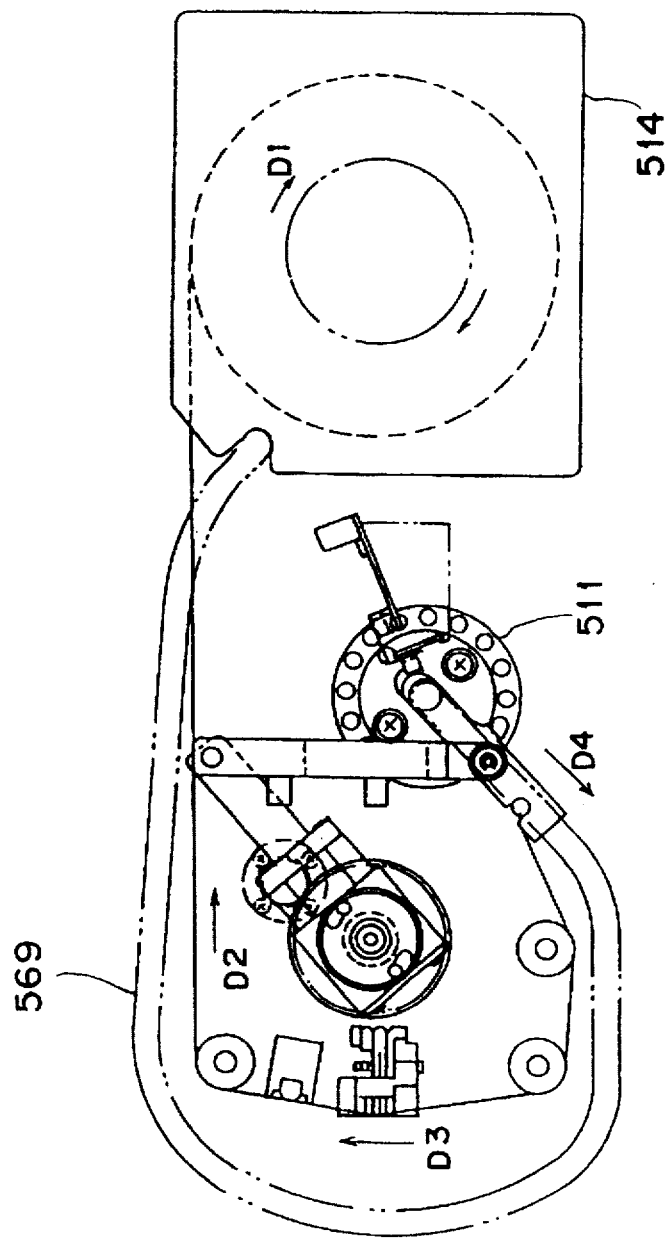

[IV] Operation of the tape thread mechanism (FIGS. 31 to 33)

FIG. 31 is a time chart of the operation, and FIGS. 32 and 33 are plan views illustrating operational conditions of the tape thread mechanism. As shown in FIG. 31, the sequence of the operation of the MTU 538 is (insertion of the magnetic tape cartridge) (tape threading) (JOB processing) (tape unthreading) (ejection of the magnetic tape cartridge) (operation stop). In this operation, the threader motor 520 is driven in a forward (FWD) direction or a backward (BWD) direction, or stopped. Further, the home position sensor 523, the first position sensor 522, and the second position sensor 524 are turned on or off in the above operation.

The above operation sequence will now be described in detail in the order of (A) to (M) as follows:

(A) The magnetic tape cartridge 514 is inserted into the MTU 538. At this time, the tape threading arm 518 is located at the home position, so that the home position sensor 523 is on, the first position sensor 522 is on, and the second position sensor 524 is off.

(B) When a thread start command is issued from the MPU 539, the servo circuit 542 controls to drive the tape thread mechanism 555 so as to catch the leader block of the magnetic tape with the threader pin 527 and draw the magnetic tape from the magnetic tape cartridge 514. In this operation, the threader motor 520 is driven in the forward direction to move the driving arm 519 and the tape threading arm 518. Accordingly, the flags 570 and 571 come away from the home position sensor 523 and the first position sensor 522, so that both the sensors 523 and 522 are turned off. Further, as the flag 572 is not inserted in the second position sensor 524, the sensor 524 remains off.

(C) The tape thread mechanism 555 is further driven to move the threader pin 527 along the slit 569 toward the machine reel 511. In this operation, the threader motor 520 is driven in the forward direction.

(D) The threader pin 527 is further moved within the machine reel 511 to insert the leader block into the recess 559 of the machine reel 511. At this time, the flag 572 is inserted in the second position sensor 524, so that the sensor 524 is turned on. In this condition, the threader motor 520 is stopped.

(E) The machine reel motor 503 is driven to wind the magnetic tape around the machine reel 511 by several turns (in the forward direction).

(F) After thus winding the magnetic tape 515 around the machine reel 511, the threader motor 520 is slightly driven in the backward direction (slightly reversed), and then stopped. In this operation, the threader motor 520 is slightly driven in the backward direction after fixing the leader block to the machine reel 511 by winding the magnetic tape around the machine reel 511 by several turns. However, the position of the arms 518 and 519 is not changed (the arms are in a free state) because there is defined a play between the transmission gear 563 and the support block 526. This operational condition is shown in FIG. 32. As shown in FIG. 32, in the condition where the magnetic tape 515 is wound around the machine reel 515, the front end of the arm 518 is fixed at the center of the machine reel 511. Accordingly, the slight backward driving of the threader motor 520 causes a play between the transmission gear 563 and the support block 526.

(G) A JOB processing is performed. That is, the MPU 539 issues a read command to the read circuit 541 or a write command to the write circuit 540 to perform a read process or a write process. Further, the MPU 539 issues a command to the servo circuit 542 to drive the machine reel motor 503 or the file reel motor 504, thereby actually reading or writing data.

(H) After ending the JOB processing, the MPU 539 receives an unload command.

(I) In accordance with the unload command, the MPU 539 issues a command to the servo circuit 542 to drive the file reel motor 504 in the backward direction, thereby rewinding the magnetic tape 515 from the machine reel 511 to the file reel 512. At this time, the threader motor 520 remains stopped.

(J) When the magnetic tape 515 is fully unwound from the machine reel 511 to come to a tape end, the magnetic tape 515 is further pulled by the torque of the file reel motor 504 to slightly extract the leader block from the recess 559 of the machine reel 511. Accordingly, the tape threading arm 518 is slightly moved to cause the flag 572 to come out of the second position sensor 524, so that the sensor 524 is turned off. In this manner, when the magnetic tape 515 is fully unwound from the machine reel 511, the magnetic tape 515 is further pulled by the file reel, with the result that the tape threading arm 518 is moved by a distance corresponding to the play (within each elongated hole 565) created by the driving of the threader motor 520 in the step (F). Accordingly, the second position sensor 524 is automatically turned off, and the MPU 539 receives the off-signal from the sensor 524 to recognize the tape end.

The condition of the step (J) is shown in FIG. 33. As shown in FIG. 33, when the magnetic tape 515 is fully unwound from the machine reel 511 and rewound around the file reel 512, the leader block of the magnetic tape 515 is slightly extracted from the recess of the machine reel 511 by the movement of the arms 518 and 519 due to the play between the transmission gear 563 and the support block 526. Accordingly, the second position sensor 524 is turned off and the MPU 539 recognizes the tape end according to the off-signal from the sensor 524. Then, the next unthread operation is allowed to be started.

(K) When the second position sensor 524 becomes off as mentioned above, the MPU 539 issues a tape unthread command to the servo circuit 542. Then, the servo circuit 542 controls the tape thread mechanism to drive the threader motor 520 in the backward direction, thereby moving the threader pin 527 from the machine reel 511 along the slit 569 toward the file reel 512. Accordingly, the leader block of the magnetic tape 515 is returned from the machine reel 511 toward the file reel 512.

(L) Thereafter, the leader block is inserted into the magnetic tape cartridge 514 by the threader pin 527. At this time, the tape threading arm 518 is further moved toward the magnetic tape cartridge 514 to insert the flag 571 into the first position sensor 522, so that the sensor 522 is turned on. Then, the servo circuit 542 stops driving the threader motor 520. Thus, the tape unthreading is ended.

(M) After the first position sensor 522 becomes on as mentioned above, the servo circuit 542 controls to slightly drive the threader motor 520 in the backward direction, so as to set the arm 518 at the home position. At this time, the flag 570 is inserted into the home position sensor 523, so that the sensor 523 is turned on. Then, the servo circuit 542 stops driving the threader motor 520. Finally, the MPU 539 ends the operation of the tape unit.

[V] Operation sequence (FIGS. 34 to 39)

FIGS. 34 to 39 show the operation sequence mentioned above. Now, the operation sequence of the steps (A) to (M) mentioned above will be described in more detail with reference to FIGS. 34 to 39. In these figures, the magnetic tape is not shown.

Figure 34:
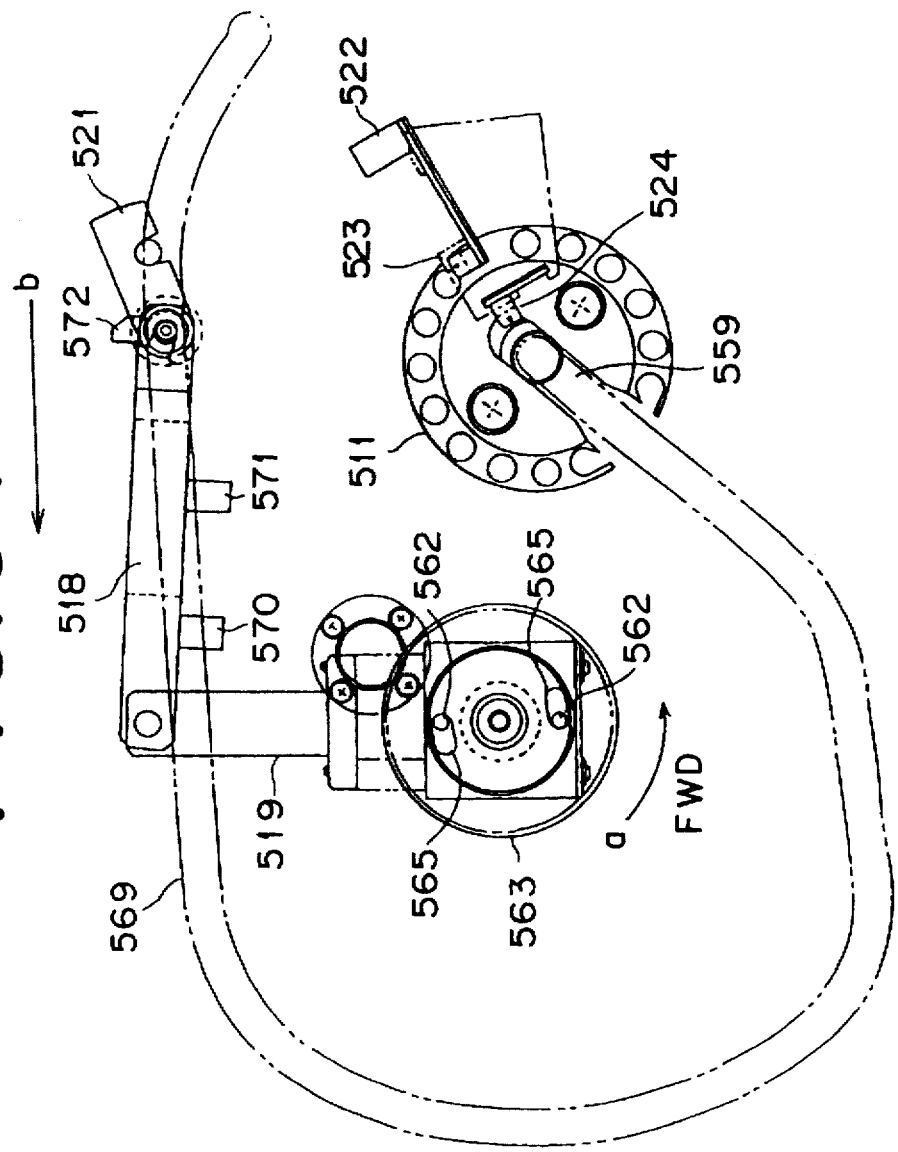
FIGS. 34 to 39 are plan views illustrating the sequence of the operation of the tape threaded.

(1) Operation of the steps (A) to (C) (FIG. 34)

In this operation, the magnetic tape cartridge 514 is inserted into the MTU 538, and the leader block 521 is then drawn from the magnetic tape cartridge 514. At this time, the transmission gear 563 is rotated in the forward direction as shown by an arrow a in FIG. 34. Accordingly, the leader block 521 of the magnetic tape 515 is engaged with the threader pin 527 at its lower end and is drawn from the magnetic tape cartridge 514, then being moved along the slit 569 in the direction shown by an arrow b in FIG. 34 until reaching the machine reel 511.

Figure 35:
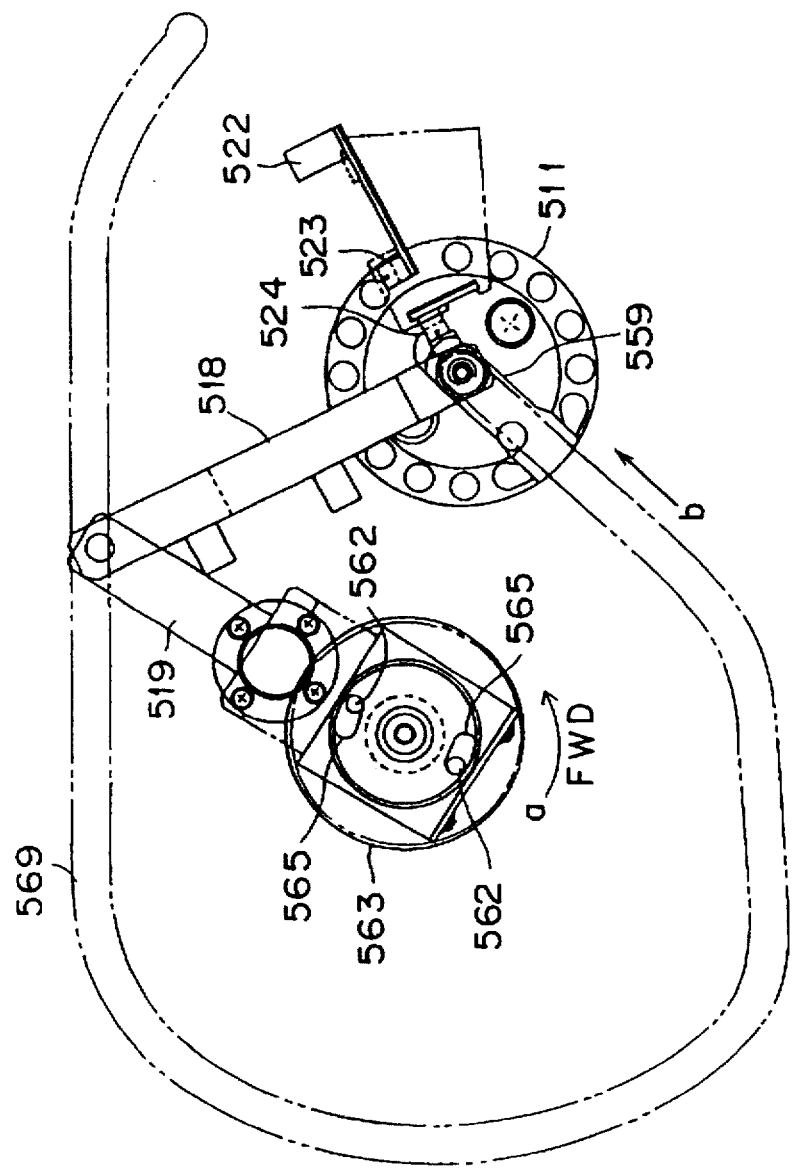

(2) Operation of the steps (D) to (E) (FIG. 35)

After reaching the machine reel 511, the leader block 521 is inserted into the recess 559 of the machine reel 511. Then, the magnetic tape 515 is wound around the machine reel 511 by several turns by driving the machine reel motor in the forward direction, thus fixing the leader block 521 to the machine reel 511. In this condition, the flag 572 formed at the front end of the arm 518 is detected by the second position sensor 524, so that the sensor 524 becomes on. The MPU 539 detects the on-signal from the second position sensor 524 to recognize that the magnetic tape 515 has been wound around the machine reel 511 by several turns.

Figure 36:
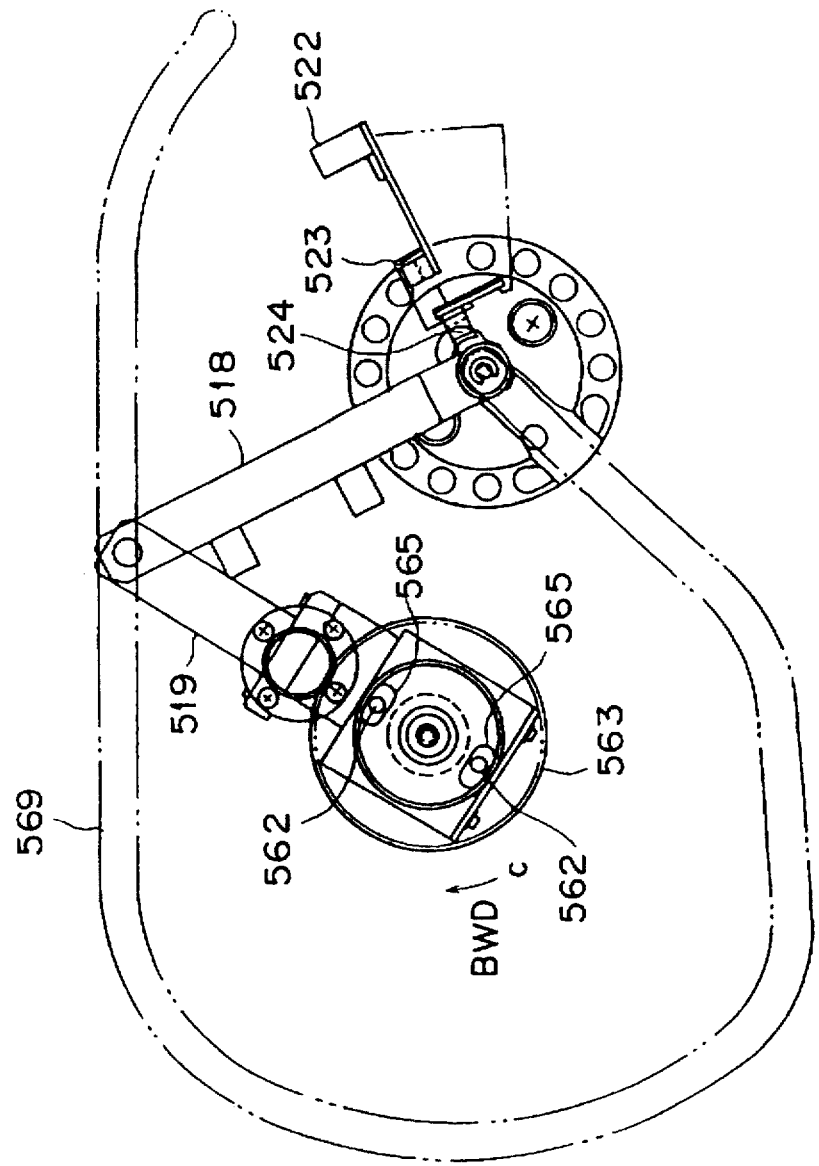

(3) Operation of the steps (F) to (G) (FIG. 36)

After the magnetic tape 515 is wound around the machine reel 511 by several turns as mentioned above, the threader motor 520 is slightly driven in the backward direction (i.e., reversely driven) to thereby slightly rotate the transmission gear 563 in the direction shown by an arrow c in FIG. 36. In this operation, the arms 518 and 519 are not changed in position because of the play between the transmission gear 563 and the support block 526. The slight backward rotation of the transmission gear 563 mentioned above causes the two support pins 562 of the support block 526 to relatively move within the respective elongated holes 565 of the transmission gear 563 to the central position of each hole 565. That is, the support pins 562 are allowed to move back and forth within the respective elongated holes 565 (by the distance corresponding to the play). In this condition, the JOB processing is started.

Figure 37:
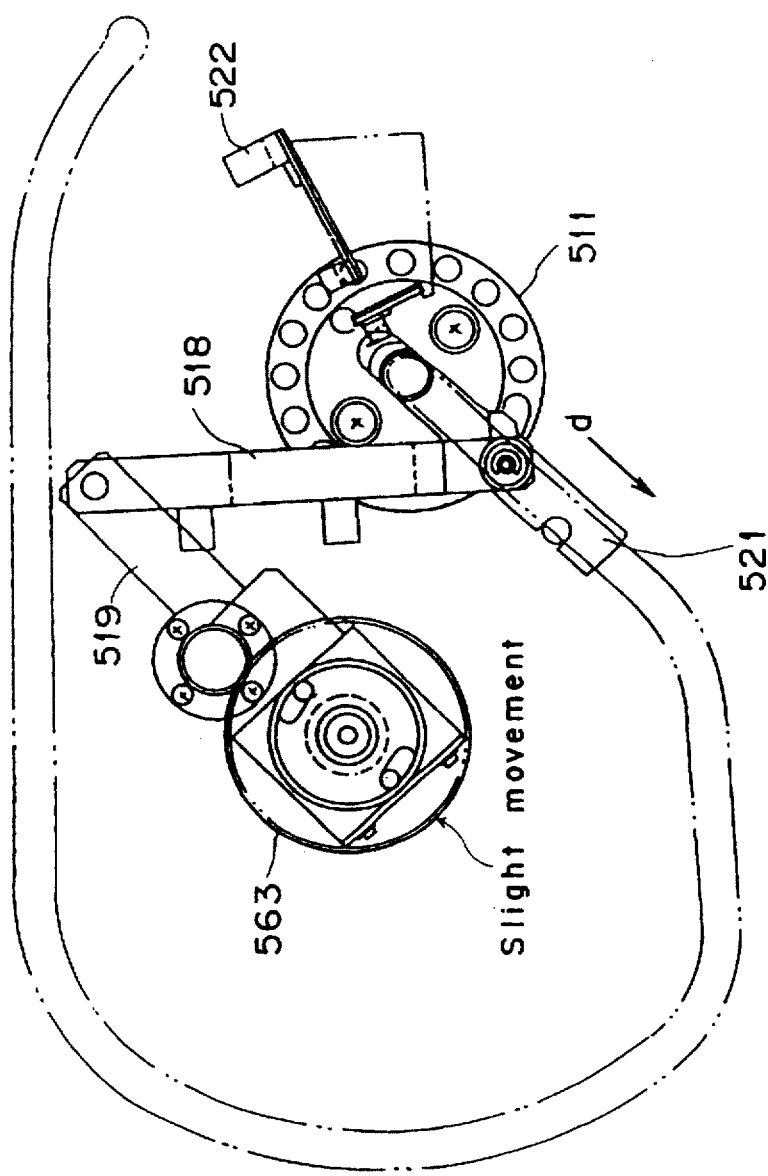

(4) Operation of the steps (H) to (J) (FIG. 37)

After ending the JOB processing, an unload command is issued to rotate the file reel 512 in the backward direction, so as to start rewinding the magnetic tape 515. At this time, the threader motor 520 remains stopped. When the magnetic tape 515 is fully unwound from the machine reel 511, the leader block 521 is slightly extracted from the recess of the machine reel 511 by the pulling force of the magnetic tape 515 from the file reel 512 in the direction shown by an arrow d in FIG. 37, because the arms 518 and 519 can be freely moved by the distance corresponding to the play created by the slight backward driving of the threader motor 520 in the step (F). Accordingly, the second position sensor 524 is automatically turned off to allow the detection of the tape end.

Figure 38:
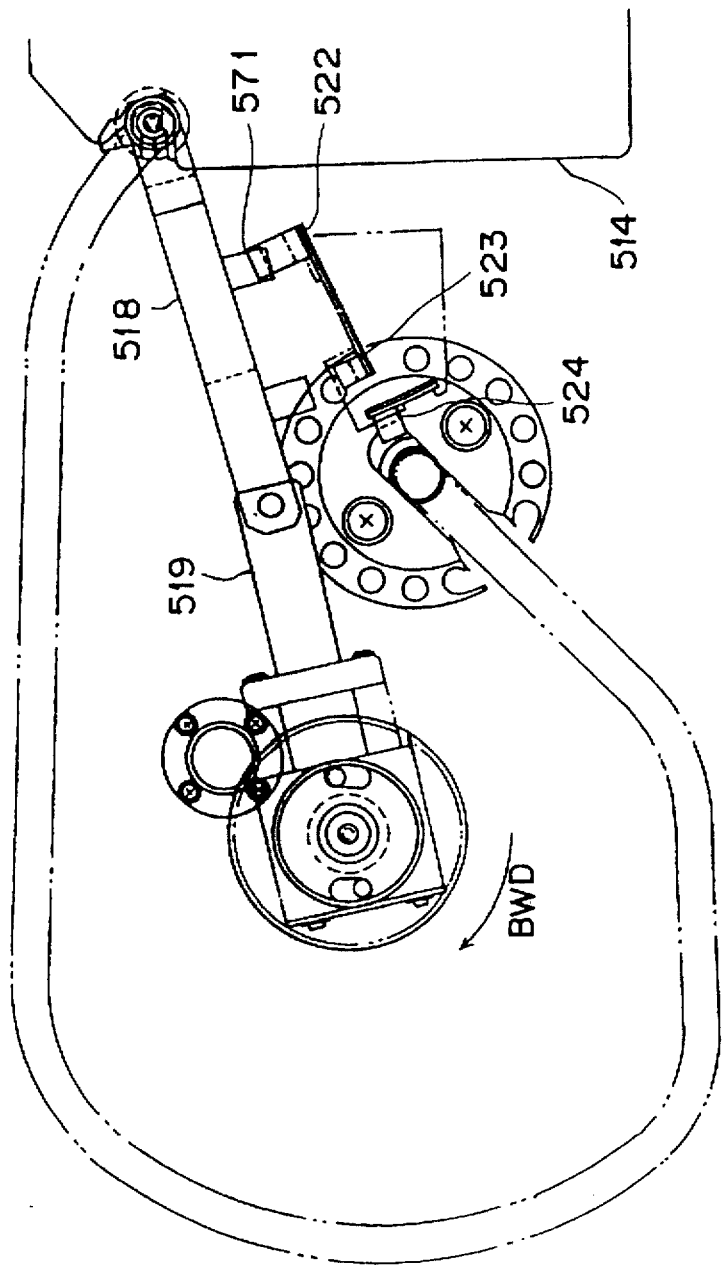

(5) Operation of the steps (K) to (L) (FIG. 38)

After fully unwinding the magnetic tape 515 from the machine reel 511 and then slightly moving the arms 518 and 519 to automatically turn off the second position sensor 524 as mentioned above, the threader motor 520 is driven in the backward direction to move the leader block 521 along the slit 569 toward the file reel 512. When the leader block 521 is inserted into the magnetic tape cartridge 514, the first position sensor 522 detects the flag 571 to become on.

Figure 39:
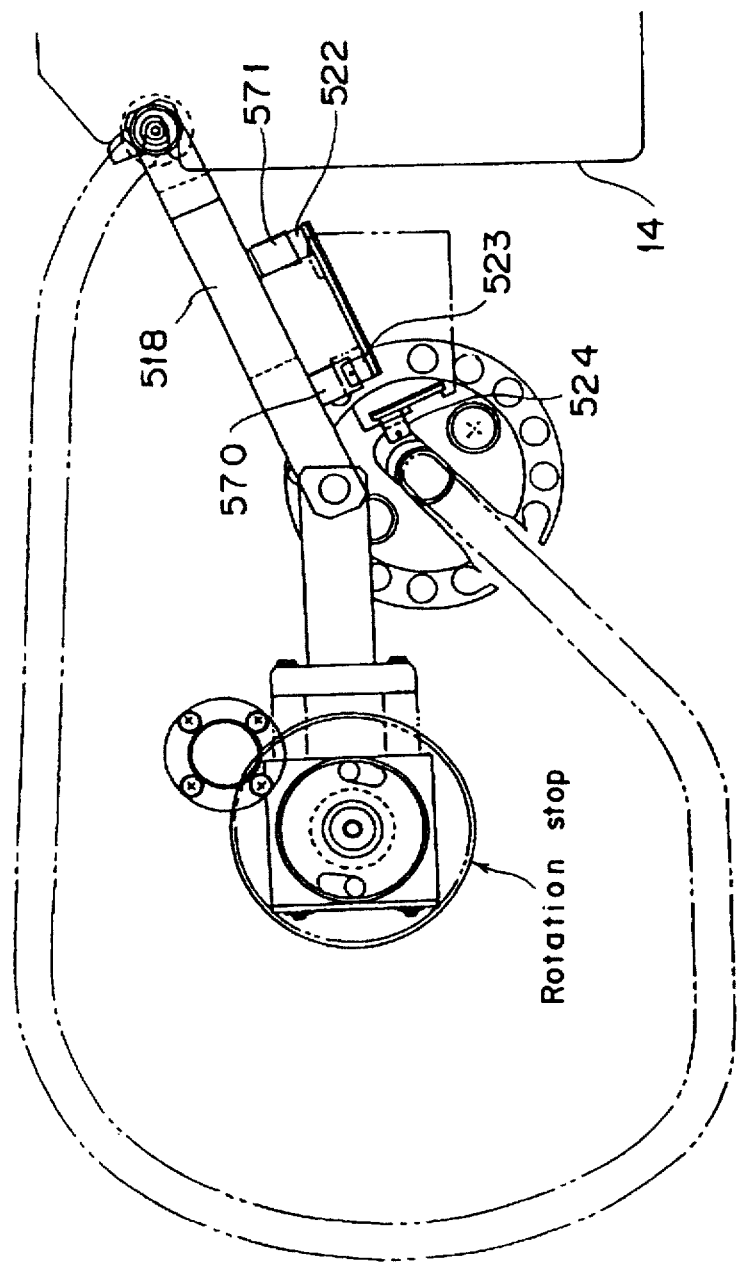

(6) Operation of the step (M) (FIG. 39)

After the first position sensor 522 detects the flag 571 to become on as mentioned above, the threader motor 520 is further driven in the backward direction until the home position sensor 523 detects the flag 570 to become on. When the home position sensor 523 becomes on, the threader motor 520 is stopped.

Figure 40:
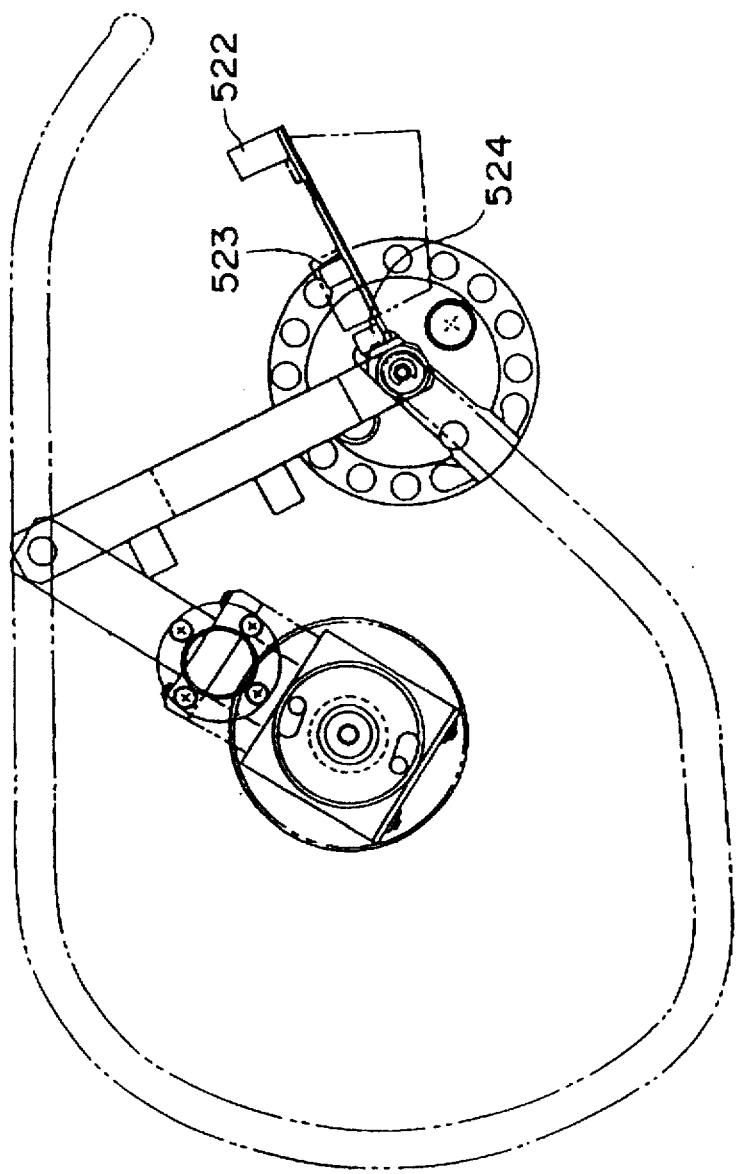
FIG. 40 is a plan view illustrating the mounted condition of sensors.

[VI] Description of the mounted condition of the sensors (FIG. 40)

FIG. 40 shows the mounted condition of the sensors 522, 523, and 524. The tape thread mechanism 555 includes the first position sensor 522 for detecting the tape thread start position of the arm 518, the second position sensor 524 for detecting the tape thread end position of the arm 518, and the home position sensor 523 for detecting the home position of the arm 518. All the sensors 522, 523, and 524 are mounted on the same printed circuit board. Accordingly, the number of printed circuit boards for mounting the sensors can be reduced to thereby realize a reduction in size and cost of the tape unit. In modification, the home position sensor 523 may be omitted and the second position sensor 524 may instead be let serve as the home position sensor 523. In this case, the first position sensor 522 and the second position sensor 524 are mounted on the same printed circuit board, thereby realizing a further reduction in size and cost of the tape unit.

As described above, the fourth to seventh aspects of the present invention have the following effects.

(1) In waiting for the read/write operation after the magnetic tape loading, the magnetic tape remains in contact with the magnetic head. In the case where the waiting time is long, the use environment of the tape unit is high temperature/high humidity, or the surface of the magnetic tape is worn by the travel, the magnetic tape is prone to adhere to the magnetic head, causing the possibility of damage to the magnetic tape. Further, in the case where the air escaping groove is formed on the tape contact surface of the magnetic head to make a good contact of the magnetic tape with the magnetic head, the shape of the air escaping groove of the magnetic head is transferred to the magnetic tape after a long waiting time to make the surface of the magnetic tape uneven, thus damaging the magnetic tape. Such a damage to the magnetic tape causes an error in the read/write operation of signals.

To the contrary, according to the fourth to sixth aspects of the present invention, the magnetic tape is traveled at regular intervals of time, traveled at a speed lower than a normal traveling speed, or unloaded after a predetermined time elapsed from the start of waiting for a signal read/write process, during the wait state of the signal read/write process. Accordingly, the long duration of the contact condition between the magnetic tape and the magnetic head at the same position can be prevented, thereby avoiding the adhesion of the magnetic tape to the magnetic head and the transfer of the shape of the air escaping groove to the magnetic tape and therefore preventing the damage to the magnetic tape.

(2) In the first prior art magnetic tape unit shown in FIGS. 15A and 15B, the air pump and the lifter solenoid are mounted to prevent the adhesion of the magnetic tape to the magnetic head and the transfer of the shape of the air escaping groove of the magnetic head to the magnetic tape. However, an air pump is generally large and expensive. Accordingly, such a large and expensive air pump is hard to mount in response to recent trends of reducing the size and cost of a magnetic tape unit. As a result, it is difficult to eliminate the damage to the magnetic tape.

To the contrary, according to the fourth to sixth aspects of the present invention, the long duration of the contact condition between the magnetic tape and the magnetic head can be prevented without the use of any large parts such as an air pump. Accordingly, the adhesion of the magnetic tape to the magnetic head and the transfer of the shape of the air escaping groove to the magnetic tape can be avoided to thereby prevent the damage to the magnetic tape. Further, since any expensive and large parts such as an air pump are not mounted, the magnetic tape unit can be reduced in size and cost.

(3) In the second prior art magnetic tape unit shown in FIGS. 16 to 19, the machine reel is intentionally rotated to overrun in order to detect a tape end in rewinding the magnetic tape. Accordingly, excess time is required prior to ejection of the magnetic tape cartridge. Further, excess tension is applied to the magnetic tape at the time the two reels change in direction of rotation, so that the magnetic tape is strongly pressed on the magnetic head, causing a damage to the magnetic tape.

To the contrary, according to the seventh aspect of the present invention, there is the play between the transmission gear and the support block. Accordingly, when the magnetic tape is fully unwound from the machine reel to come to the tape end, the arms are moved by the rewinding force of the file reel to turn off the second position sensor. The off-state of the second position sensor is detected to thereby allow quick start of the tape unthread operation, so that the damage to the magnetic tape can be prevented. That is, the tape end can be reliably and quickly detected in the tape unloading operation to thereby prevent the damage to the magnetic tape. Further, since the above operation can be performed with simple parts of the tape thread mechanism, the magnetic tape unit can be reduced in size and cost.

(4) In the second prior art magnetic tape unit, the arm position sensor is divided into two systems on the machine reel side and the file reel side. Accordingly, two printed circuit boards for respectively mounting the two systems are required, causing an increase in cost.

To the contrary, according to the preferred embodiments of the present invention, all the sensors for detecting arms positions are mounted on the single printed circuit board. Accordingly, the number of parts can be reduced to thereby realize a reduction in size and cost of the tape unit.

The eighth aspect of the present invention relates to a magnetic tape unit including a printed circuit board and FPC (flexible printed circuit board) connected through connectors to the printed circuit board, and the ninth aspect of the present invention relates to a magnetic tape unit including a decorative panel forming a front panel of the tape unit which panel has a plurality of openings for exposure of a display portion and an operating portion and for insertion of a magnetic tape cartridge. In recent years, a reduction in size and cost of a magnetic tape unit has been strongly desired. In connection with this, a magnetic tape unit having such a structure as to improve a workability and realize the size reduction has been demanded.

Figure 41:
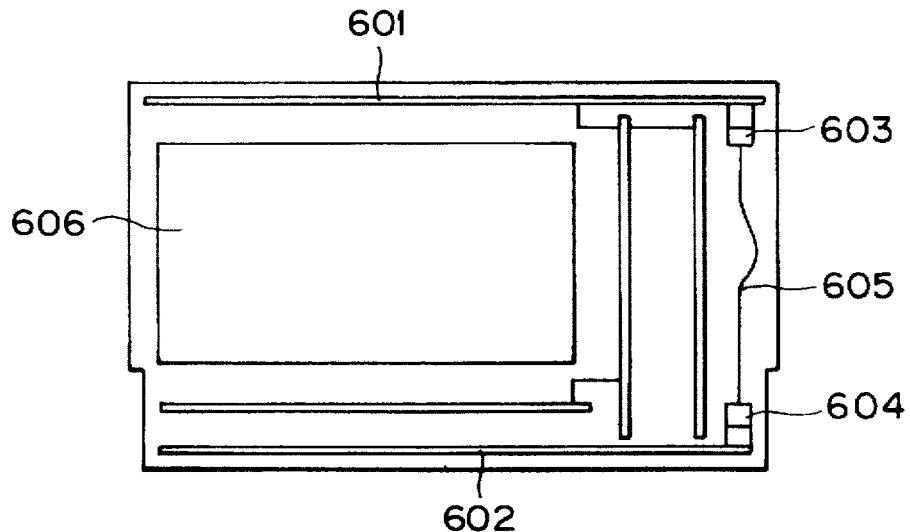
FIG. 41 is a view showing an internal structure of a magnetic tape unit in the prior art.

In many cases, a power supply of the magnetic tape unit is usually mounted as a separate member outside of a frame of the tape unit. In the magnetic tape unit, a plurality of printed circuit boards are provided, and they are connected together through flat cables in the magnetic tape unit of the type where the power supply is mounted outside of the frame of the unit. FIG. 41 shows such a prior art magnetic tape unit. As shown in FIG. 41, a printed circuit board 601 provided with a controller (circuit) for controlling the tape unit as a whole and a printed circuit board 602 provided with a circuit for reading data are arranged at an upper portion and a lower portion of the tape unit, respectively. The two printed circuit boards 601 and 602 are connected to each other by an FPC 605 through connectors 603 and 604 with locking means. The reason why the connectors 603 and 604 have the locking means is to prevent a risk that the FPC 605 may be disconnected because of vibration or the like, since the FPC 605 is mounted through the connectors 603 and 604 to the printed circuit boards 601 and 602 and supported thereby after fixing the printed circuit boards 601 and 602 to the frame of the unit. Reference numeral 606 shown in FIG. 41 denotes a mechanism section for threading a magnetic tape from a cartridge, winding the magnetic tape, and performing read/write of data on the magnetic tape.

The magnetic tape unit of the type where the power supply is mounted outside of the unit frame is troublesome to handle in transporting or the like, and it is therefore desirable to realize a power supply built-in type of magnetic tape unit such that a power supply is mounted inside of the unit frame. Since a plurality of printed circuit boards are provided in the magnetic tape unit as mentioned above, the incorporation of the power supply in the magnetic tape unit requires such a structure that the power supply is located adjacent to the mechanism section 606. Further, parts of a housing of the magnetic tape unit except its front panel, i.e., a top panel, a bottom panel, side panels, and a back panel, are formed from a sheet metal (metal plate). However, the front panel forming a decorative panel is formed of resin. Accordingly, the front panel must have a measure for removing the emergence of radio wave noise from the circuits in the tape unit to the outside thereof and a measure for preventing the penetration of static electricity from the outside into the inside of the tape unit.

Figure 42:
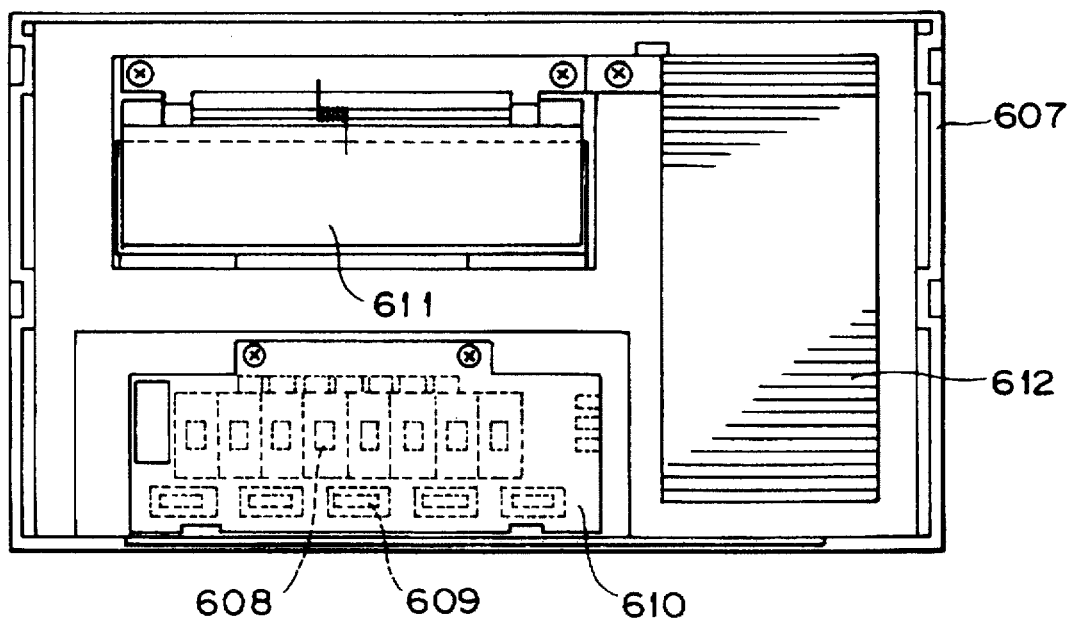
FIG. 42 is an elevational view showing the back surface of a front panel in the magnetic tape unit in the prior art.

FIG. 42 shows such a prior art magnetic tape unit having the above measures. A conductive coating is made on the back surface of a resin decorative panel 607 to form a conductive metal film. Further, a printed circuit board 610 on which a display portion 608 and an operating portion 609 are previously mounted is mounted on the decorative panel 607, and the decorative panel 607 is formed with a cartridge insert opening 611 and a plurality of gridlike cooling openings 612. The mounting of the printed circuit board 610 to the decorative panel 607 is performed by preliminarily fixing insert screws to the decorative panel 607 and securing the board 610 to the decorative panel 607 by the use of the insert screws.

In the prior art shown in FIG. 41 wherein after fixing the printed circuit boards to the unit frame, the FPC is mounted through the connectors to the printed circuit boards, the following problem occurs. That is, in the case of connecting a plurality of FPCs to one printed circuit board, a plurality of FPC connectors fixed to the plural FPCs must be individually connected to a plurality of board connectors fixed to the printed circuit board, causing a reduction in workability of connection between the FPC connectors and the board connectors. In particular, the printed circuit boards in the magnetic tape unit are sometimes replaced with other boards for testing or maintenance. In replacing any old printed circuit board with a new one, the plural FPC connectors must be first removed one by one from the board connectors of the old printed circuit board. After replacement of the old printed circuit board with the new one, the plural FPC connectors must be connected again one by one to the board connectors of the new printed circuit board. Thus, the replacement is troublesome to cause the reduction in workability.

Further, in the prior art shown in FIG. 41, the connectors with locking means are used to prevent the disconnection between the printed circuit boards and the FPC due to vibration or the like. However, the connectors with locking means are large in size to occupy a large space in the tape unit, causing a hindrance to the reduction in size of the tape unit.

In the prior art shown in FIG. 42 wherein the conductive coating is made on the back surface of the resin decorative panel as the measures for radio wave noise emergence and static electricity penetration, the shielding effect is insufficient because the metal film by the conductive coating is thin. In addition, a parts mounting portion of the decorative panel must be masked in making the conductive coating to prevent a coating material from being deposited to the parts mounting portion, thus causing a reduction in workability in the manufacture of the tape unit. In particular, the masking near the portion where the printed circuit board 610 is mounted is very troublesome because the display portion 608 and the operating portion 609 mounted on the printed circuit board 610 have a display surface and a plurality of operation switches, thus reducing the workability. Further, the fixing of the insert screws to the decorative panel is a manual work, causing a reduction in workability. Moreover, since the decorative panel is formed of resin, the mechanical strength of the portion forming the gridlike cooling openings of the decorative panel is insufficient. Accordingly, it is required to increase the mechanical strength as by increasing the wall thickness of the decorative panel, resulting in an increase in wall thickness of the front panel in spite of the thin metal film, causing a hindrance to the reduction in size of the tape unit. The reduction in workability in the manufacture and in testing or maintenance of the tape unit as mentioned above is one of the causes of an increase in manufacturing cost and a maintenance cost.

It is therefore an object of the eighth and ninth aspects of the present invention to realize a magnetic tape unit which can improve the workability in the manufacture and in testing or maintenance of the tape unit to attain a cost reduction, and can be reduced in size.

Figure 43:
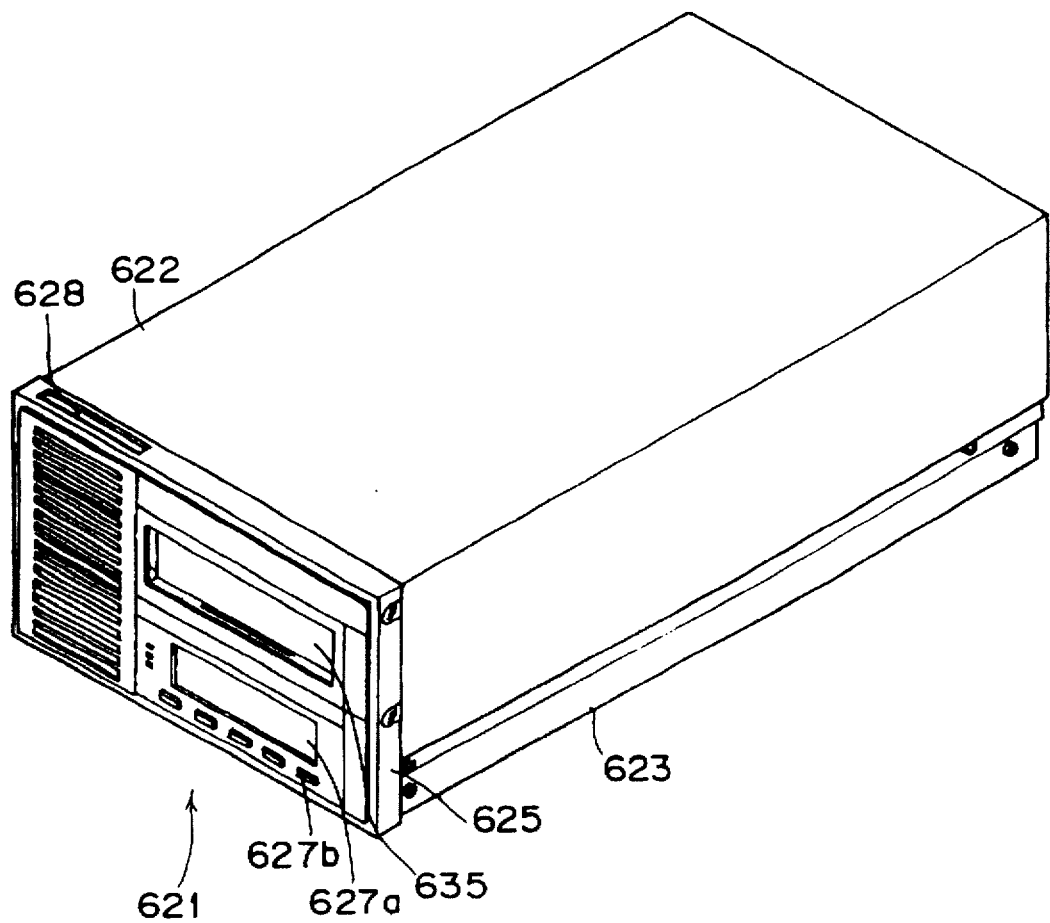
FIG. 43 is a perspective view of the magnetic tape unit according to the eighth and ninth aspects of the present invention.
Figure 44:
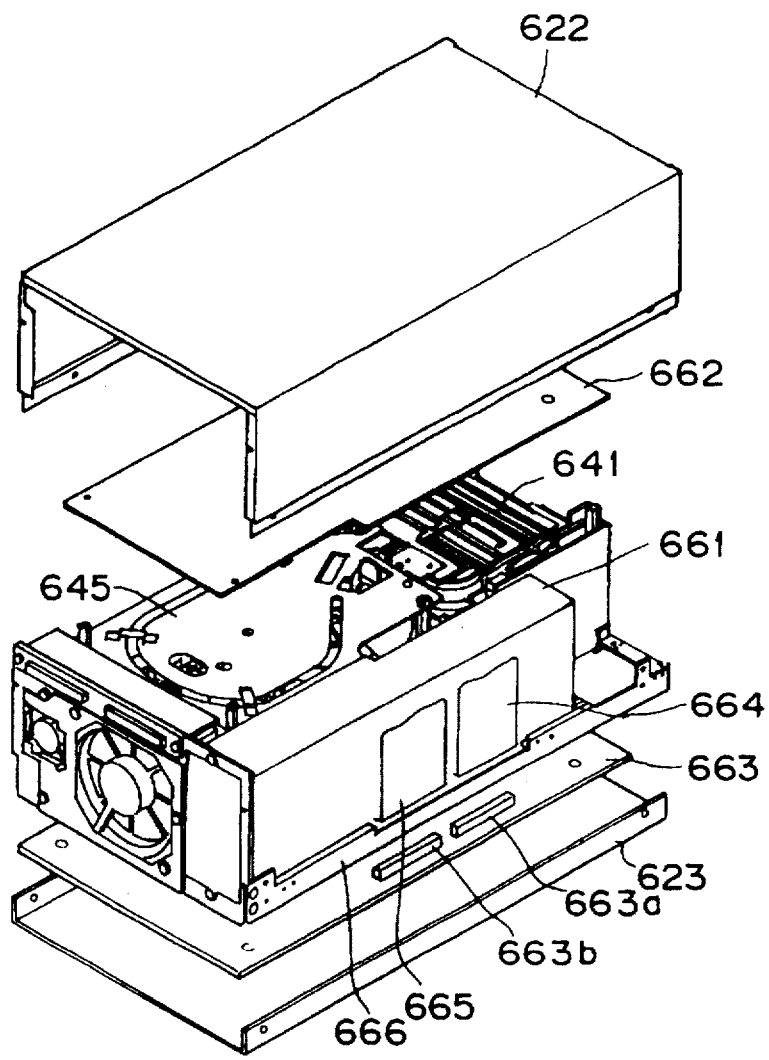
FIG. 44 is an exploded perspective view of the magnetic tape unit shown in FIG. 43 as viewed from the rear side thereof.
Figure 45:
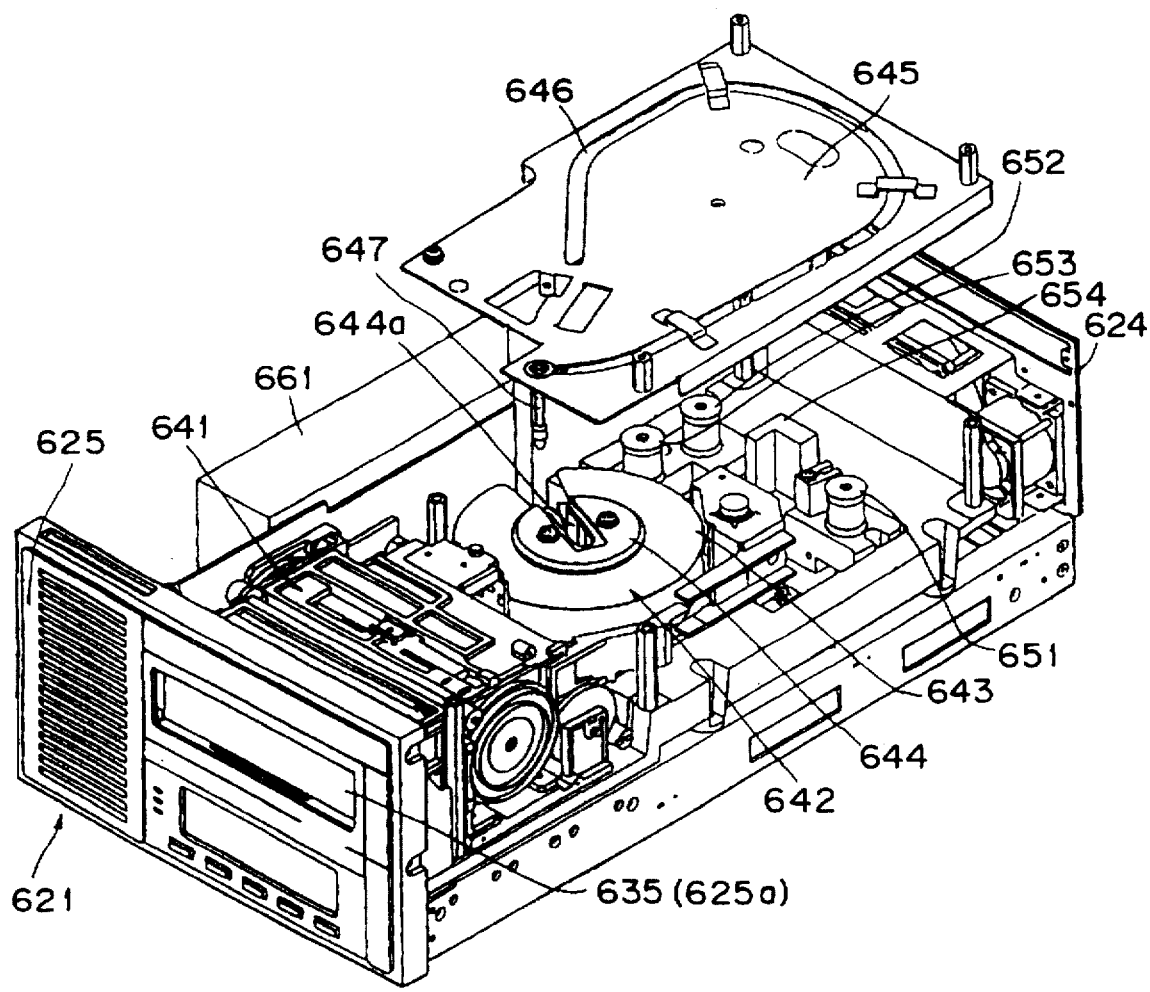
FIG. 45 is an exploded perspective view of the magnetic tape unit shown in FIG. 43 as viewed from the front side thereof.
Figure 46:
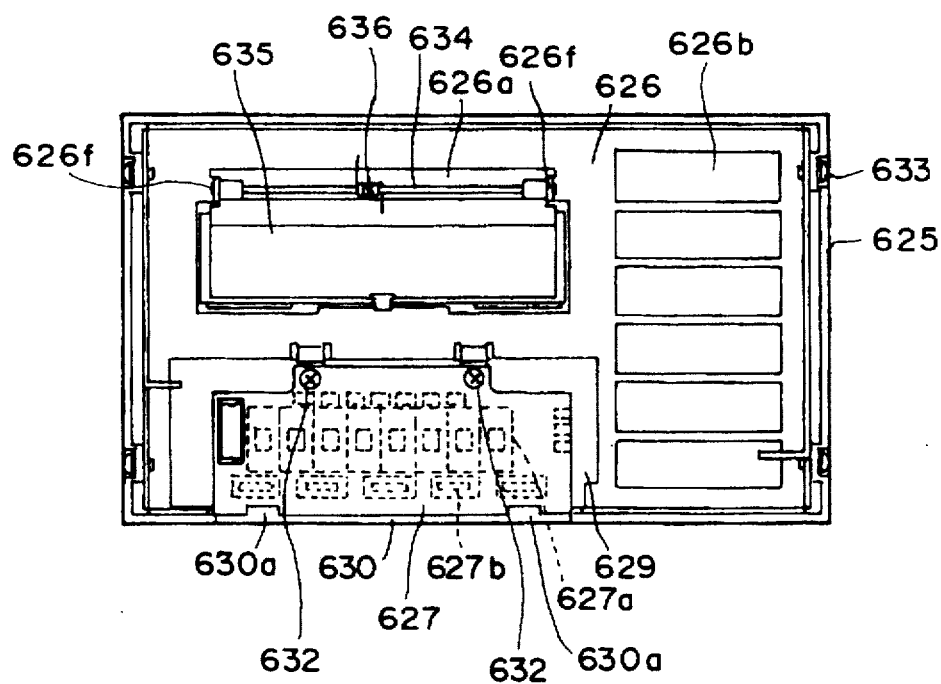
FIG. 46 is a rear elevational view of a front panel in the magnetic tape unit shown in FIG. 43.
Figure 47:
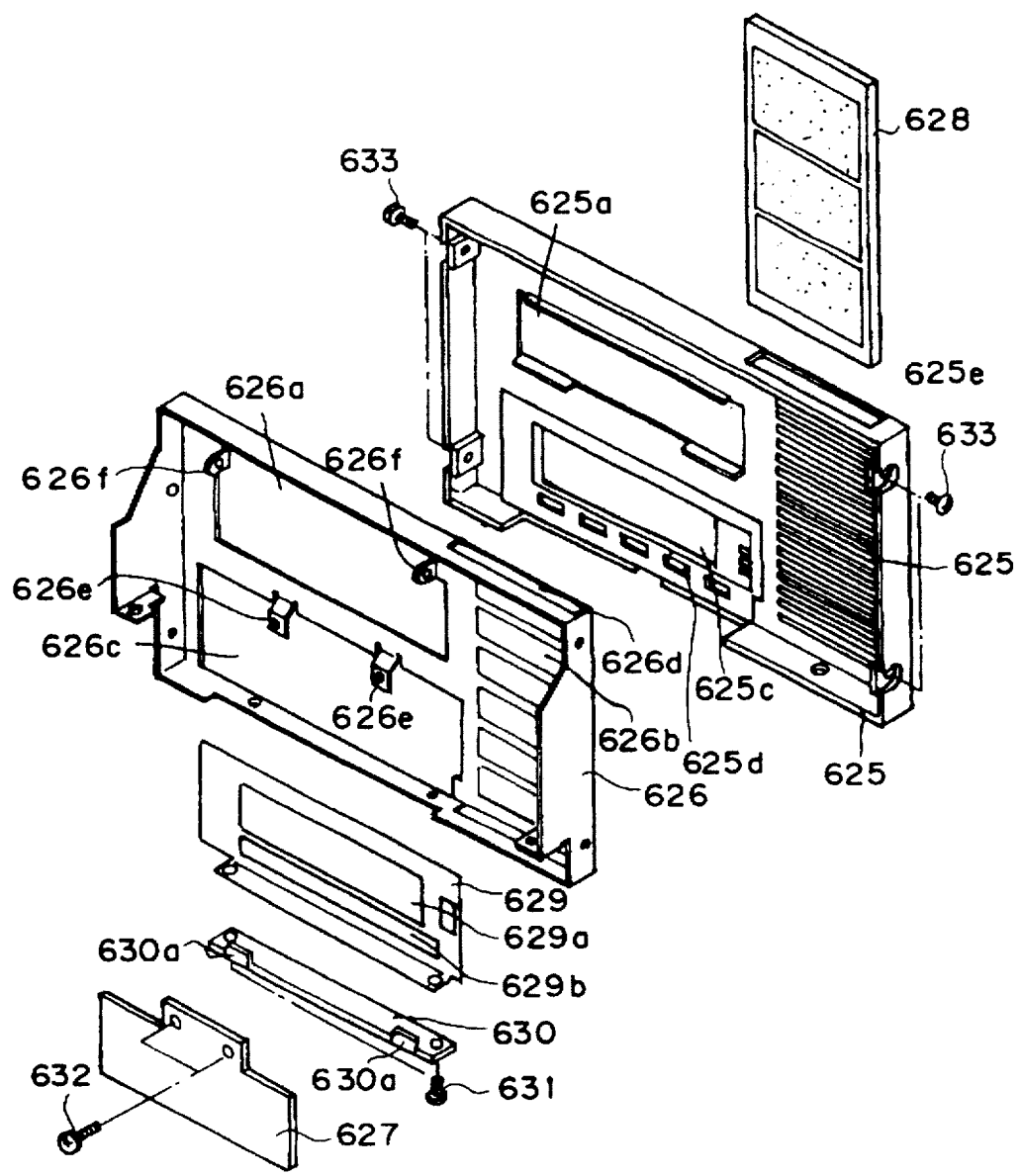
FIG. 47 is an exploded perspective view of an essential part of the front panel.

A common preferred embodiment according to the eighth and ninth aspects of the present invention will now be described with reference to FIGS. 43 to 50. As shown in FIGS. 43 to 45, the magnetic tape unit in this preferred embodiment includes a front panel 621, an upper cover (integrated top panel and side panels) 622, a bottom panel 623, and a back panel 624. As shown in FIGS. 46 and 47, the front panel 621 includes a decorative panel 625 and a metal plate 626 almost fully covering the back surface of the decorative panel 625. The upper cover 622, the bottom panel 623, and the back panel 624 are formed from a sheet metal, but the decorative panel 625 is formed of resin. It is therefore necessary to take measures for preventing the emergence of radio wave noise from the inside to the outside of the tape unit and for preventing the penetration of static electricity from the outside to the inside of the tape unit. As these measures, this preferred embodiment employs the metal plate 626 mounted to the decorative panel 625 by using screws 633 so as to almost fully cover the back surface of the decorative panel 625.

The front portion of the decorative panel 625 is formed with a cartridge insert opening 625a, a plurality of gridlike cooling openings 625b, a display opening 625c, and a plurality of operation openings 625d. The display opening 625c is formed to expose a display surface of a display portion 627a mounted on a printed circuit board 627. The operation openings 625d are formed to insert a plurality of operation switches of an operating portion 627b mounted on the printed circuit board 627. Further, the upper portion of the decorative panel 625 is formed with a filter insert opening 625e from which an air filter 628 is inserted.

The front portion of the metal plate 626 is formed with a cartridge insert opening 626a, a plurality of cooling openings 626b, and a display/operation opening 626c. The cartridge insert opening 626a of the metal plate 626 is opposed to the cartridge insert opening 625a of the decorative panel 625; the cooling openings 626b of the metal plate 626 are opposed to the gridlike cooling openings 625b of the decorative panel 625; and the display/operation opening 626c of the metal plate 626 is opposed to the display opening 625c and the operation opening 625d of the decorative panel 625. Further, the upper portion of the metal plate 626 is also formed with a filter insert opening 626d opposed to the filter insert opening 625e of the decorative panel 625. A pair of female screw portions 626e for mounting the printed circuit board 627 are formed by tapping the metal plate 626 on the upper side of the display/operation opening 626c.

A metal subplate 629 is mounted on the back surface of the metal plate 626 at a lower portion thereof. The metal subplate 629 serves to shield a space in the display/operation opening 626c except a space for exposing the display surface of the display portion 627a and for inserting the operation switches of the operating portion 627b both mounted on the printed circuit board 627. Accordingly, the metal subplate 628 has an opening 629a for exposing the display surface of the display portion 627a mounted on the printed circuit board 627 and an opening 629b for inserting the operation switches of the operating portion 627b mounted on the printed circuit board 627.

A board retainer 630 is mounted on the metal subplate 629 at a lower portion thereof by using screws 631. The mounting of the board retainer 630 on the metal subplate 629 is performed simultaneously with the mounting of the metal subplate 629 on the metal plate 626 by using the screws 631. The board retainer 630 is formed with a pair of projections 630a for retaining a lower portion of the printed circuit board 627. An upper portion of the printed circuit board 627 is fixed to the metal plate 626 at the female screw portions 626e by using screws 632. A pair of support portions 626f are formed on both sides of the cartridge insert opening 626a of the metal plate 626. As shown in FIG. 46, a shaft 634 is supported to the support portions 626f, and a lid 635 is pivotably supported to the shaft 634 so as to normally cover the cartridge insert opening 626a. A torsion spring 636 is mounted on the shaft 634 to normally bias the lid 635 in a direction of closing the cartridge insert opening 626a.

According to the above structure, the metal plate 626 having the display/operation opening 626c and the cartridge insert opening 626a is provided so as to almost fully cover the back surface of the resin decorative panel 625, as the measures for preventing the emergence of radio wave noise and the entry of static electricity. Accordingly, the thickness of a shielding member (i.e., the metal plate 626) can be increased to thereby improve the shielding effect. Furthermore, neither the conductive coating nor the masking is required in manufacturing to thereby improve the workability in the manufacture of the tape unit. Further, since the metal plate 626 can be tapped, it is unnecessary to fix insert screws to the decorative panel, thereby improving the workability also in this respect. In addition, the portion forming the gridlike cooling openings 625b of the decorative panel 625 is reinforced by the metal plate 626, so that the thickness of the decorative panel 625 can be reduced. Thus, an increase in total thickness of the front panel 621 can be suppressed in spite of the addition of the metal plate 626, thereby allowing a reduction in size of the tape unit. In addition, the metal subplate 629 is provided to shield the space in the display/operation opening 626c of the metal plate 626 except the space for the display surface of the display portion 626a and the operation switches of the operating portion 627b, so that the shielding effect can be further improved.

Now, the internal structure of the magnetic tape unit in this preferred embodiment will be described. The internal structure in this preferred embodiment is characterized in the connection structure between the printed circuit boards (except the printed circuit board 627) on which electronic parts are mounted and the FPCs connected through the connectors to the printed circuit boards. The other parts including a mechanism for loading a cartridge, threading a magnetic tape from the cartridge, and reading/writing data on the magnetic tape is similar to that of the magnetic tape unit in each previous preferred embodiment. Accordingly, the parts other than the connection structure between the printed circuit boards and the FPCs will be described in brief.

The magnetic tape wound on a file reel is stored in the cartridge, and a leader block is mounted at the leading end of the magnetic tape. The cartridge is inserted from the cartridge insert opening 625a into the tape unit. As shown in FIG. 45, a loader assembly 641 is located behind the cartridge insert opening 625a, so as to set the cartridge inserted from the cartridge insert opening 625a or eject the cartridge from the cartridge insert opening 625a. A machine reel 642 is located behind the loader assembly 641. The machine reel 642 is provided with a hub 644. The hub 644 has a recess 644a for engaging the leader block of the magnetic tape. The hub 644 is rotated by driving a machine reel motor 643. A threader assembly 645 is located behind the loader assembly 641. The threader assembly 645 has a threader pin 647 to be moved along a slit 646.

The threader pin 647 serves to catch the leader block of the magnetic tape stored in the cartridge, thread it from the cartridge, and engage it into the recess 644a of the hub 644. The magnetic tape threaded by the threader pin 647 is wrapped on a plurality of guide rollers 651, 652, and 653, and is then fixedly engaged with the hub 644. A magnetic head 654 for performing read/write of data on the magnetic tape is located between the guide rollers 651 and 652. The loader assembly 641, the machine reel 642, the threader assembly 645, the guide rollers 651 to 653, and the magnetic head 654 constitute a mechanism section of the magnetic tape unit. The operation of the mechanism section is as follows:

First, the cartridge is set in the loader assembly 641, and the leader block is caught by the threader pin 647 of the threader assembly 645 to be fed through the guide roller 651, the magnetic head 654, and the guide rollers 652 and 653 to the hub 644 and be engaged into the recess 644a of the hub 644. Then, a file reel motor and the machine reel motor 643 are driven in the same direction to draw the magnetic tape out of the cartridge and wind it around the hub 644 as being guided by the guide rollers 651 to 653. During this travel of the magnetic tape, data is read or written by the magnetic head 654. The rewinding of the magnetic tape to the file reel in the cartridge is performed by reversely driving the file reel motor and the machine reel motor 643.

Any excess space is almost absent in the mechanism section including the loader assembly 641, the machine reel 642, the threader assembly 645, and the guide rollers 651 to 653 in the magnetic tape unit. Accordingly, in this preferred embodiment, a power supply 661 is located adjacent to the mechanism section to realize the incorporation of the power supply 661 inside the frame of the tape unit. As shown in FIG. 44, the incorporation of the power supply 661 results in a decrease in peripheral space about the power supply 661, thus requiring a specific design for wiring and connection of the FPCs.

As shown in FIG. 44, upper and lower printed circuit boards 662 and 663 are so arranged as to interpose the mechanism section in the vertical direction. That is, the printed circuit boards 662 and 663 are mounted on the upper surface and the lower surface of the unit frame and then fixed thereto by using screws. Electronic parts are mounted on both the printed circuit boards 662 and 663. More specifically, a circuit relating to a controller for controlling the tape unit as a whole is provided on the printed circuit board 662, while a read circuit for receiving an output signal from the magnetic head 654 and generating data read by the magnetic head 654 through the controller to external equipment is provided on the printed circuit board 663. Accordingly, FPCs 664 and 665 for transferring signals between the printed circuit boards 662 and 663 are connected through connectors to the printed circuit boards 662 and 663. The FPCs 664 and 665 are so disposed as to extend along an outer surface of the power supply 661. A pair of FPC connectors fixed to the opposite ends of each of the FPCs 664 and 665 are fixed to the unit frame (e.g., a frame 666 supporting the body parts shown in FIG. 44) so as to be opposed to the printed circuit boards 662 and 663. On the other hand, a plurality of board connectors (for example, shown by 663a and 663b in FIG. 44) adapted to be connected to the FPC connectors are fixed to the printed circuit boards 662 and 663.

Figure 48:
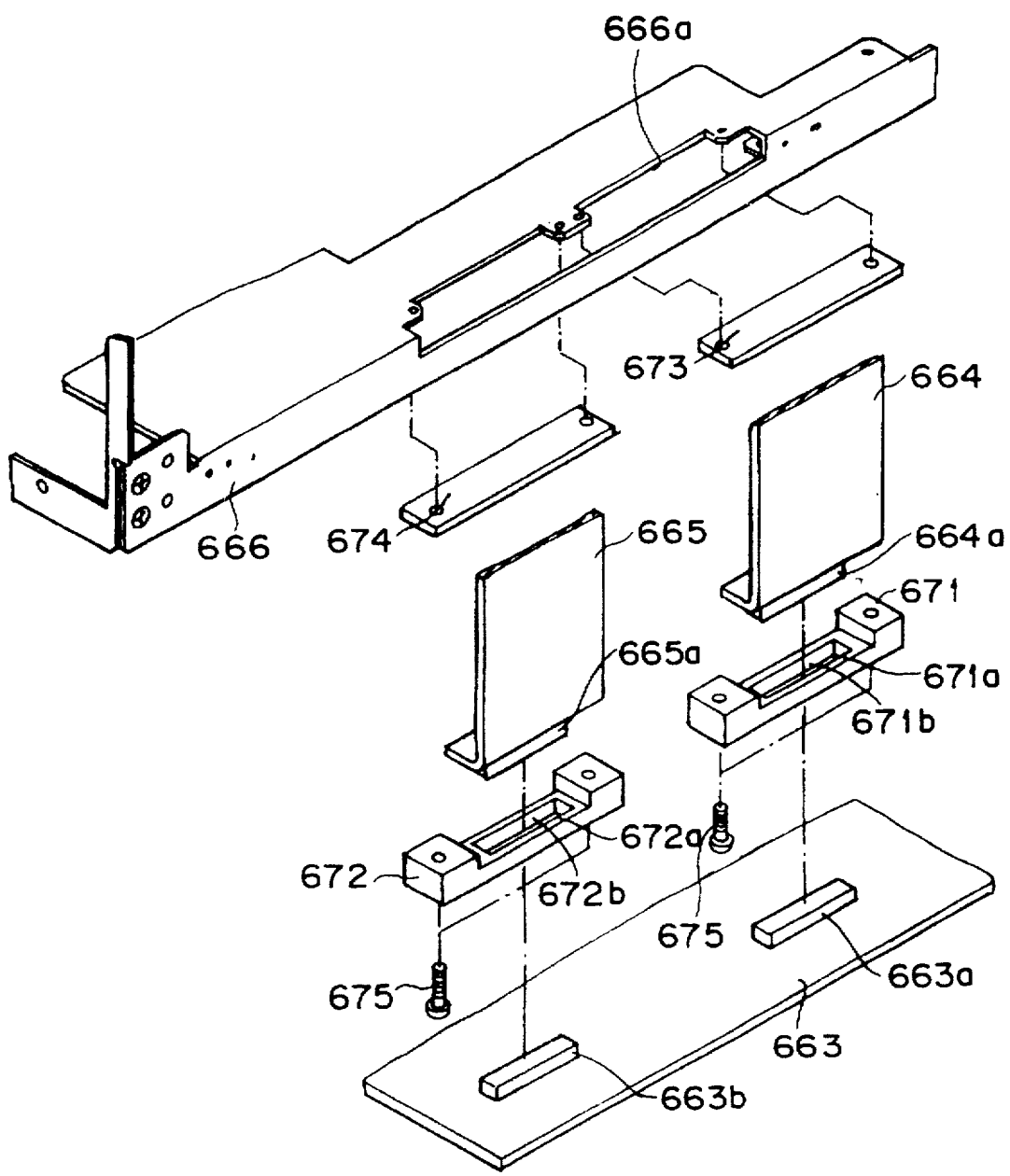
FIG. 48 is an exploded perspective view of a portion in the vicinity of an FPC connector.
Figure 49:
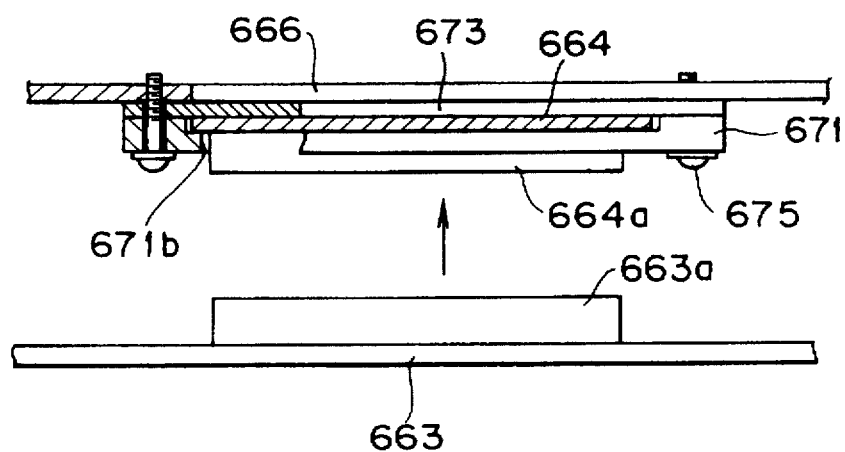
FIG. 49 is a fragmentary sectional view showing a preferred embodiment of the connection of the FPC connector and a board connector.

The connection of the FPC connectors and the corresponding board connectors will now be described in detail with reference to FIGS. 48 and 49. While FIGS. 48 and 49 show the connection of FPC connectors 664a and 665a fixed at the lower ends of the FPCs 664 and 665 and board connectors 663a and 663b fixed to the lower printed circuit board 663, the connection of FPC connectors fixed to the upper ends of the FPCs 664 and 665 and board connectors fixed to the upper printed circuit board 662 is similar to the connection shown. The frame 666 is partially cut out to form an opening 666a allowing the pass of the FPC connectors 664a and 665a at the lower ends of the FPCs 664 and 665. Reference numeral 671 and 672 denote FPC holders for holding the FPCs 664 and 665. The FPC holders 671 and 672 are formed at their longitudinal intermediate portions with recesses 671a and 672a, respectively. The bottoms of the recesses 671a and 672a are formed at their central portions with rectangular through holes 671b and 672b for engaging the FPC connectors 664a and 665a, respectively.

Two spacers 673 and 674 are mounted on the lower surface of the frame 666 at the peripheries of the opening 666a. The lower ends of the FPCs 664 and 665 are mounted on the lower surface of the spacers 673 and 674, and the FPC holders 671 and 672 are mounted on the lower surfaces of the lower ends of the FPCs 664 and 665, respectively. In such an overlapped condition, the FPC holders 671 and 672 are secured to the frame 666 by screws 675. Accordingly, the lower ends of the FPCs 664 and 665 are interposed between the spacers 673 and 674 and the recesses 671a and 672a of the FPC holders 671 and 672 (the upper peripheral surface about the through holes 671b and 672b of the FPC holders 671 and 672) with slight gaps defined in their longitudinal direction, and the FPC connectors 664a and 665a are loosely engaged with the through holes 671b and 672b, respectively.

In this mounted condition, slight movement of the FPCs 664 and 665 and the FPC connectors 664a and 665a in a direction perpendicular to the mounting direction (upward direction) of the printed circuit board 663 is permitted by the horizontal gaps mentioned above, but movement of the FPCs 664 and 665 and the FPC connectors 664a and 665a in a direction of moving away from the spacers 673 and 674 is inhibited by the FPC holders 671 and 672 pressing the FPCs 664 and 665 against the frame 666. In this condition, the FPC connectors 664a and 665a face downward. That is, the FPC connectors 664a and 665a are fixed to the frame 666 so as to be opposed to the printed circuit board 663.

Prior to mounting the printed circuit board 663 to the unit frame, the FPC connectors 664a and 665a are fixed to the unit frame so as to be opposed to the printed circuit board 663. Accordingly, when the printed circuit board 663 is mounted to the unit frame, the board connectors 663a and 663b previously fixed to the printed circuit board 663 are connected to the FPC connectors 664a and 665a previously fixed to the unit frame. Thereafter, the printed circuit board 663 is fixed to the unit frame by the screws. That is, the connection of the printed circuit board 663 and the plural FPCs 664 and 665 can be performed at a time by only mounting the printed circuit board 663 to the unit frame, thereby improving the workability in the manufacture. Further, also in replacing the printed circuit board 663 with a new one, it is unnecessary to individually disconnect the plural FPC connectors 664a and 665a and individually connect them again. That is, the disconnection and connection of the plural FPC connectors 664a and 665a can be easily performed by only removing the printed circuit board 663 and then mounting the new one. Thus, the workability in the replacement of the printed circuit board can be greatly improved. Further, since both the FPC connectors 664a and 665a and the printed circuit board 663 are fixed to the unit frame, there is no possibility that the connectors of the printed circuit board 663 and the FPCs 664 and 665 may be disconnected because of vibration or the like. Accordingly, it is unnecessary to use the connectors with locking means as in the prior art, thereby reducing the space occupied by the connectors in the tape unit and therefore realizing the reduction in size of the tape unit.

Furthermore, while the FPC connectors 664a and 665a are fixed to the unit frame, the slight movement of the FPC connectors 664a and 665a in the direction perpendicular to the mounting direction of the printed circuit board 663 is permitted. Therefore, even when the positioning of the board connectors 663a and 663b with respect to the printed circuit board 663 is inaccurate, a good connected condition between the FPC connectors 664a and 665a and the board connectors 663a and 663b can be obtained by suitably shifting the FPC connectors 664a and 665a within the through holes 671b and 672b.

Various modifications of the fixing structure of the FPCs 664 and 665 to the unit frame may be made. For example, the spacers 673 and 674 may be omitted. Further, the width of each of the spacers 673 and 674 may be made the same as the width of each of the FPCs 664 and 665, and the spacers 673 and 674 may be stored in the recesses 671a and 672a.

Figure 50:
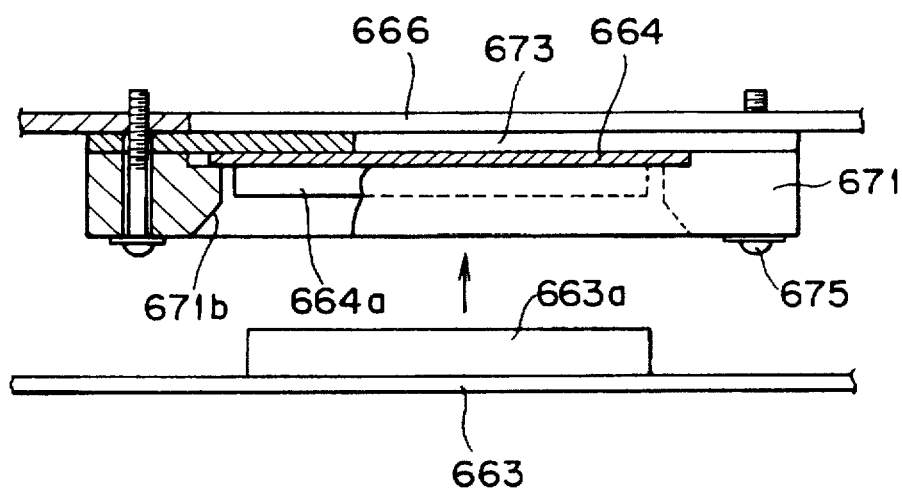
FIG. 50 is a fragmentary sectional view showing another preferred embodiment of the connection of the FPC connector and the board connector.

FIG. 50 shows another preferred embodiment of the fixing structure of the FPCs 664 and 665. In this preferred embodiment, the thickness of each of the FPC holders 671 and 672 holding the FPC connectors 664a and 665a is increased so that the through holes 671b and 672b function as guides in connecting the board connectors 663a and 663b to the FPC connectors 664a and 665a, thereby facilitating the connection of the FPC connectors 664a and 665a and the board connectors 663a and 663b. In particular, the inner wall surface of each of the through holes 671b and 672b may be reversely tapered at the lower opening edge to form a quadrangular pyramidal surface, thereby more facilitating the connection. The above connection structure may be, of course, applied to any various FPCs and printed circuit boards in the magnetic tape unit other than the FPCs 664 and 665 and the printed circuit boards 662 and 663.

Having thus described a specific embodiment of the present invention, it should be understood that the preferred embodiment is merely illustrative and not limitative. It is to be noted that the scope of the invention is set out in the appended claims, and all changes and modifications that fall within equivalence of the claims are intended to be embraced by the claims.

What is claimed is:

1. A magnetic tape unit comprising:

a magnetic head for reading and writing data from and onto a magnetic tape;

driving means for traveling said magnetic tape kept in contact with said magnetic head during a read/write operation of said magnetic head; and means for preventing adhesion of said magnetic tape to said magnetic head including:

means for performing a reciprocating motion of said magnetic tape by a small distance with a predetermined period during a rest period where the read/write operation of said magnetic head is not performed;

a temperature sensor for detecting a temperature in the vicinity of said magnetic head; and control means for changing said predetermined period of said reciprocating motion according to said temperature detected by said temperature sensor.

2. A magnetic tape unit according to claim 1, wherein said control means reduces said predetermined period of said reciprocating motion when said detected temperature is higher than or equal to a reference temperature.

3. A magnetic tape unit according to claim 1, further comprising:

a fan for ventilating said magnetic tape unit; and means for changing a rotating speed of said fan according to said detected temperature.

4. A magnetic tape unit comprising:

a magnetic head for reading and writing data from and onto a magnetic tape;

driving means for traveling said magnetic tape kept in contact with said magnetic head during a read/write operation of said magnetic head;

a temperature sensor for detecting a temperature in the vicinity of said magnetic head; and means for preventing adhesion of said magnetic tape to said magnetic head including means for canceling the contact between said magnetic tape and said magnetic head when said temperature detected by said temperature sensor is higher than or equal to a reference temperature during a rest period where the read/write operation of said magnetic head is not performed.

5. A magnetic tape unit according to claim 4, further comprising a guide for forming a travel path of said magnetic tape, wherein said canceling means comprises means for displacing said guide.

6. A magnetic tape unit according to claim 4, further comprising a pin provided on one side of a travel path of said magnetic tape where said magnetic head is provided, wherein said canceling means comprises means for displacing said pin.

7. A magnetic tape unit according to claim 4, further comprising:

a fan for ventilating said magnetic tape unit; and means for changing a rotating speed of said fan according to said detected temperature.

8. A magnetic tape unit comprising:

a magnetic head for reading and writing data from and onto a magnetic tape;

a temperature sensor for detecting a temperature in the vicinity of said magnetic head;

means for making constant contact of said magnetic tape with said magnetic head;

a reel motor for traveling said magnetic tape kept in contact with said magnetic head;

means for preventing adhesion of said magnetic tape to said magnetic head including means for driving said reel motor at regular intervals of time to intermittently move said magnetic tape in one of a winding direction and a rewinding direction, during a rest period where a read/write operation of said magnetic head is not performed; and control means for changing said regular intervals of said means for driving according to said temperature detected by said temperature sensor.

9. A magnetic tape unit comprising:

a magnetic head for reading and writing data from and onto a magnetic tape;

a temperature sensor for detecting a temperature in the vicinity of said magnetic head;

driving means for traveling said magnetic tape kept in contact with said magnetic head during a read/write operation of said magnetic head;

means for preventing adhesion of said magnetic tape to said magnetic head including:

means for performing a reciprocating motion of said magnetic tape by a small distance with a predetermined period during a rest period where the read/write operation of said magnetic head is not performed; and control means for changing said predetermined period of said reciprocating motion according to said temperature detected by said temperature sensor, whereby said means for performing a reciprocating motion prevents adhesion of said magnetic tape to said magnetic head; and means for positioning said magnetic tape in contact with said magnetic head even during said rest period.

* * * * *